United States Patent [19]

Kyu et al.

[11] 4,225,919
[45] Sep. 30, 1980

[54] ADVANCED DATA LINK CONTROLLER

[75] Inventors: Shikun Kyu, Yokohama, Japan; Edward C. Hepworth, Chattanooga, Tenn.

[73] Assignee: Motorola, Inc., Schaumburg, Ill.

[21] Appl. No.: 921,012

[22] Filed: Jun. 30, 1978
(Under 37 CFR 1.47)

[51] Int. Cl.³ ............................................. G06F 3/04
[52] U.S. Cl. ................................................ 364/200
[58] Field of Search .................. 179/15 AF, 15 AL; 364/200 MS File, 900 MS File

[56] References Cited

U.S. PATENT DOCUMENTS

| | | | |
|---|---|---|---|
| 3,482,214 | 12/1969 | Sichel, Jr. et al. | 364/200 |
| 3,544,976 | 12/1970 | Collins | 179/15 AL |
| 3,597,549 | 8/1971 | Farmer | 179/15 AL |
| 3,618,031 | 11/1971 | Kennedy | 364/200 |
| 3,639,694 | 1/1972 | Deutsch et al. | 364/200 |
| 3,879,710 | 4/1975 | Maxemchuk | 364/200 |
| 3,970,799 | 7/1976 | Colton | 179/15 AF |
| 3,985,962 | 10/1976 | Jones et al. | 179/15 AL |
| 4,034,346 | 7/1977 | Hostein | 364/200 |
| 4,045,613 | 8/1977 | Walker | 179/15 AF |
| 4,151,373 | 4/1979 | Widmer et al. | 179/15 AF |

*Primary Examiner*—Harvey E. Springborn
*Attorney, Agent, or Firm*—Walter W. Nielsen

[57] ABSTRACT

A bit-oriented data link controller provides the interface between a microcomputer or terminal and a data communications link. The data link controller is capable of accommodating the three most commonly available bit-oriented data link control protocols, namely Synchronous Data Link Control SDLC, High Level Data Link Control HDLC, and Advanced Data Communications Control Procedure ADCCP. The data link controller provides the data communications interface for both primary and secondary stations in stand-alone, polling, and loop configurations.

7 Claims, 89 Drawing Figures

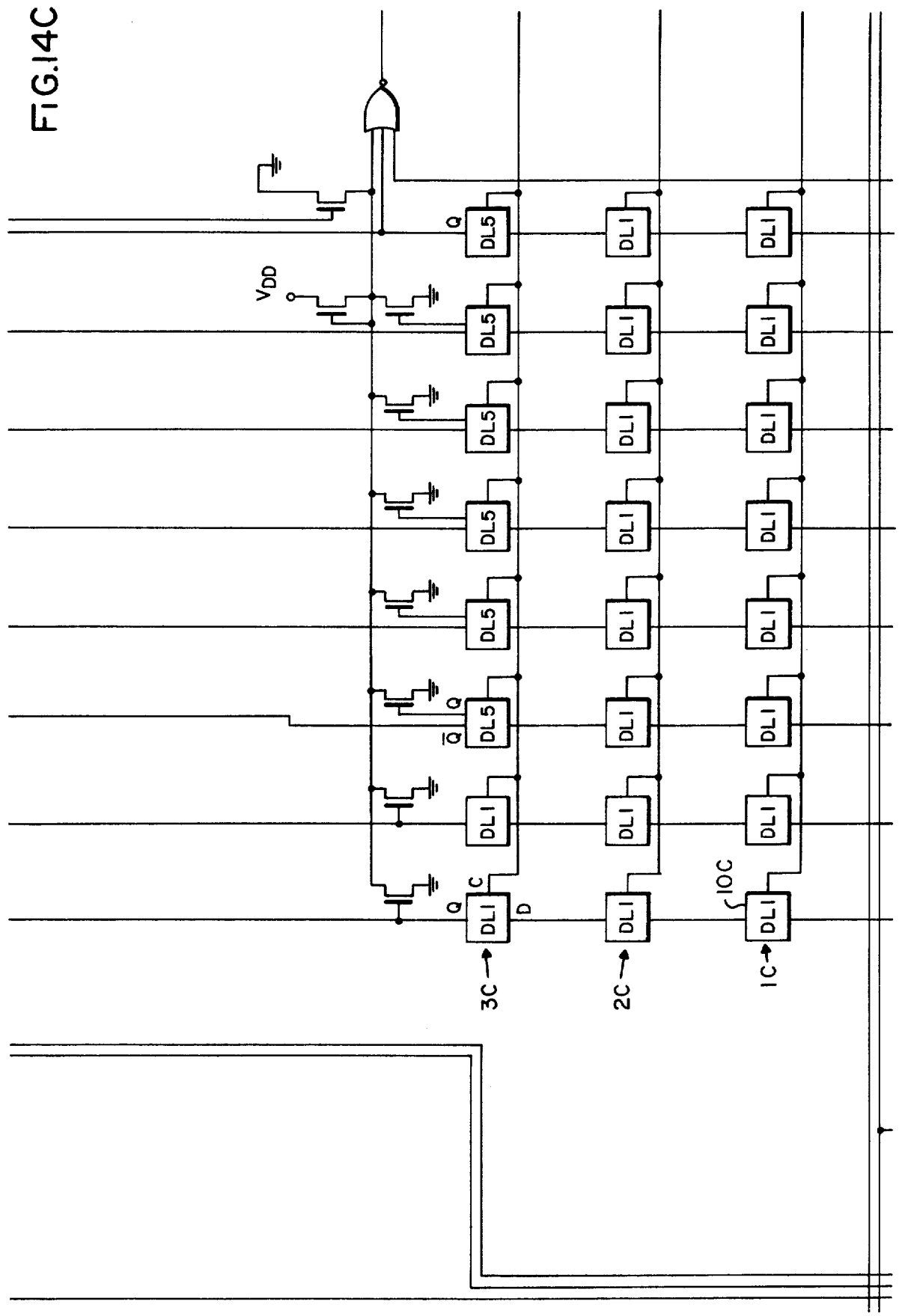

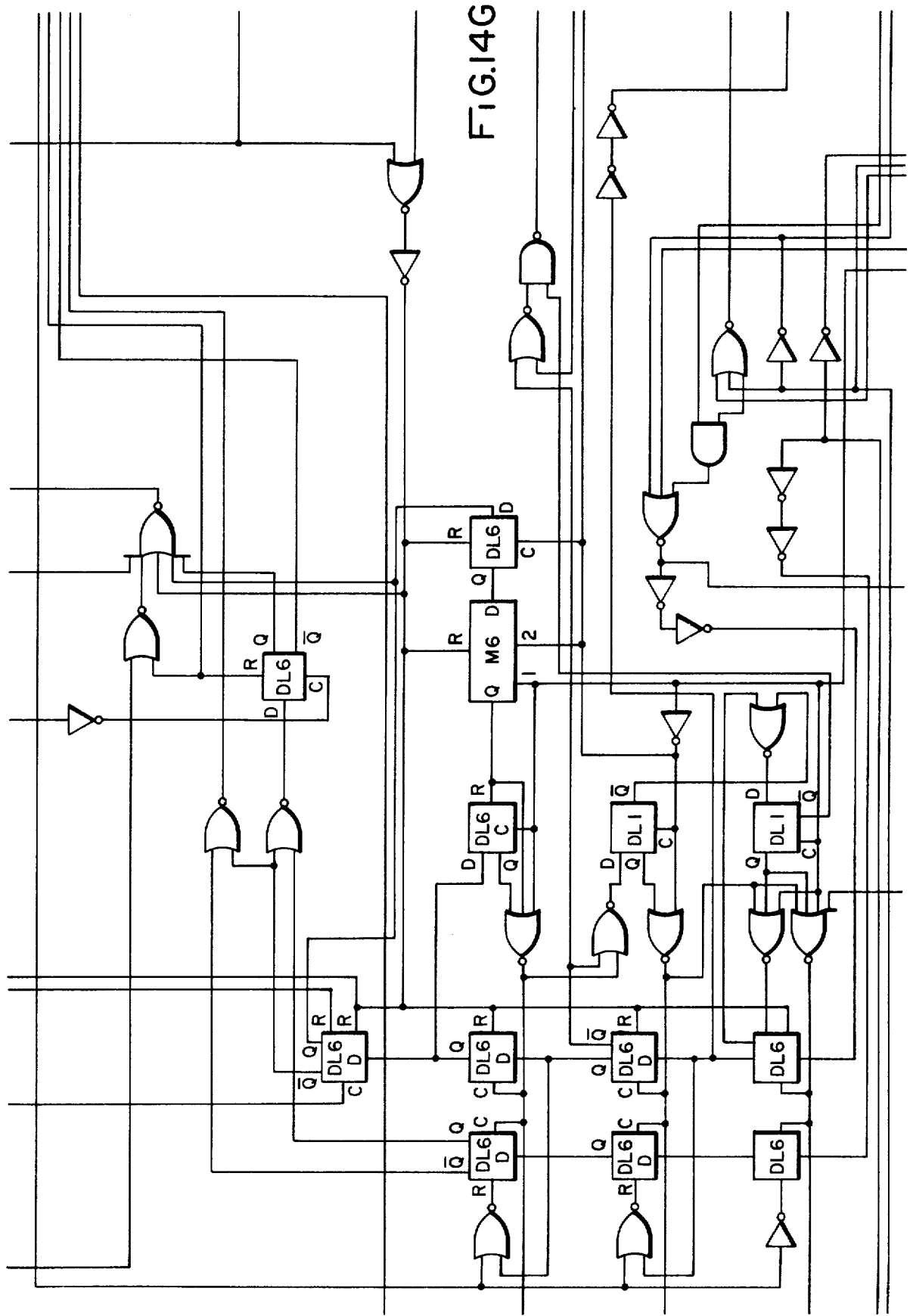

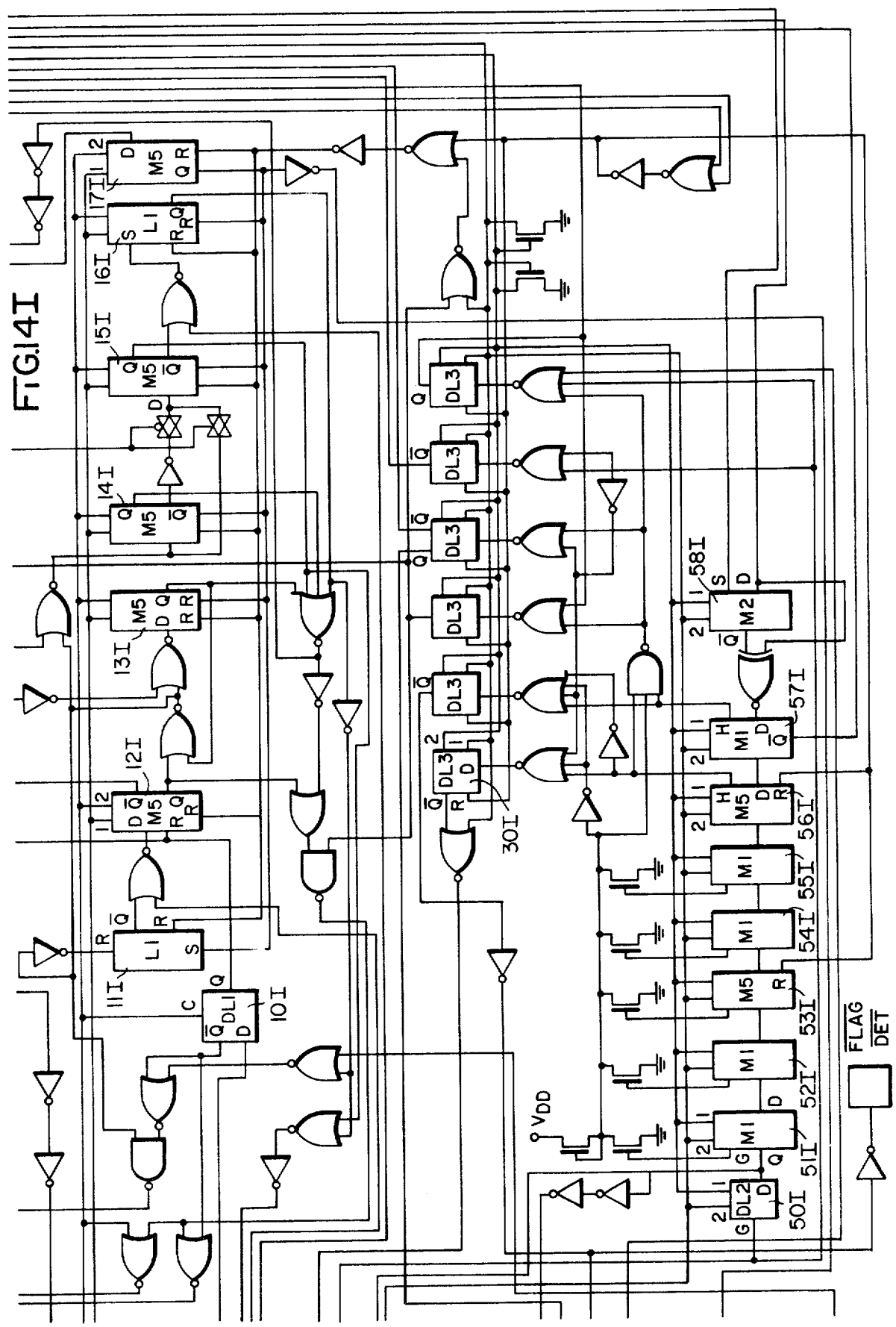

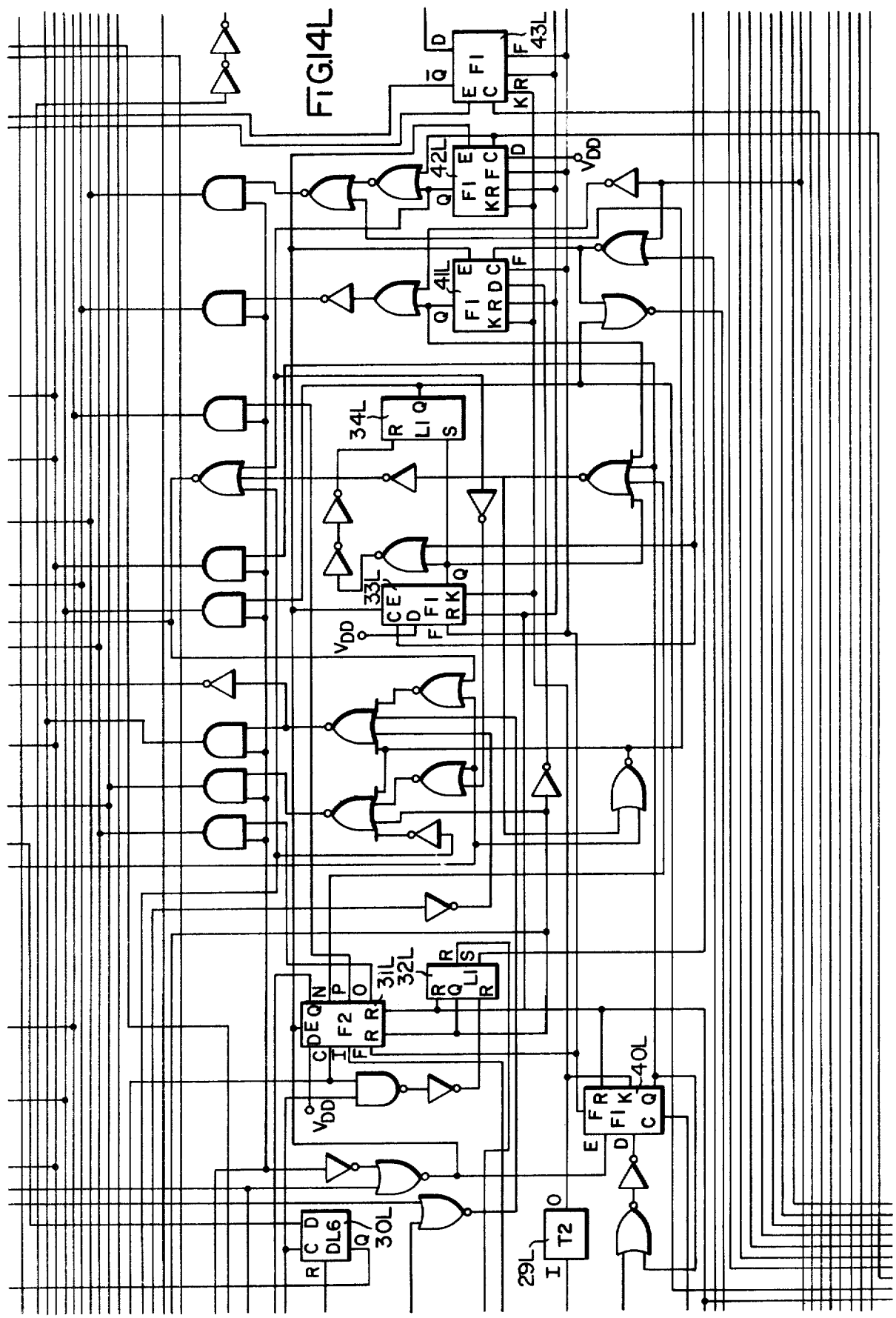

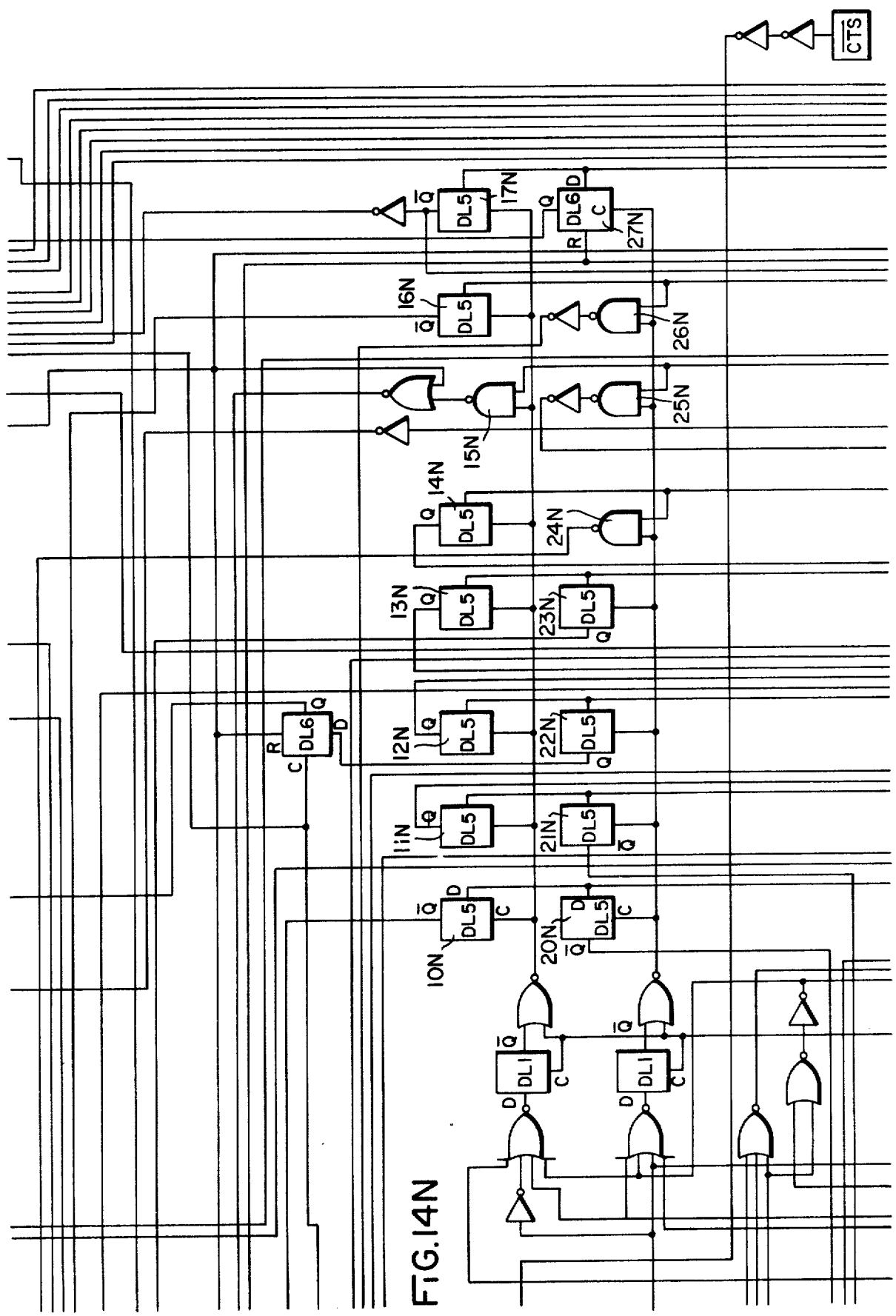

# #

DL5

DL6

DL7

DL8

DL9

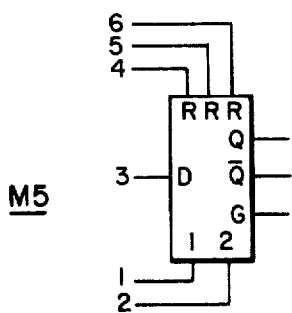
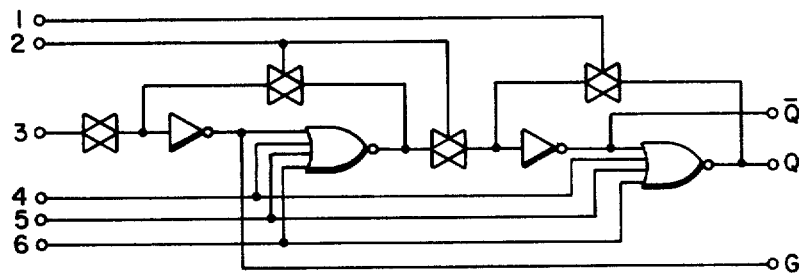
FIG.32A  FIG.32B
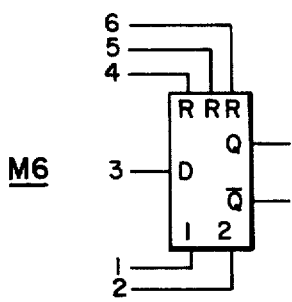
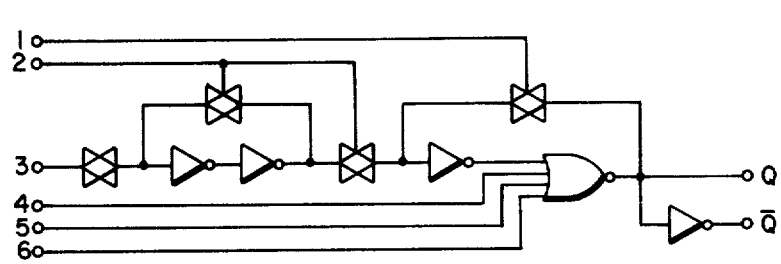
FIG.33A  FIG.33B
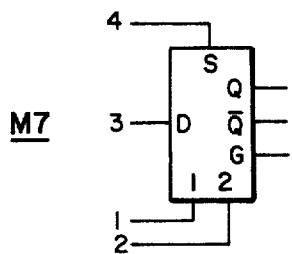
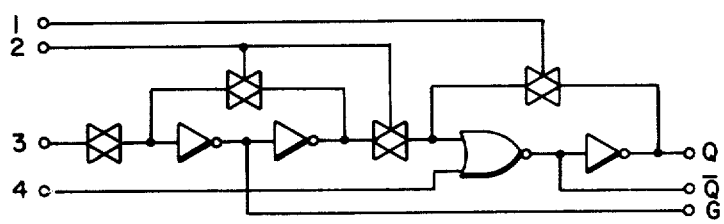
FIG.34A  FIG.34B
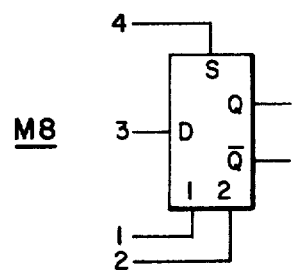
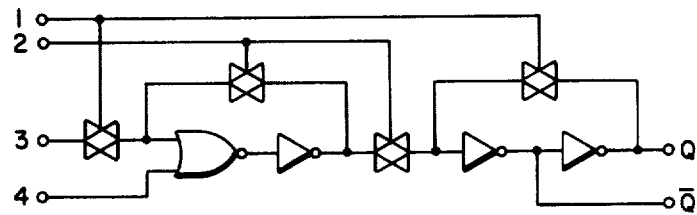
FIG.35A  FIG.35B

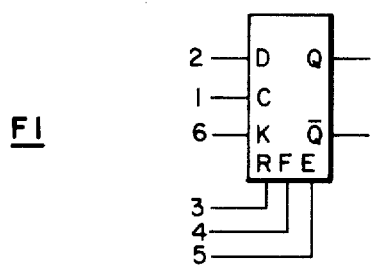
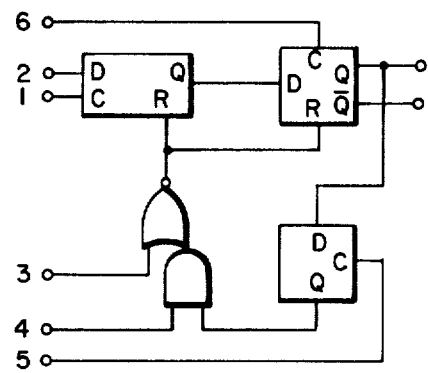
FIG.36A　　　　　　　FIG.36B
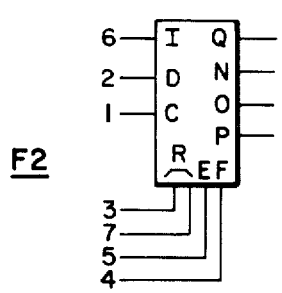
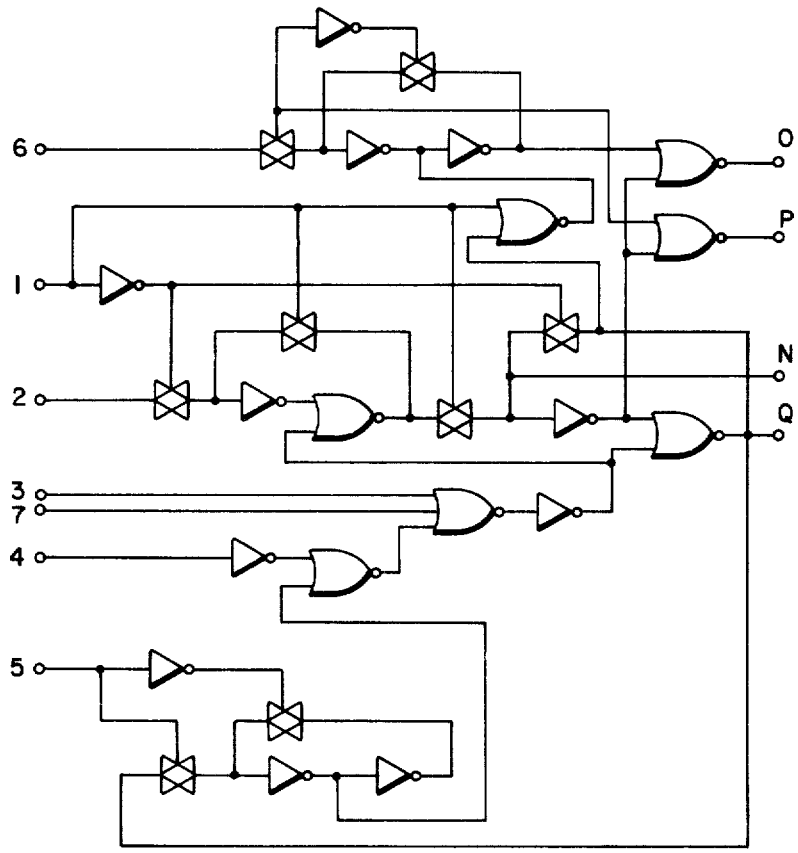
FIG.37A　　　　　　　FIG.37B

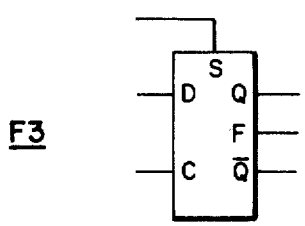
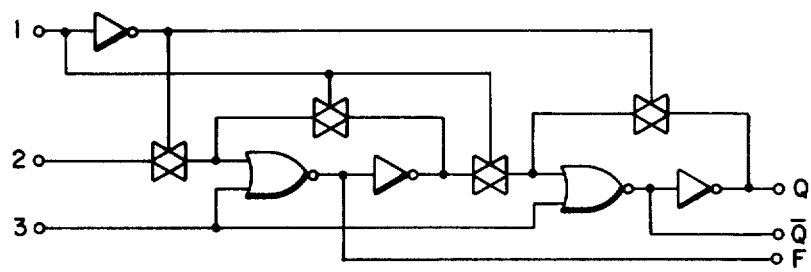
FIG.38A    FIG.38B
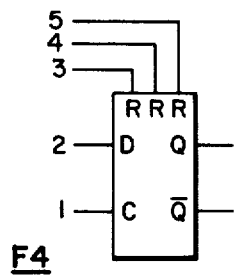
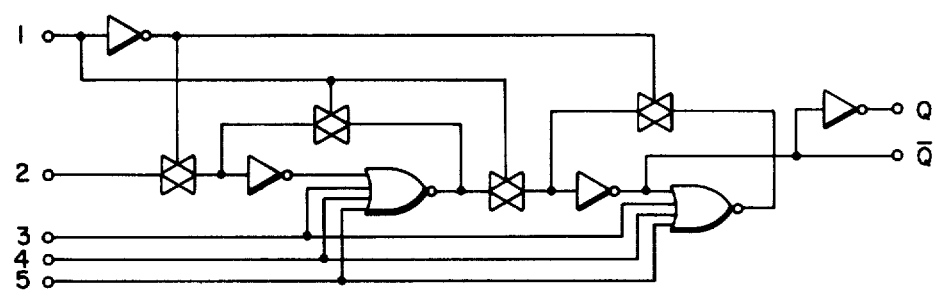
FIG.39A    FIG.39B
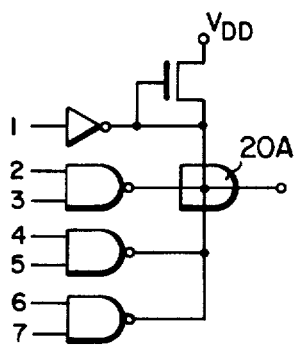
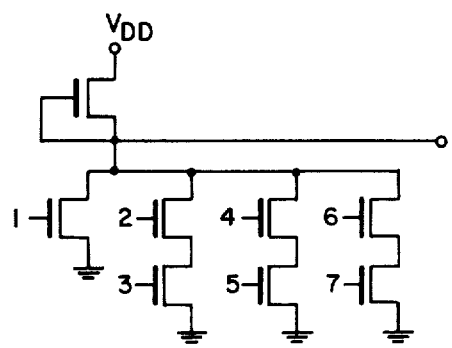
FIG.40A    FIG.40B
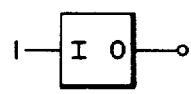
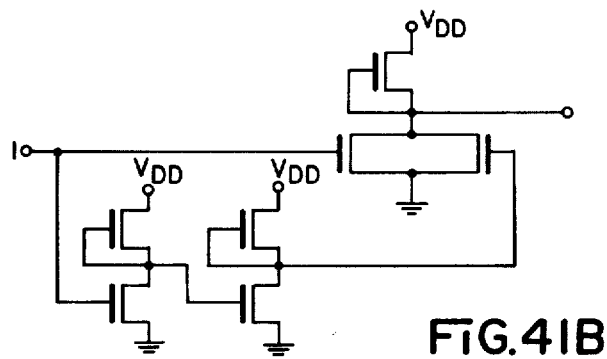
FIG.41A    FIG.41B

ADVANCED DATA LINK CONTROLLER

BACKGROUND OF THE INVENTION

This invention relates generally to data communications and, in particular, to an LSI single-chip data link controller for interfacing between a microcomputer or terminal and a data communications link operating under the SDLC, HDLC, or ADCCP data communications protocols (see below for an explanation of such protocols).

The establishment of interconnecting computer networks and the increasing use of remote intelligent terminals has brought about an integration of computer and serial data communications. This integration has become a part of almost every discipline utilizing computer technology including private business, governmental agencies, universities, and even the private home.

To facilitate the exchange of information between two stations (computers and/or terminals) in a communications network a data link is used. As shown in FIG. 1, the link includes the communications channel, modems 1 and 2, and data terminal equipment (DTE) 3 and 4, the latter being the subject of the present invention. The present invention has been commercially available from Motorola, Inc. since July, 1977 in the form of the MC6854, and more specifically known as the Advanced Data Link Controller (ADLC). The ADLC performs the serial-to-parallel and parallel-to-serial interface between the communications link and the computer or terminal.

There are two basic types of data link configurations: (1) point-to-point and (2) multipoint. As shown in FIGS. 2A, 2B, and 4, in a point-to-point link one or more secondary stations are each connected directly to a primary station. All information transfer occurs between a primary station and a secondary station. The transmission can be either half-duplex (two-way alternate) as shown in FIG. 2A, or full-duplex (two-way simultaneous) as shown in FIG. 2B, and it can occur over a non-switched direct connection or through a central office switching network, as shown in FIG. 4.

Multipoint configurations take the form of a single primary station connected to many secondary stations in a parallel arrangement, as illustrated in FIG. 3. The primary station controls all data transfers over the link, and all communications are between the primary and a secondary. It is possible, however, for one station to both act as a primary in one link and as a secondary in another, as illustrated in FIG. 5. In such configuration the data link can be either half-duplex or full-duplex.

The loop configuration, illustrated in FIG. 6, is a special type of point-to-point configuration in which one or more secondaries are connected to the communications link in serial fashion. Each secondary station is a repeater of the up-loop data to the next down-loop secondary station. Loop operation requires the data link to operate in a half-duplex, one direction only mode. Signals sent out on the loop by the primary station are relayed from station to station. This type of configuration finds widespread application in multi-terminal systems (e.g. department store terminals, airline terminals, local insurance company facilities, etc.).

In an asynchronous data communications link serial data is transmitted in a nonclocked fashion. That is, the serial data link between two DTE's (FIG. 1) does not have an associated clock. It is the responsibility of the DTE to synchronize each incoming data character with its internal system. The DTE requires that each character received include a special code which allows it to establish this synchronization. In a typical transmission the communications line is kept in a known state (usually a mark idle consisting of a succession of binary 1's) when information is not being transmitted. Each character when transmitted is preceded by a start bit indicating to the serial interface circuit the beginning of a character and is followed by one or more stop bits signifying the end of the character. Once a character has been sent the data line returns to mark idle waiting for the next character. The start and stop bits of the asynchronous character are used to establish both character and bit synchronization for the receiver DTE.

The asynchronous character can vary in length from five to seven bits (eight bits if parity is used) depending on the type of code used. The distinctive characteristic of this form of transmission is that the data stream is not synchronized (i.e., is asynchronous) with a clock.

In a synchronous data communications link serial data is transmitted in a clocked fashion. That is, clock timing is included with the data stream that is sent to the serial interface circuit (DTE) to establish bit-by-bit synchronization. Since the data is already synchronized there is no need to include start and stop bits with each transmitted character as in asynchronous operation. The idle mode for a synchronous data link is determined by the individual system and can include either mark idling or the repetitive transmission of a special character. Information is typically sent in blocks or frames which can contain many characters. These blocks of information are normally preceded by one or more sync characters used to provide block or frame synchronization.

If a modem is used in a synchronous data link it usually is of the synchronous type. The transmitting side of the modem requires a clock synchronized with the data stream to be supplied to it from the DTE. The receiver side of the modem supplies the required synchronous clock along with the data stream to the DTE.

Asynchronous operation is normally used when the information transmission is irregular (e.g., from a teletype or terminal), whereas synchronous operation is used when the information flow is steady (e.g., between intelligent terminals or computers). The primary advantage of synchronous transmission is the increased efficiency of the communication channel through the elimination of start and stop bits for each character.

To allow communications in an orderly fashion between various computers and terminals in a data link, a uniform method of sending and receiving information is required. This uniformity is obtained from a well-defined protocol (set of rules) used for management of the data link in the communication system. Protocols are used to perform such functions as establishing and terminating the conversation between two stations, identifying the sender and receiver, acknowledging received information, and initializing stations. The exact procedure and function performed depends on the protocol used.

Protocols can be classified as Binary Synchronous Communications (Bisync) Protocols or Bit Oriented Protocols (BOP). Bisync was introduced by IBM in 1966. The Bit Oriented Protocols comprise the Synchronous Data Link Control (SDLC) protocol introduced by IBM in 1973, the High Level Data Link Control (HDLC) protocol proposed by IBM in 1971 for international data communications, and the Advanced Data Communications Control Procedure (ADCCP) introduced by the American National Standards Institute in 1973.

In Bisync information is transferred in the form of a block consisting of two or more sync characters, an address, control characters, an information field, and an error checking code. Special block control characters are used to effect orderly operation of the data link. A restriction on the information field is that a bit sequence that matches any of the block control characters cannot be allowed to occur, since this would be interpreted as a control character rather than as data. Transmission of information in Bisync is limited to half-duplex (two-way alternate). This results from the stop-and-wait procedure which characterizes Bisync. Once a communications channel is established and the transmitter sends one block it stops and waits for an acknowledgement (ACK) signal before sending another block. The receiver, having acquired the block, checks for errors and then sends an ACK control character to the transmitter indicating that the block is correct or a NACK control character to indicate an error.

In contrast to Bisync, which is character-oriented, BOP assigns specific meaning to the individual bits of each field of the data stream. All communications in a BOP system are in the form of frames of uniform format. The frame comprises a number of fields each having a definite location and precise meaning, as will be described below. There are only three characters (beginning/ending frame, abort, and go-active-on-poll) that control the data flow on the communications link. A zero-bit insertion technique ensures that these three character codes never occur inside a frame, thus allowing complete code transparency. This considerably simplifies the code bookkeeping as compared with Bisync.

In addition, an implied acknowledgement technique used in BOP enables frame acknowledgement information to be included within a frame primarily transferring data to a station. This is accomplished by assigning identification numbers to received and transmitted frames called sequence numbers N(R) and N(S). These numbers contain information pertaining to the number of frames transmitted and received by the individual station. By checking these numbers the station can compare the number of received frames with the number of transmitted frames and take appropriate recovery action if a discrepancy exists. Thus it is not necessary to operate in a stop-and-wait mode and send frames containing acknowledgement information only (as in Bisync), and BOP accordingly operates in a full-duplex (two-way simultaneous) mode. The ability to operate in full-duplex mode is a major advantage of BOP over Bisync. BOP can also operate in half-duplex mode, although much of its inherent power is thereby lost.

Other advantageous features of BOP include the fact that BOP is not restricted to any one type of data link configuration. Transmission can occur point-to-point, multipoint, or in a loop, and it can use telephone lines (swtiched or non-switched), radio links, microwave links or any other system used for transmitting serial data. In addition, BOP is code independent. It is even possible for more than one code to be used on the same data link without sacrificing throughput or accuracy. This feature is useful in networks comprising products of different manufacturers.

As mentioned above, under BOP all transmissions—commands, control, and data—are transmitted in a format called a frame, depicted in FIG. 7. Each field has positional significance and when present must occur in the sequence indicated in the diagram.

The flag is the frame delimiter indicating the beginning and ending of a frame and has a unique binary pattern of 01111110. It provides frame synchronization and can also be used for time-fill purposes when the data link is not transmitting information. This pattern cannot be allowed to occur anywhere within the internal fields of a frame, since this would mistakenly be interpreted as a flag.

A frame is identifiable because it is bounded by flags and contains only non-flag bit patterns. This is not a restriction on frame content as BOP requires that whenever a continuous pattern of five 1's is detected within a frame a 0 is automatically inserted by the transmitter. Thus no interframe pattern of 01111110 (a flag) is ever transmitted. This is called the zero-bit insertion technique. The receiver, after detecting the opening flag, removes each 0 that follows a 011111 bit pattern, restoring the data to its original form. Zero-bit insertion gives the interframe data complete transparency.

The address field always contains the address of the secondary station. If the frame is a command (primary originated) the address identifies the secondary station being commanded. If the frame is a response (secondary answering) the address identifies to the primary which secondary is responding. Some systems can provide for special addresses such as a global address (all 1's) which can be used to address all secondary stations. In SDLC the address is a single eight-bit character allowing 256 different addresses. However, in ADCCP and HDLC this field can be extended to N octets (eight-bit bytes).

The control field is a multifunctional character that not only is responsible for the commands and responses required by the data link, but also performs much of the bookkeeping chores needed. It (1) defines the type of frame (information, supervisory, or non-sequenced), (2) keeps track of how many frames have been sent and received, and (3) issues commands and control information.

An information frame is distinguished by the first bit of the control field being equal to a binary 0. Supervisory frames are used to acknowledge the reception of error-free frames, to request retransmission of information frames, and to inhibit the sending of information frames. Non-sequenced frames are used for data link management. Data link management includes activating and initializing secondary stations, controlling the response mode of secondary stations, and reporting procedural errors (not recoverable by retransmission). SDLC protocol does not allow for control field extension, whereas both HDLC and ADCCP have control field extension modes.

The information field contains the data to be transferred over the data link. Supervisory frames do not contain information fields, and only selected non-sequenced frames contain information fields. Since it is code-independent the information field is unrestricted as to its content and the zero-bit insertion technique gives the field complete transparency to the data link control characters. SDLC does not restrict the information field length but requires that it be a multiple of eight bits. ADCCP and HDLC do not restrict the information field to multiples of eight bits but allow a completely unrestricted field length. The length of the information field is normally limited by the system (such as the size of the station I/O buffer).

In BOP all frames contain a sixteen-bit error-checking sequence which precedes the closing flag. These sixteen bits result from a mathematical computation on the binary value of all bits (excluding inserted 0's) within the frame (excluding the flag) and are used to validate transmission accuracy. The transmitter performs the computation on the address, control, and information (if present) fields, atttaches the calculated sixteen-bit FCS field, and sends it out. The receiving station performs the same computation on the incoming data stream and checks its result with the FCS field sent by the transmitting station. If no error is found the frame is accepted. If an error is found the receiving station goes through its error recovery sequence which may include a retransmission of the frame.

In BOP an abort command is a system command in which a station sending a frame can end the transmission and be sure the receiving station ignores the frame. The transmitting station aborts by sending eight consecutive binary 1's (unintentional abort caused by 1's in the information field is prevented by zero insertion). The abort pattern not only closes the frame without an FCS field or an ending flag, but it also terminates the continuity of the data link. The primary station retains control. Either a primary station or secondary station may abort. The abort pattern may be followed by a pattern of seven (minimum) additional 1's (a total of at least fifteen contiguous 1's which idles the data link, or it may be followed by a flag. An aborting secondary station may not start another frame until it receives a command to do so from the primary station.

In BOP the primary station is solely responsible for the orderly flow of information on the data link. All data flow is initiated by the primary station, and all transmissions go to or from it. The primary station must check for responses to its command. Two basic time-outs are available to a primary station for this purpose: (1) idle detect and (2) non-productive receive.

When the primary station polls a secondary station, it expects a response within a certain period of time. The data link is normally in the idle state during this time (an exception occurs if a duplex secondary station is transmitting). If the idle state continues past the time allotted for a response, it is cause for recovery action by the primary.

The interval allowed before initiating recovery action includes propogation time between primary-secondary and secondary-primary, processing time at the secondary, and "clear-to-send" time at the secondary station.

The absence of a response does not necessarily result in idle detect; a received signal may be present but unintelligible. This situation is called "nonproductive receive". The timeout for nonproductive receive should be long enough to allow the transmitting secondary station the time it would normally use to pause and wait for confirmation. A period of from 3 to 20 seconds (or more) is the usual range. Continuation of nonproductive receive conditions beyond that time indicates a mishap at the secondary station that is not recoverable by retransmission.

Retries are unrequested transmissions; they result from timeouts. The counting of retry or retransmission attempts is not specified by SDLC procedures. Customarily, they are counted by the DTE, and at some planned number "n", the attempt is reported as non-recoverable at the data link level. If a transmission is not received accurately by a receiving station an error condition results. If this error occurs as a result of poor conditions on the data lines the data may be recoverable by retransmission. If the error occurs due to other reasons, retransmission may not help.

Operation in a loop configuration requires a set of protocol rules by which a secondary station can place itself on-loop (connect its transmitter output to the loop), go active on the loop (start transmitting its own data on the loop), and go off-loop (disconnect its transmitter output). This set of rules allows each secondary station to transmit its information to the primary station in an efficient, orderly manner without interference from other secondary stations.

Reference is made to IBM publication GA27-3093-1 entitled "IBM Synchronous Data Link Control—General Information", published in 1974 by IBM, for further information concerning Bit Oriented Protocols in general and SDLC in particular.

SUMMARY OF THE INVENTION

The increased use of Bit-Oriented-Protocols has resulted in a need for a low-cost, high speed LSI chip that can accommodate the three major BOP protocols.

Accordingly, it is an object of the present invention to provide a data link controller which accommodates the three major types of Bit-Oriented-Protocols.

It is a further object of the present invention to provide a data link controller having improved frame boundary control.

It is another object of the present invention to provide a data link controller having improved word length control circuitry.

It is also an object of the present invention to provide a data link controller having a multi-byte FIFO register in its transmitter and receiver sections for providing high data transfer rate.

It is an object of the present invention to provide a data link controller having improved zero insertion and zero deletion circuitry.

It is yet another object of the present invention to provide a data link controller having improved flag detection circuitry.

It is an object of the present invention to provide a data link controller having improved frame synchronization circuitry.

It is also an object of the present invention to provide a data link controller with a self-testing capability.

It is still another object of the present invention to provide a data link controller with the capability of putting individual stations on-loop or off-loop when operating in a loop configuration.

It is an object of the present invention to provide a data link controller having a plurality of multi-bit status registers, wherein the bits thereof may be read in a prioritized manner.

It is also an object of the present invention to provide a data link controller having improved circuitry for transferring partial bytes or variable length bytes.

It is an object of the present invention to provide a data link controller with circuitry in the transmitter section for automatically opening and closing frames.

It is yet another object of the present invention to provide a data link controller with improved circuitry for handling interrupts and aborts.

It is an object of the present invention to provide a data link controller having improved direct memory access (DMA) control circuitry.

It is also an object of the present invention to provide a data link controller with improved modem control circuitry.

These are other objects of the invention and achieved in accordance with a preferred embodiment of the invention by providing an advanced data link controller (ADLC) in LSI form on a single chip implemented in MOS technology and comprising an eight-bit data bus interface for communicating address, control, and data information between the ADLC and a microcomputer or terminal; four eight-bit control registers; two eight-bit prioritizable status registers; chip select circuitry; a transmitter section comprising a three-byte FIFO register, zero insertion circuitry, frame check sequence generator, and flag/abort generator, for transmitting such information in serial form to a communications link; and a receiver section comprising a three-bit FIFO register, zero deletion circuitry, frame check sequence checker, flag/abort/idle detection circuitry; and loop control circuitry for receiving such information in serial form from a communications link.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

FIGS. 1—6 illustrate typical data link configurations in which the present invention may be employed, and in particular:

FIG. 1 illustrates the primary components of a point-to-point data link configuration.

FIG. 3 illustrates full-duplex operation in a multipoint, non-switched configuration.

FIG. 4 illustrates half-duplex operation in a point-to-point, switched configuration.

FIG. 5 illustrates half-duplex operation in a complex multi-point configuration in which one station serves both primary and secondary functions.

FIG. 6 illustrates a typical loop configuration.

FIGS. 14A-14O together illustrate the detailed logic diagram of a presently preferred embodiment of the ADLC, and in particular:

FIG. 14A illustrates the Data Bus Interface circuitry and Address Control circuitry;

FIG. 14C illustrates the Transmitter FIFO Registers;

FIG. 14G illustrates the Transmitter FIFO Control circuitry;

FIG. 14I illustrates the Receiver Control circuitry, Receiver Sequence Control circuitry, Receiver Data Decoder, Zero Deletion circuitry, and a portion of the Receiver Data Buffer Register;

FIG. 14L illustrates the Receiver Status Register (Status Register #2);

FIG. 14N illustrates a portion of the Control Register circuitry (Control Registers #2 and #4); and FIG. 14O illustrates the Loop Control circuitry, and another portion of the Control Register circuitry (Control Registers #1 and #3).

FIGS. 15–42 show the logic as used in FIGS. 14A-14O, the A designation thereof refers to the logic symbols whereas the B designation thereof refers to the logic diagrams.

DETAILED DESCRIPTION OF THE INVENTION

Table of Contents

ADLC Frame Format
ADLC Overall Structure
    Pin-Out Arrangement
    Input, Output, and Power Supply Signals Interface with MPU Communications Link Signals
ADLC Internal Registers
    Control Register #1

Control Register #2
Control Register #3
Control Register #4
Status Register #1
Status Register #2
Prioritized Status Mode
Receiver Data FIFO (Rx FIFO)
Transmitter Data FIFO (Tx FIFO)
Detailed Logic Diagram
Operation of Preferred Embodiment
Loop Mode Operation
Loop-Back Self-Test Mode
Modem Control
Direct Memory Access (DMA) Control
Programming the ADLC
NRZ/NRZI Codes
Glossary The Advanced Data Link Controller (ADLC) performs the complex interface function between an MPU or terminal data bus and a synchronous communications link that employs Bit Oriented Protocols (BOP). As stated earlier, the ADLC is completely compatible with such protocols as SDLC, HDLC, and ADCCP. The ADLC automatically performs many of the functions required by these protocols, thus reducing the amount of software required and increasing the data throughput rate. The ADLC performs the communications interface function for both primary and secondary stations in stand-alone, polling, and loop configurations. The ADLC can be used with a synchronous modem or without one so long as a synchronous clock is provided.

ADLC Frame Format

Figure 7:
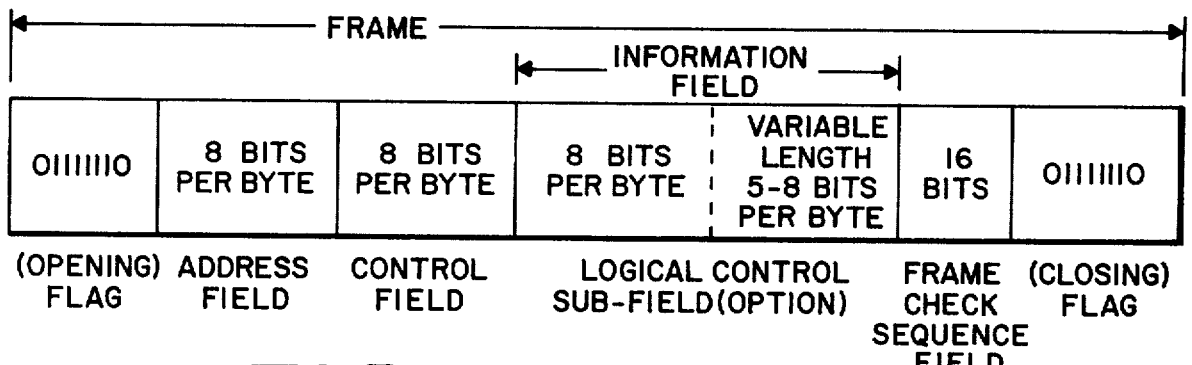
FIG. 7 illustrates the protocol-defined frame format with which the present invention transmits and receives information.

With reference to FIG. 7, the BOP-defined frame format, with which the ADLC transmits and receives data, will now be discussed as it relates specifically to the ADLC.

All frames start with an opening flag (F) and end with a closing flag (F). Between the opening flag and closing flag, the frame contains an address field, control field, information field, and frame check sequence field, each of which will now be discussed in turn.

FLAG (F)—The flag is the unique binary pattern 01111110. It provides the frame boundary and a reference for the position of each field of the frame.

The ADLC transmitter generates a flag pattern internally, and the opening and closing flags are appended to the frame automatically. Two successive frames can share one flag for the closing flag of the first frame and for the opening flag of the next frame, if the FF/F control bit in Control Register #4 is reset, as will be described below.

Figures 8, 9:
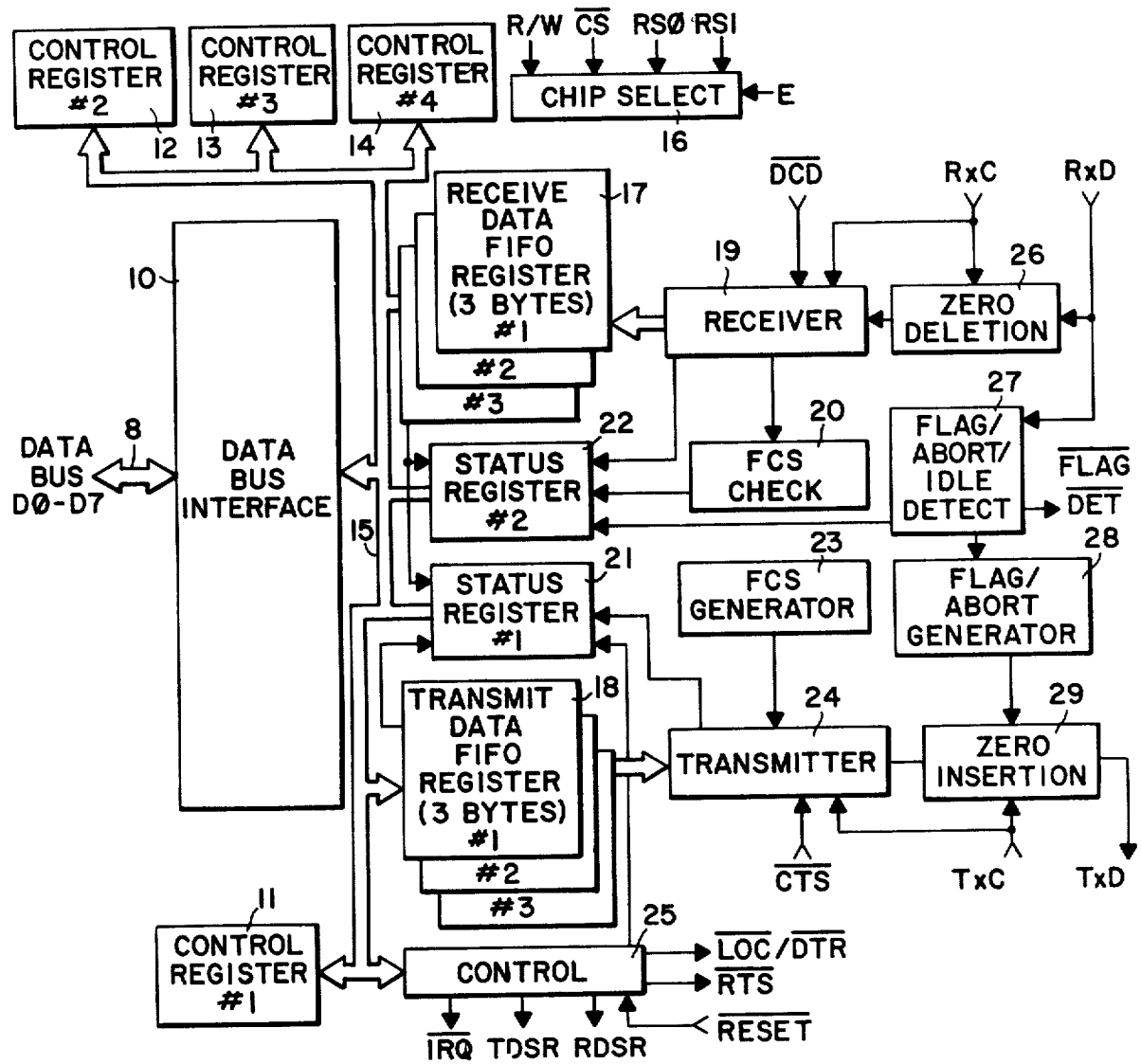
FIG. 8 shows a block diagram illustrating the primary components of the present invention.
FIG. 9 illustrates the semiconductor chip pin-out arrangement of the present invention.

The ADLC receiver searches for a flag on a bit-by-bit basis and may recognize a flag at any time. The receiver establishes the frame synchronization with every flag. The flags mark the frame boundary and reference for each field, but they are not transferred to the Rx FIFO Register (FIG. 8). The detection of a flag is indicated by the $\overline{\text{Flag Detect}}$ output going low and by a status bit being set high in Status Register #1.

ORDER OF BIT TRANSMISSION—Address, control, and information field bytes are transferred between the MPU or terminal and the ADLC in parallel by means of Data Bus 8 in FIG. 8. Data Bus 8 comprises eight lines D$\phi$–D7. The bit input on D$\phi$ (pin 22 in FIG. 9) is serially transmitted first, and the first serially received bit is transferred to the MPU on D$\phi$. The FCS field is transmitted and received most significant bit (MSB) first.

ADDRESS (A) FIELD—The eight bits following the opening flag are the address (A) field. The A-field can be extended if the Auto-Address Extend Mode is selected in Control Register #3. In the Address Extend Mode, the first bit (bit 0) in every address octet becomes the extend control bit. When this bit is 0, the ADLC assumes another address octet will follow, and when the bit is 1, the address extension is terminated. A "null" address (all 0's) does not extend. In the receiver, the Address Present status bit distinguishes the address field from other fields. When an address byte is available to be read in the Rx FIFO register, the Address Present status bit is set and causes an interrupt (if enabled). The Address Present bit is set for every address octet when the Address Extend Mode is used.

CONTROL (C) FIELD—The eight bits following the address field are the control (link control) field. When the Extended Control Field bit in Control Register #3 is selected, the C-field is extended to sixteen bits.

INFORMATION (I) FIELD—The I-field follows the C-field and precedes the FCS field. The I-field contains "data" to be transferred but is not necessarily contained in every frame. The word length of the I-field can be selected from five to eight bits per byte by control bits in Control Register #4. The I-field continues until it is terminated by the FCS and closing flag. The receiver has the capability to handle a "partial" last byte. The last information byte can be any word length between one and eight bits. If the last byte in the I-field is less than the selected word length, the receiver right-justifies the received bits, fills the remaining bits of the Receiver Shift Register with 0's, and transfers a full byte to the Rx FIFO. Irregardless of the selected byte length, the ADLC transfers eight bits of data to the Data Bus 8. Unused bits for word lengths of five, six, and seven bits are zeroed.

LOGICAL CONTROL (LC) FIELD—When the Logical Control Field Select bit in Control Register #3 is selected, the ADLC separates the I-field into two sub-fields. The first sub-field is the Logical Control field and the following sub-field is the "data" portion of the I-field. The logical control field is eight bits and follows the C-field, which is extendable by octets, if it is selected. The last bit (bit 7) is the extend control bit, and if it is a 1, the LC-field is extended one octet. (Note: Hereafter the expression "information field" or "I-field" will be used to mean the data portion of the information field, and it excludes the logical control field. This is done in order to maintain the meaning of "information field" consistent as specified in the SDLC, HDLC, and ADCCP protocols.)

FRAME CHECK SEQUENCE (FCS) FIELD—The sixteen bits preceding the closing flag are the FCS field. The FCS is the "cyclic redundancy check character" (CRCC). The polynomial $x^{16}+x^{12}+x^5+1$ is used both for the transmitter and receiver. Reference may be had to W. W. Peterson, *Error Correcting Codes*, MIT Press, 1961, for a thorough explanation of error-correcting techniques. The ADLC transmitter and receiver polynomial registers are initialized to all 1's prior to calculation of the FCS. The transmitter calculates the FCS on all bits of the address, control, logical control (if selected), and information fields, and transmits the complement of the resulting remainder as FCS. The receiver performs a similar computation on all bits of the address, control, logical control (if selected), information, and received FCS fields and compares the result to FOB8 (Hexadecimal). If the result matches FOB8, the Frame Valid status bit is set in Status Register #2. If the result does not match, the Error status bit is set. The FCS generation, transmission, and checking are performed automatically by the ADLC transmitter and receiver. The FCS field is not transferred to the Rx FIFO.

INVALID FRAME—Valid frames contain at least the A-field, C-field and FCS field between the opening flag and the closing flag. When invalid frames are received, the ADLC handles them as follows:

(1) A short frame which has less than 25 bits between flags—The ADLC ignores the short frame and its reception is not reported to the MPU.

(2) A frame less than 32 bits between the flags, or a frame 32 bits or more with an extended A-field or C-field that is not completed—This frame is transferred into the Rx FIFO, and the FCS/IF Error status bit in Status Register #2 is set, indicating the reception of the invalid frame.

(3) Aborted Frame—A frame which is aborted by receiving an abort or Data Carrier Detect (DCD) failure is also an invalid frame. Refer to "ABORT" and to the description of the DCD status bit below ("Status Register #2").

ZERO INSERTION AND ZERO DELETION—Zero insertion and deletion, which allow the content of the frame to be transparent, are performed by the ADLC automatically. A binary 0 is inserted by the transmitter after any succession of five 1's within a frame (A, C, LC, I, and FCS field). The receiver deletes a binary 0 that follows five successive 1's within a frame.

ABORT—The premature terminating of a data link is called an "abort". The transmitter can abort a frame by sending at least eight consecutive 1's immediately after the Tx Abort control bit in Control Register #4 is set to a 1. (Tx FIFO is also cleared by the Tx Abort control bit at the same time.) The abort can be extended up to (at least) sixteen consecutive 1's, if the Abort Extend control bit in Control Register #4 is set when an abort is sent. This feature is useful to force mark idle transmission. Reception of seven or more consecutive 1's is interpreted as an abort by the receiver. The receiver responds to a received abort as follows:

(1) An abort in an "out of frame" condition—An abort during the idle or time fill has no meaning. The abort reception is indicated in Status Register #2 as long as the abort condition continues, but neither an interrupt nor a stored condition occurs. The abort indication is suppressed after fifteen or more consecutive 1's are received (Received Idle status is set in Status Register #2).

(2) An abort "in frame" after less than 26 bits are received after an opening flag—Under this condition, no field of the aborted frame has been transferred to the MPU yet. The ADLC clears the aborted frame data in the Rx FIFO and clears flag synchronization. Neither an interrupt nor a stored status occurs. The status indication is the same as (1) above.

(3) An abort "in frame" after 26 bits or more are received after an opening flag—Under this condition, some fields of the aborted frame may have already been transferred onto the Data Bus. The abort status is stored in Status Register #2, and the data of the aborted frame in the ADLC is cleared. The synchronization is also cleared.

IDLE AND TIME FILL—When the transmitter is in an "out of frame" condition (the transmitter is not transmitting a frame), it is in an idle state. Either a series of contiguous flags (time fill) or a mark idle (consecutive 1's on a bit-by-bit basis) is selected for the transmission in an idle state by the Flag/Mark Idle control bit in Control Register #2. When the receiver receives fifteen or more consecutive 1's, the Receive Idle status bit is set and causes an interrupt. The flags and mark idle are not transferred to the Rx FIFO.

ADLC Overall Structure

With reference now to FIG. 8, a block diagram illustrating the primary components of the ADLC is given. The ADLC comprises a Data Bus Interface 10 for communicating data in parallel with an MPU or terminal over Data Bus 8 comprising eight individual lines D$\phi$–D7. From Data Bus Interface 10 data is transferred to and from the internal registers of the ADLC over internal bus 15. The ADLC comprises four write-only control registers 11–14 and two read-only status registers 21 and 22. Information is written into control registers 11–14 by the MPU to set up the operating mode of the ADLC. For example, during an initialization procedure the control registers are used to set up a station for the proper mode (e.g. word length, 2 byte/1 byte transfer, type of idle mode, loop/nonloop mode). The control registers are also used during the transmission and reception of information for such things as transmitting abort, loop control, and field extensions, and for clearing status registers 21 and 22.

Information is written into status registers 21 and 22 by the ADLC to indicate to the MPU specified operating conditions of the ADLC (e.g. error conditions, receiver data available, transmitter FIFO available). The MPU can either monitor the status registers on a continuous basis or on an interim basis in response to an interrupt request from the ADLC. As explained below, these status registers can be prioritized so that certain higher priority conditions suppress lower priority conditions. Such prioritization capability enables faster interrupt operation and eliminates the necessity for providing this capability in a separate interrupt handler associated with the MPU.

The ADLC further comprises Chip Select circuitry 16 receiving as inputs thereto Read/Write (R/W), $\overline{\text{Chip Select}}$ ($\overline{\text{CS}}$), Register Select $\phi$ (RS$\phi$), Register Select 1 (RS1), and Enable Clock (E) inputs which will be described in greater detail below.

The ADLC further comprises a Transmitter section and a Receiver section. The transmitter section of the ADLC comprises Transmitter circuitry 24 responsive to Transmitter Clock (TxC) and $\overline{\text{Clear To Send}}$ ($\overline{\text{CTS}}$) inputs, FCS Generator circuitry 23, Zero Insertion circuitry 29 generating the Transmit Data (TxD) output, and Flag/Abort Generator circuitry 28. The Receiver section comprises Receiver circuitry 19 responsive to $\overline{\text{Data Carrier Detect}}$ ($\overline{\text{DCD}}$) and Receiver Clock (RxC) inputs, Zero Deletion circuitry 26 responsive to a Receiver Data (RxD) input, Flag/Abort/Idle Detect circuitry 27 generating a $\overline{\text{Flag Detect}}$ ($\overline{\text{FLAG DET}}$) signal, and FCS Check circuitry 20.

The Receiver and Transmitter sections of the ADLC each comprise a high-speed three-byte FIFO register 17 and 18, respectively. The Receive Data FIFO Register (RxFIFO) 17 buffers serial data received by the ADLC prior to transmitting it over internal parallel bus 15 to the Data Bus Interface 10. The Transmit Data FIFO Register (TxFIFO) 18 is a high speed three-byte data buffer between the internal parallel data bus 15 and the Transmitter 24. The Control section 25 of the ADLC comprises random logic for carrying out various of the internal control functions as well as specific interface operations required of the ADLC, such as Direct Memory Access (DMA) operations, interrupt request operations, loop operations, peripheral/modem control operations, and initialization operations.

PIN-OUT ARRANGEMENT

FIG. 9 illustrates the pin-out arrangement of the ADLC. The ADLC is operated from a single 5 volt D.C. supply, which is supplied to pin 14 in the form of $V_{DD}$. Pin 1 is connected to ground ($V_{SS}$). Each of the various inputs and outputs will be discussed in the next section below. The ADLC is available in 1.0 MHz, 1.5 MHz, and 2.0 MHz MPU bus speed versions, giving 660 KHz, 1.0 MHz, and 1.5 MHz serial data rates respectively. All of the inputs of the ADLC are high impedance and TTL compatible. All outputs of the ADLC are also compatible with standard TTL. Interrupt Request ($\overline{IRQ}$), however, is an open drain output with no internal pull-up.

INPUT, OUTPUT, AND POWER SUPPLY SIGNALS

Figure 10:
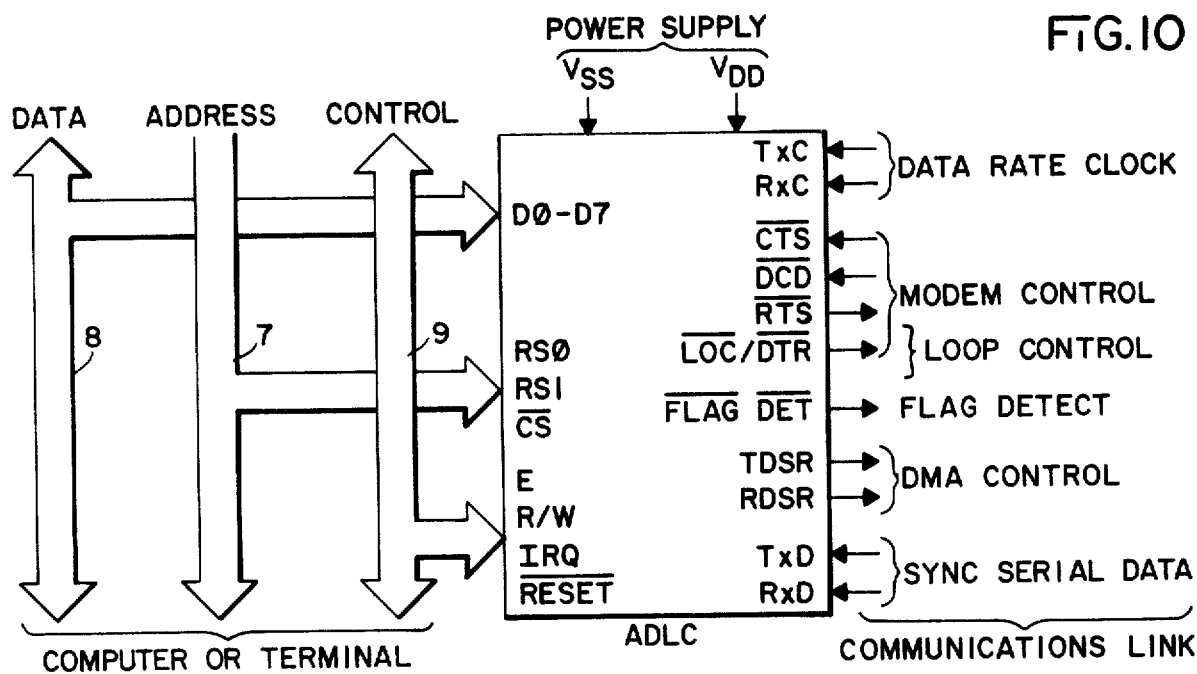
FIG. 10 illustrates the grouping by function of the various input, output, and power supply signals of the present invention.

FIG. 10 illustrates the grouping by function of the various input, output, and power supply signals of the ADLC to facilitate the reader's conceptual understanding of same. The 28 input/output signals to the ADLC are grouped below according to their respective functions.

INTERFACE WITH MPU

D$\phi$-D7—Bidirectional Data Bus—These Data Bus I/O ports allow data transfer between the ADLC and the system bus 8. The Data Bus drivers are three-state devices that remain in the high impedance (off) state except when the MPU performs an ADLC read operation.

RS$\phi$ RS1—Register Selects—When the Register Select inputs are enabled by (E·$\overline{CS}$), they select internal registers in conjunction with the Read/Write input and Address Control bit (Control Register #1, bit 0). Register addressing is defined in Table 1 appearing below under the heading "ADLC Internal Registers".

CS—Chip Select—An ADLC read or write operation is enabled only when the $\overline{CS}$ input is low and the E clock input is high. (E·$\overline{CS}$).

E—Enable Clock—E activates the address inputs ($\overline{CS}$, RS$\phi$ and RS1), the R/W input, and the data transfer on the Data Bus. E also moves data through the Tx FIFO and RX FIFO. E should be a free-running clock such as the Motorola MC6800 MPU system clock.

R/W—Read/Write Control Line—The R/W input controls the direction of data flow on the Data Bus when it is enabled by (E·$\overline{CS}$). When R/W is high, the I/O Buffer acts as an output driver, and it acts as an input buffer when R/W is low. It also selects the read only and write only registers within the ADLC.

$\overline{IRQ}$—Interrupt Request Output—$\overline{IRQ}$ is low if an interrupt situation exists and the appropriate interrupt enable has been set. The interrupt remains as long as the cause for the interrupt is present and the enable is set.

RESET—$\overline{RESET}$ Input—The $\overline{RESET}$ input provides a means of resetting the ADLC from a hardware source. In the "low" state, the $\overline{RESET}$ Input causes the following:
(1) Rx Reset and Tx Reset are set causing both the Receiver and Transmitter sections to be held in a reset condition; (2) The following control bits are reset: Transmit Abort, RTS, Loop Mode, and Loop On-Line/DTR; (3) All stored status conditions of the status registers are cleared; (4) Outputs $\overline{RTS}$ and $\overline{LOC}/\overline{DTR}$ go high, and TxD goes to the mark state (1's are transmitted).

When $\overline{RESET}$ returns "high" (the inactive state), the Transmitter and Receiver sections will remain in the reset state until Tx Reset and Rx Reset are cleared via the Data Bus under software control. The control register bits affected by $\overline{RESET}$ cannot be changed when $\overline{RESET}$ is "low".

COMMUNICATIONS LINK SIGNALS

The following groups of input/output signals are transmitted and/or received over the communications link.

Data Rate Clock

TxC—Transmitter Clock Input—The Transmitter shifts data on the negative transition of the TxC clock input. When the Loop Mode or Loop Back Self Test Mode is selected, TxC should be the same frequency and phase as the RxC clock. The data rate of the transmitter should not exceed the E frequency.

RxC—Receiver Clock Input—The Receiver samples the data on the positive transition of the TxC clock. RxC should be synchronized with data received externally.

Modem Control $\overline{CTS}$—Clear to Send Input—The $\overline{CTS}$ input provides a real-time inhibit to the TDRA status bit and its associated interrupt. The positive transition of $\overline{CTS}$ is stored within the ADLC to insure its occurrence will be acknowledged by the system. The stored CTS information and its associated IRQ (if enabled) are cleared by writing a 1 in the Clear Tx status bit or in the Transmitter Reset bit.

$\overline{DCD}$—Data Carrier Detect Input—The $\overline{DCD}$ input provides a real-time inhibit to the Receiver section. A high level on the $\overline{DCD}$ input resets and inhibits the Rx FIFO, but data in the Rx FIFO from a previous frame is not disturbed. The positive transition of $\overline{DCD}$ is stored within the ADLC to insure that its occurrence will be acknowledged by the system. The stored $\overline{DCD}$ information and its associated IRQ (if enabled) are cleared by means of the Clear Rx status control bit or by the Rx Reset bit.

$\overline{RTS}$—Request to Send Output—The Request-to-Send output is controlled by the Request-to-Send control bit in conjunction with the state of the Transmitter section. When the RTS bit goes high, the $\overline{RTS}$ output is forced low. When the RTS bit returns low, the $\overline{RTS}$ output remains low until the end of the frame. The positive transition of $\overline{RTS}$ occurs after the completion of a flag, an abort, or when the RTS control bit is reset during a mark idling state. When the $\overline{RESET}$ input is low, the $\overline{RTS}$ output goes high.

Loop Control $\overline{\text{LOC}}/\text{DTR}$—Loop On Line Control/Data Terminal Ready Output—The $\overline{\text{LOC}}/\overline{\text{DTR}}$ output serves as a $\overline{\text{DTR}}$ output in the Non-Loop Mode or as $\overline{\text{Loop Control}}$ output in the Loop Mode. When $\overline{\text{LOC}}/\overline{\text{DTR}}$ output performs the $\overline{\text{DTR}}$ function, it is turned on and off by means of the LOC/DTR control bit. When the LOC/DTR control bit is high the $\overline{\text{DTR}}$ output will be low. In the Loop Mode the $\overline{\text{LOC}}/\overline{\text{DTR}}$ output provides the means for controlling the external loop interface hardware to go on-line or off-line. When the LOC/DTR control bit is set and the loop has "idled" for seven bit times or more (R×D=01111111...), the $\overline{\text{LOC}}/\overline{\text{DTR}}$ output will go low (on-line). When the LOC/DTR control bit is low and the loop has "idled" for eight bit times or more, the $\overline{\text{LOC}}/\overline{\text{DTR}}$ output will return high (off-line). The $\overline{\text{RESET}}$ input being low will cause the $\overline{\text{LOC}}/\overline{\text{DTR}}$ output to be high.

Flag Detect $\overline{\text{FD}}$—Flag Detect Output—An output to indicate the reception of a flag and to initiate an external time-out counter for the Loop Mode operation. The $\overline{\text{FD}}$ output goes low for one bit time beginning at the last bit of the flag character, as sampled by the Receiver Clock (R×C).

DMA Control

TDSR—Transmitter Data Service Request Output—The TDSR Output is provided for DMA Mode operation and indicates (when high) that the Tx FIFO requests service (TDSR reflects the TDRA status bit). TDSR goes low when the Tx FIFO is loaded. TDSR is inhibited by the TxRS control bit being set, $\overline{\text{RESET}}$ being low, or $\overline{\text{CTS}}$ being high. If the prioritized status mode is used, Tx Underrun also inhibits TDSR.

RDSR—Receiver Data Service Request Output—The RDSR Output is provided primarily for use in DMA Mode operation and indicates (when high) that the Rx FIFO requests service (RSDR output reflects the RDA status bit). If the prioritized status mode is selected, RDSR will be inhibited when any other Receiver status conditions are present. RDSR goes low when the Rx FIFO is read.

Sync Serial Data

TxD—Transmit Data Output—The serial data from the Transmitter is coded in NRZ or NRZI (Zero Complement) data format.

RxD—Receiver Data Input—The serial data to be received by the ADLC can be coded in NRZ or NRZI (Zero Complement) data format. The data rate of the Receiver should not exceed the E frequency. If a partial byte reception is possible at the end of a frame, the maximum data rate of the Receiver is indicated by the following relationship:

$$f_{RxC} \leq \frac{1}{2t_E + 300\ ns}$$

where $t_E$ is the period of E.

ADLC Internal Registers

There are nine internal registers in the ADLC which can be accessed by the MPU over Data Bus 8. These registers are defined as read-only or write-only according to the direction of information flow. A particular register is selected in accordance with the proper combination of Read/Write (R/W), Register Select $\phi$ (RS$\phi$), Register Select 1 (RS1), and Address Control Bit 0 of Control Register #1. The ADLC register addressing structure is summarized in Table 1 below.

TABLE 1
REGISTER ADDRESSING

| Register Selected | R/W | RS1 | RS0 | Address Control Bit (C₁b₀) |
|---|---|---|---|---|
| Write Control Register = 1 | 0 | 0 | 0 | X |
| Write Control Register = 2 | 0 | 0 | 1 | 0 |
| Write Control Register = 3 | 0 | 0 | 1 | 1 |
| Write Transmit FIFO (Frame Continue) | 0 | 1 | 0 | X |
| Write Transmit FIFO (Frame Terminate) | 0 | 1 | 1 | 0 |
| Write Control Register = 4 | 0 | 1 | 1 | 1 |
| Read Status Register = 1 | 1 | 0 | 0 | X |
| Read Status Register = 2 | 1 | 0 | 1 | X |
| Read Receiver FIFO | 1 | 1 | X | X |

From Table 1 it will be seen that Control Registers #1–4 and the Tx FIFO Register are write only registers and that Status Registers #1 and #2 and the Rx FIFO Register are read only registers. An "X" in Table 1 represents a "Don't Care" condition. The Tx FIFO Register 18 can be accessed by two different addresses, the "Frame Continue" address and the "Frame Terminate" address, as will be explained in greater detail below.

CONTROL REGISTER #1 (CR1)

Control Register #1 is one of the four control registers (write-only) provided in the ADLC. It is an eight-bit register that can be directly addressed from Data Bus 8. Control Register #1 contains the reset function and the most often required Receiver control functions. The addresses of the other write-only registers are selected in pairs by bit 7 in Control Register #1. Control Register #1 is addressed when RS$\phi$=RS1=R/W=0. Control Register #1 has the following format:

| | | | | 7 | 6 | 5 | 4 | 3 | 2 | 1 | 0 |
|---|---|---|---|---|---|---|---|---|---|---|---|
| RS1 | RS0 | R/W | AC | TxRS | RxRS | Discontinue | TDSR Mode | RDSR Mode | TIE | RIE | AC |
| 0 | 0 | 0 | X | | | | | | | | |

Control Register $\phi$1 has the following programmable control bits:

b₀—Address Control (AC)—AC provides another RS (Register Select) signal internally. The AC bit is used in conjunction with RS$\phi$, RS1 and R/W inputs to select particular registers, as shown in Table 1 above.

b₁—Receiver Interrupt Enable (RIE)—RIE enables/disables an interrupt request originated by the ADLC Receiver section. 1 . . . enable, 0 . . . disable.

b₂—Transmitter Interrupt Enable (TIE)—TIE enables/disables an interrupt request originated by the ADLC Transmitter. 1 . . . enable, 0 . . . disable.

b₃—Receiver Data Service Request Mode (RDSR MODE)—The RDSR MODE bit provides the capability of operation with a bus system in the DMA Mode when used in conjunction with the prioritized status mode. When RDSR MODE is set, an interrupt request caused by the RDA status is inhibited, and the ADLC does not request data transfer via the $\overline{IRQ}$ output.

b₄—Transmitter Data Service Request Mode (RDSR MODE)—The RDSR MODE bit provides the capability of operation with a bus system in the DMA Mode when used in conjunction with the prioritized status mode. When TDSR MODE is set, an interrupt request caused by TDRA status is inhibited, and the ADLC does not request a data transfer via the $\overline{IRQ}$ output.

b₅—Rx Frame Discontinue (DISCONTINUE)—When the DISCONTINUE bit is set, the currently received frame is ignored, and the ADLC discards the data of the current frame. The DISCONTINUE bit is automatically reset when the last byte of the frame is discarded. When the ignored frame is aborted by receiving an abort or DCD failure, the DISCONTINUE bit is also reset.

b₆—Receiver Reset (RxRS)—When the RxRS bit is 1, the Receiver section stays in the reset condition. All Receiver sections including the Rx FIFO Register and the Receiver status bits in both status registers are reset. (During reset, the stored DCD status is reset but the DCD status bit follows the $\overline{DCD}$ input.) RxRS is set by forcing a low level on the $\overline{RESET}$ input or by writing a 1 into this bit from the Data Bus. RxRS must be reset by writing a 0 from the Data Bus after $\overline{RESET}$ has gone high.

b₇—Transmitter Reset (TxRS)—When the TxRS bit is 1, the Transmitter section stays in the reset condition and transmits marks (1's). All Transmitter sections, including the Tx FIFO and the Transmitter status bits in both status registers, are reset (FIFO cannot be loaded). During reset, the stored CTS status is reset but the CTS status bit follows the $\overline{CTS}$ input. TxRS is set by forcing a low level on the $\overline{RESET}$ input or by writing a 1 from Data Bus 8. It must be reset by writing a 0 after $\overline{RESET}$ has gone high.

CONTROL REGISTER #2 (CR2)

Control register #2 is an eight-bit write-only register which can be programmed from Data Bus 8 when the Address Control bit in Control Register #1 is reset. (RS1=1 and RS$\phi$=0 will address Control Register #2 when AC=0.) Control Register #2 provides programmability for the most commonly required general control and Transmitter control functions. Control Register #2 has the following format:

and #2 are prioritized as discussed below. When PSE is low, the status bits indicate current status without bit suppression by other status bits. The exception to this rule is the $\overline{CTS}$ status bit which always suppresses the TDRA status.

b₁—2 Byte/1 Byte Transfer (2/1 Byte)—When the 2/1 Byte bit is reset the TDRA and RDA status bits indicate the availability of their respective data FIFO registers for a single byte data transfer. Similarly, if the 2/1 Byte is set, the TDRA and RDA status bits indicate when two bytes of data can be moved without a second status read.

b₂—Flag/Mark Idle Select (F/M Idle)—The F/M Idle bit selects flag characters or bit-by-bit mark idle for the time fill or the idle state of the Transmitter. When mark idle is selected, Go-Ahead code can be generated for loop operation in conjunction with the 01/11 Idle control bit (C₃b₃). 1 . . . flat time fill, 0 . . . mark idle.

b₃—Frame Complete/TDRA Select (FC/TDRA Select)—The FC/TDRA Select bit selects TDRA status or FC status for the TDRA/FC status bit indication. 1 . . . FC status, 0 . . . TDRA status.

b₄—Transmit Last Data (Tx Last)—The Tx Last bit provides another method to terminate a frame. When the Tx Last bit is set just after loading a data byte, the ADLC assumes the byte is the last byte and terminates the frame by appending CRCC and a closing flag. This control bit is useful for DMA operation. Tx Last bit automatically returns to the 0 state.

b₅—Clear Receiver Status (CLR Rx ST)—When a 1 is written into the CLR Rx ST bit, a reset signal is generated for the Receiver status bits in Status Registers #1 and #2 (except AP and RDA bits). The reset signal is enabled only for the bits which have been present during the last "read status" operation. The CLR Rx ST bit automatically returns to the 0 state.

b₆—Clear Transmitter Status (CLR Tx ST)—When a 1 is written into the CLR Tx ST bit, a reset signal is generated for the Transmitter status bits in Status Register #1 (except TDRA). The reset signal is enabled for the bits which have been present during the last "read status" operation. The CLR Tx ST bit automatically returns to the 0 state.

b₇—Request to Send Control (RTS)—The RTS bit when high causes the $\overline{RTS}$ output to be low (the active state). When the RTS bit returns low and data is being transmitted, the $\overline{RTS}$ output remains low until the last character of the frame (the closing flag or abort) has been completed. If the Transmitter is idling when the RTS bit returns low, the $\overline{RTS}$ output will go high (the inactive state) within two bit times.

CONTROL REGISTER #3 (CR3)

Control Register #2 is an eight-bit write-only register which can be programmed from Data Bus 8 to configure the ADLC when the Address Control bit in Control

|  |  | 7 | 6 | 5 | 4 | 3 | 2 | 1 | 0 |
|---|---|---|---|---|---|---|---|---|---|
| RS1 RS0 | R/W AC | RTS | CLR TxST | CLR RxST | Tx Last | FC/TDRA Select | F/M Idle | 2/1 Byte | PSE |
| 0  1 | 0  0 |  |  |  |  |  |  |  |  |

Control Register #2 has the following programmable control bits:

b₀—Prioritized Status Enable (PSE)—When the PSE bit is set, the status bits in both Status Registers #1

Register #1 is set. (RS1=0 and RS$\phi$=1 will address Control Register #3 when AC=1.) Control Register #3 has the following format:

|   | 7 | 6 | 5 | 4 | 3 | 2 | 1 | 0 |
|---|---|---|---|---|---|---|---|---|
| RS1 RS0 R/W AC | LOC DTR | GAP TST | Loop | FDSE | 01/11 Idle | AEX | CEX | LCF |
| 0   1   0   1 | | | | | | | | |

Control Register #3 has the following programmable control bits:

$b_0$—Logical Control Field Select (LCF)—The LCF select bit causes the first byte(s) of data belonging to the information field to remain eight-bit characters until the logical control field is complete. The logical control field (when selected) is an automatically extendable field which is extended when bit 7 of a logical control character is a 1. When the LCF Select bit is reset the ADLC assumes no logical control field is present for either the transmit or received data channels. When the logical control field is terminated, the word length of the information data is then defined by $WLS_1$ and $WLS_2$.

$b_1$—Extended Control Field Select ($C_{EX}$)—When the $C_{EX}$ bit is a 1, the control field is extended and assumed to be sixteen bits. When $C_{EX}$ is 0, the control field is assumed to be eight bits.

$b_2$—Auto/Address Extend Mode ($A_{EX}$)—The $A_{EX}$ bit when low allows eight full bits of the address octet to be utilized for addressing because address extension is inhibited. When the $A_{EX}$ bit is high, bit 0 of the address octet equal to 0 causes the address field to be extended by one octet. The exception to this automatic address field extension is when the first address octet is all 0's (the Null Address).

$b_3$—01/11 Idle (01/11 Idle)—The 01/11 Idle control bit determines whether the inactive (mark) idle condition begins with a 0 or not. If the 01/11 Idle Control is set, the closing flag (or abort) will be followed by a 011111 . . . pattern. This is required of the controller for the "Go Ahead" character in the loop mode. When 01/11 is reset, the idling condition will be all 1's.

$b_4$—Flag Detect Status Enable (FDSE)—The FDSE bit enables the FD status bit in Status Register #1 to indicate the occurrence of a received flag character. The status indication will be accompanied by an interrupt if RIE is set. Flag detection will cause the Flag Detect output to go low for one bit time regardless of the state of FDSE.

$b_5$—LOOP/NON-LOOP Mode (LOOP)—When the LOOP bit is set, Loop Mode operation is selected and the GAP/TST control bit, LOC/DTR control bit, and LOC/DTR output are selected to perform the loop control functions. When LOOP is reset, the ADLC operates in the point-to-point data communications mode.

$b_6$—Go Active On Poll/Test (GAP/TST)—In the Loop Mode the GAP/TST bit is used to respond to the poll sequence and to begin transmission. When GAP/TST is set, the Receiver searches for the "Go Ahead" (or End of Poll, EOP). The receiver "Go Ahead" is converted to an opening flag and the ADLC starts its own transmission. When GAP/TST is reset during the transmission, the end of the frame (the completion of flag or abort) causes the termination of the "go-active-on-poll" operation and the Rx Data to Tx Data link is reestablished. The ADLC then returns to the "loop-on-line" state.

In the Non-Loop Mode the GAP/TST bit is used for self-test purposes. If GAP/TST bit is set, the TxD output is connected to the RxD input internally, and provides a "loop-back" feature which will be described in greater detail below. For normal operation, the GAP/TST bit should be reset.

$b_7$—Loop On-Line Control/DTR Control (LOC/DTR)—In the Loop Mode the LOC/DTR bit is used to go on-line or to go off-line. When LOC/DTR is set, the ADLC goes to the on-line state after seven consecutive 1's occur at the RxD input. When LOC/DTR is reset, the ADLC goes to the "off-line" state after eight consecutive 1's occur at the RxD input.

In the Non-Loop Mode the LOC/DTR bit directly controls the $\overline{\text{Loop On-Line}}/\overline{\text{DTR}}$ output state. 1 . . . $\overline{\text{DTR}}$ output goes to low level. 0 . . . $\overline{\text{DTR}}$ output goes to high level.

CONTROL REGISTER #4 (CR4)

Control Register #4 is an eight-bit write only register which can be programmed to control the Transmitter section when the Address Control bit in Control Register #1 is set. (RS1 = 1 and RS$\phi$ = 1 will address Control Register #4 when AC = 1.) Control Register #4 has the following format:

|   | 7 | 6 | 5 | 4 | 3 | 2 | 1 | 0 |
|---|---|---|---|---|---|---|---|---|
| RS1 RS0 R/W AC | NRZI/NRZ | $ABT_{EX}$ | ABT | Rx | | Tx | | "FF"/F |
| 1   1   0   1 | | | | $WLS_2$ | $WLS_1$ | $WLS_2$ | $WLS_1$ | |

Control Register #4 has the following programmable control bits:

$b_0$—Double Flag/Single Flag Interframe Control (FF/F)—The FF/F control bit determines whether the Transmitter will transmit separate closing and opening flags when frames are transmitted successively. When the FF/F control bit is low, the closing flag of the first frame will serve as the opening flag of the second frame. When the bit is high, independent opening and closing flags will be transmitted.

$b_1 b_2$—Transmitter Word Length Select (Tx WLS1 and WLS2)—Tx WLS1 and WLS2 are used to select the word length of the Transmitter information field. The encoding format is shown below.

| I-FIELD CHARACTER LENGTH SELECT | | |
|---|---|---|
| $WLS_1$ | $WLS_2$ | I-Field Character Length |
| 0 | 0 | 5 bits |
| 1 | 0 | 6 bits |
| 0 | 1 | 7 bits |
| 1 | 1 | 8 bits |

$b_3 b_4$—Receiver Word Length Select (Rx WLS1 and WLS2)—Rx Rx WLS1 and WLS2 are used to select the word length of the Receiver information field.

The encoding format is identical to that shown above.

b$_5$—Transmit Abort (ABT)—The ABT bit causes an abort (at least eight 1's in succession) to be transmitted. The abort is initiated and the Tx FIFO is cleared when the control bit goes high. Once the abort begins, the Tx Abort control bit assumes the low state.

b$_6$—Abort Extend (ABT$_{EX}$)—If ABT$_{EX}$ is set, the abort code initiated by ABT or the underrun condition is extended up to at least sixteen bits of consecutive 1's, the mark idle state.

b$_7$—NRZI (Zero Complement)/NRZ Select (NRZI/NRZ)—The NRZI/NRZ bit selects the transmit/receive data format to be NRZI or NRZ in either the Loop Mode or Non-Loop Mode of operation. When the NRZI mode is selected, a one-bit delay is added to the transmitted data (TxD) to allow for NRZI encoding. 1 . . . NRZI, 0 . . . NRZ.

STATUS REGISTER #1 (SR1)

Status Register #1 is the main status register. Status Register #1 is an eight-bit read-only register which provides the real-time status of the ADLC Transmitter section and interrupt output. Reading the status register is a nondestructive process. The method of clearing status depends upon the function of the individual bit and is discussed below for each bit in the register. The bit must have been present during the last status read operation in order to be cleared by the Clear Tx status control bit (except for TDRA/FC).

As discussed in greater detail below, the IRQ bit indicates whether the ADLC requests service or not. The S2RQ bit indicates whether any bits in Status Register #2 requests service. RDA and TDRA, which are most often used, are located in bit positions that are convenient to test.

Status Register #1 has the following format:

"On-Loop" condition. When ADLC is in an "Off-Loop" condition or "Go-Active-On-Poll" condition, the LOOP status bit is a 0.

b$_3$—Flag Detected (FD)—The FD status bit indicates that a flag has been received if the Flag Detect Enable control bit has been set. The bit goes high when the last bit of the flag character is received (when the Flag Detect Output goes low) and is stored until cleared by Clear Rx Status or Rx Reset.

b$_4$—Clear To Send (CTS)—The $\overline{CTS}$ input positive transition is stored in Status Register #1 and causes an IRQ (if enabled). The stored CTS condition and its IRQ are cleared by the Clear Tx Status control bit or Tx Reset bit. After the stored status is reset, the CTS status bit reflects the state of the $\overline{CTS}$ input.

b$_5$—Transmitter Underrun (TxU)—When the Transmitter runs out of data during a frame transmission, an underrun occurs and the frame is automatically terminated by transmitting an abort. The underrun condition is indicated by the TxU status bit. TxU can be cleared by means of the Clear Tx Status control bit or by Tx Reset.

b$_6$—Transmitter Data Register Available/Frame Complete (TDRA/FC)—The TDRA status bit serves two purposes depending upon the state of the Frame Complete/TDRA Select control bit. When this bit serves as a TDRA status bit, it indicates that data (to be transmitted) can be loaded into the Tx FIFO register. The first register (Reg. #1) of Tx FIFO 18 being empty (TDRA=1) will be indicated by the TDRA status bit in the "1-Byte Transfer Mode". The first two registers (Regs. #1 and #2) must be empty for TDRA to be high when in the "2 Byte Transfer Mode". TDRA is inhibited by Tx Reset, or $\overline{CTS}$ being high.

When the Frame Complete Mode of operation is selected, the TDRA/FC status bit goes high when

|  |  |  | 7 | 6 | 5 | 4 | 3 | 2 | 1 | 0 |
|---|---|---|---|---|---|---|---|---|---|---|
| RS1 | RS0 | R/W | AC | IRQ | TDRA/FC | TXU | CTS | FD | LOOP | S2RQ | RDA |
| 0 | 0 | 1 | X | | | | | | | | |

Status Register #1 has the following programmable status bits:

b$_0$—Receiver Data Available (RDA)—The RDA status bit reflects the state of the RDA status bit in Status Register #2. It provides the means of achieving data transfers of received data in the full-duplex mode without having to read both status registers.

b$_1$—Status Register #2 Read Request (S2RQ)—All of the status bits (stored conditions) of Status Register #2 (except the RDA bit) are logically ORed and indicated by the S2RQ status bit. Therefore S2RQ indicates that Status Register #2 needs to be read. When S2RQ is 0, it is not necessary to read Status Register #2. The bit is cleared when the appropriate bits in Status Register #2 are cleared or when Rx Reset is used.

b$_2$—Loop Status (LOOP)—The LOOP status bit is used to monitor the loop operation of the ADLC. This bit does not cause an IRQ. When Non-Loop Mode is selected, the LOOP bit stays 0. When Loop Mode is selected, the LOOP status bit goes to 1 during the a flag or abort has been transmitted. The bit remains high until cleared by resetting the TDRA/FC control bit or setting the TX Reset bit.

b$_7$—Interrupt Request (IRQ)—The Interrupt Request status bit indicates when the $\overline{IRQ}$ output is in the active state ($\overline{IRQ}$ Output=0). The IRQ status bit is subject to the same interrupt enables (RIE, TIE) as the IRQ output. The IRQ status bit simplifies status inquiries for polling systems by providing a single-bit indication of service requests.

STATUS REGISTER #2 (SR2)

Status Register #2 is a eight-bit read-only register which provides the real-time status of the ADLC Receiver section and the associated serial data channel inputs. Status Register #2 provides the detailed Receiver status information contained in the S2RQ bit of Status Register #1. The FD bit of Status Register #1 is the only Receiver status bit not contained in Status Register #2.

Status Register #2 has the following format:

|  |  |  | 7 | 6 | 5 | 4 | 3 | 2 | 1 | 0 |
|---|---|---|---|---|---|---|---|---|---|---|
| RS1 | RS0 | R/W | AC | RDA | OVRN | DCD | ERR | Rx | Rx | FV | AP |

| 7 | 6 | 5 | 4 | 3 | 2 | 1 | 0 |
|---|---|---|---|---|---|---|---|
| 0 | 1 | 1 | X |   | ABT | Idle |   |

Status Register #2 has the following programmable status bits:

$b_0$—Address Present (AP)—The AP status bit provides the frame boundary and indicates an address octet is available in the Rx FIFO Register 17. In the Extended Addressing Mode, the AP bit continues to indicate addresses until the address field is complete. The AP status bit is cleared by reading data or by Rx Reset.

$b_1$—Frame Valid (FV)—The FV status bit provides the frame boundary indication to the MPU and also indicates that a frame is complete with no error. The FV status bit is set when the last data byte of a frame is transferred into into the last location of the Rx FIFO (available to be read by the MPU). Once FV status is set, the ADLC stops further data transfer into the last location of the Rx FIFO (in order to prevent the mixing of two frames) until the FV status bit is cleared by the Clear Rx status bit or Rx Reset.

$b_2$—Inactive idle Received (Rx Idle)—The Rx Idle status bit indicates that a minimum of fifteen consecutive 1's have been received. The event is stored within Status Register #2 and can cause an interrupt. The interrupt and stored condition are cleared by the Clear Rx status control bit. The status bit is the logical OR of the Receiver idling detector (which continues to reflect idling until a 0 is received) and the stored inactive idle condition.

$b_3$—Abort Received (RxABT)—The RxABT status bit indicates that seven or more consecutive 1's have been received. Abort has no meaning under "out-of-frame" conditions; therefore, no interrupt nor storing of the status will occur unless a flag has been detected prior to the abort. An Abort Received under "in frame" conditions is stored in Status Register #2 and causes an IRQ. The status bit is the logical OR of the stored conditions and the Rx Abort detect logic, which is cleared after fifteen consecutive 1's have occurred. The stored abort condition is cleared by the Clear Rx status control bit or Rx Reset.

$b_4$—Frame Check Sequence/Invalid Frame Error (ERR)—When a frame is complete with a cyclic redundancy check (CRC) error or a short frame error (the frame does not have complete address and control fields), the ERR status bit is set instead of the Frame Valid status bit. Other functions, frame boundary indication and control function, are exactly the same as for the Frame Valid status bit.

$b_5$—Data Carrier Detect (DCD)—A positive transition on the $\overline{DCD}$ input is stored in Status Register #2 and causes an IRQ (if enabled). The stored DCD condition and its IRQ are cleared by the Clear Rx status control bit or RX Reset. After the stored status is reset, the DCD status bit follows the state of the input. Both the stored DCD condition and the $\overline{DCD}$ input cause the reset of the Receiver section when they are high.

$b_6$—Receiver Overrun (OVRN)—OVRN status indicates that Receiver data has been transferred into the Rx FIFO when it is full, resulting in data loss. The OVRN status is cleared by the Clear Rx status bit or Rx Reset. Continued overrunning only destroys data in the Rx FIFO Register #1.

$b_7$—Receiver Data Available (RDA)—The Receiver Data Available status bit indicates when Receiver data can be read from the Rx FIFO. When the prioritized status mode is used, the RDA bit indicates that non-address and non-last data are available in the Rx FIFO. The Receiver data being present in the last register of the Rx FIFO causes RDA to be high for the "1 Byte Transfer Mode". The RDA bit being high indicates that the last two registers are full when in the "2 Byte Transfer Mode". The RDA status bit is reset automatically when data is not available.

PRIORITIZED STATUS MODE

The prioritized status mode permits the ADLC to automatically suppress or enhance certain status conditions, thereby substituting the fast hardware processing of the ADLC for the slower MPU software in carrying out operations which must be initiated in response to such status conditions. The prioritized status mode provides maximum efficiency in reading the status bits, and it indicates only the most important action required to service the ADLC.

In the prioritized status mode of operation a fixed priority is established for the bits in both Status Register #1 and #2, as shown below in Table 2.

TABLE 2.

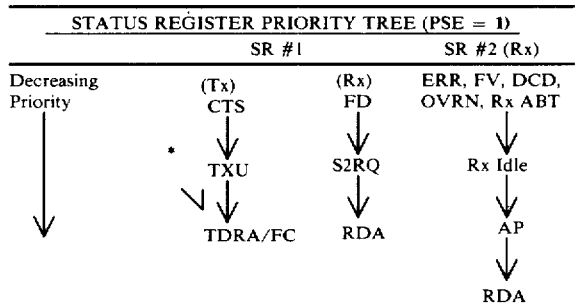

STATUS REGISTER PRIORITY TREE (PSE = 1)

*Prioritized even when PSE = 0

With reference first to the priority of the status bits in Status Register #1, it is seen that, regarding the Transmitter-oriented (Tx) status bits, $\overline{CTS}$ (when high) suppresses TXU and TDRA/FC. Regarding the Receiver-oriented status bits of Status Register #1, FD suppresses S2RQ, and S2RQ suppresses RDA. Bit 7 of Status Register #1, the IRQ bit, is excluded from the priority tree since it always reflects the state of the IRQ output.

In the Status Register Priority Tree, the status conditions having the highest priority are indicated at the top of the tree. In the event that two or more status conditions occur simultaneously (e.g., S2RQ and RDA) the lower priority condition will be inhibited until the higher priority condition has been serviced. The advantage of this feature can be seen by the following example. In the Receiver section, there are three conditions in Status Register #1 that can cause an interrupt: (1) Flag Detect, (2) S2RQ, and (3) RDA. Normally when the ADLC is receiving a frame of data the most frequently occurring status indication will be RDA which will be set each time a byte of data (1-Byte operation) appears in Rx FIFO 17. Since it is the most frequently occurring status condition it is most efficient to check this bit first. In a software-based prioritized status mode of operation this is the recommended programming procedure. Thus is a software test found the RDA bit of Status Register #1 set, the program would not only know that data was available in the Rx FIFO but also that there were no other Receiver status conditions present (since RDA would be inhibited if S2RQ or FD status conditions were present). If the MPU found RDA reset, the program would then test the next higher priority condition in the Status Register Priority Tree. It will be appreciated that much software decision-making normally performed by the MPU is eliminated when the ADLC is operated in the prioritized status mode.

Regarding now the priority of status bits in Status Register #2, the ERR, FV, DCD, OVRN, and Rx ABT status bits suppress all the remaining status bits in Status Register #2. In turn, the Rx Idle status bit suppresses the AP and RDA status bits. Finally the AP status bit suppresses the RDA status bit. If the FV status bit is detected it is advisable that the error status bits (DCD, OVRN, and Rx ABT bits) be tested.

It should be appreciated that when the ADLC is used in an interrupt mode the prioritized status mode causes the ADLC to function much like a pre-programmed priority interrupt controller. This mode is selected by setting the PSE bit of Control Register #2.

RECEIVER DATA FIFO (Rx FIFO)

The Rx FIFO 17 comprises three eight-bit registers which are used for the buffer storage of received data. Data bytes are transferred from a full register to an adjacent empty register on each transition of the E pulse. Thus it takes one and a half E pulses (i.e., three edge transitions) for a byte to move through the Rx FIFO 17.

Both the Rx FIFO 17 and the Tx FIFO 18, which will be described below, provide buffer storage areas to allow the stacking of data inside the chip in order to relieve software timing problems that would otherwise exist.

Figure 14A:
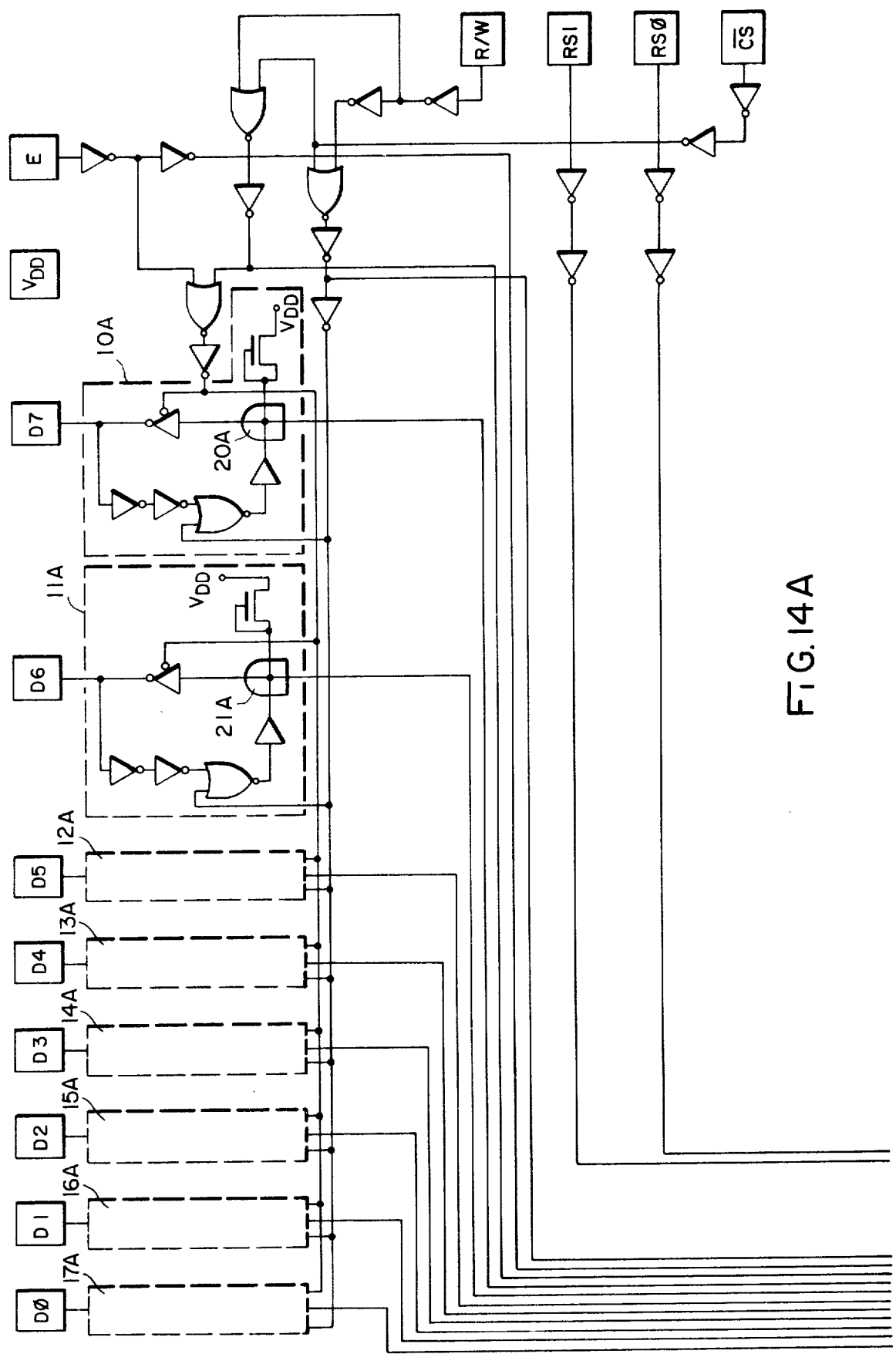
FIGS. 14A-14O are interconnected.
Figure 14B:
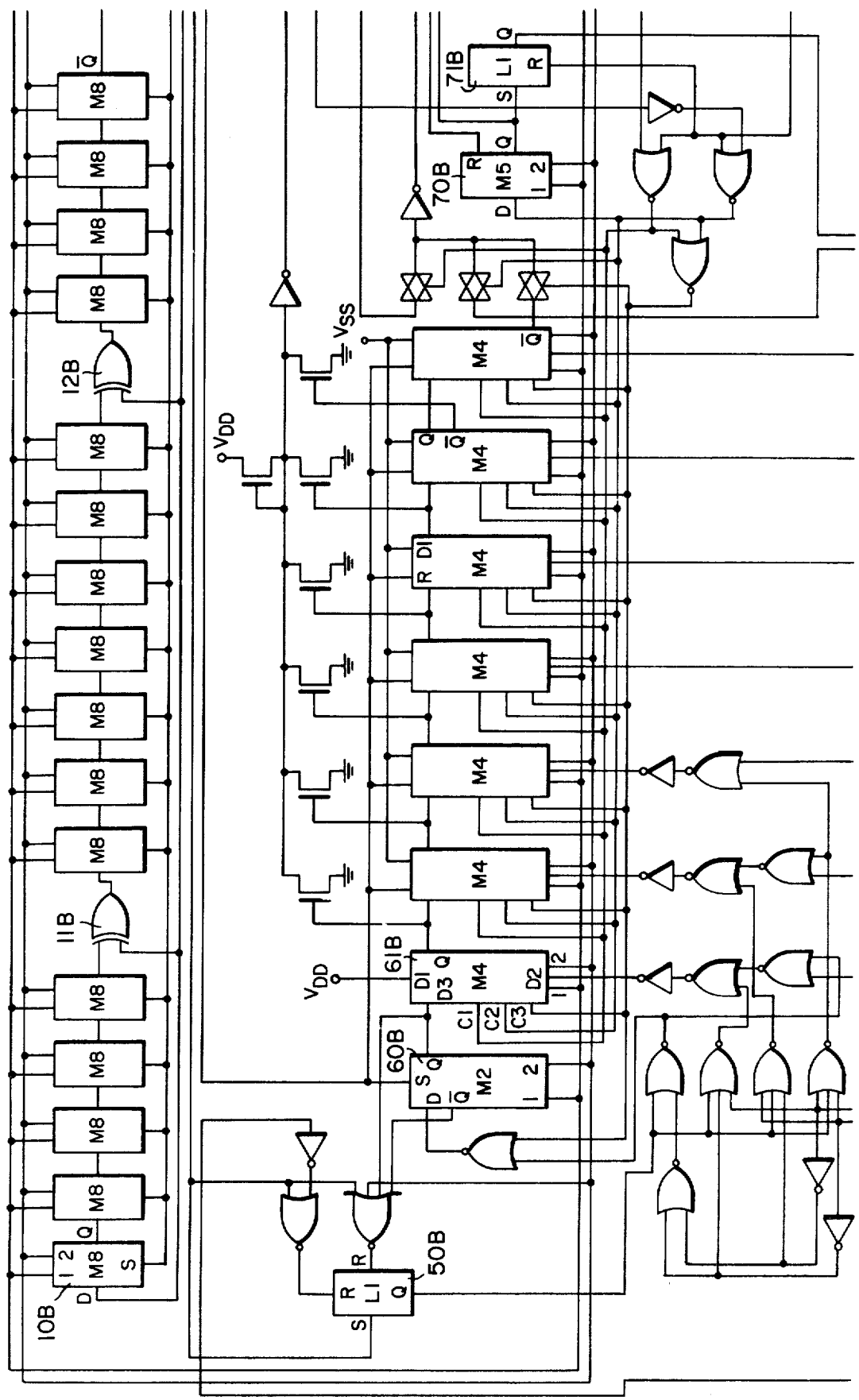
FIG. 14B illustrates the Transmitter FCS Generator, Transmitter Shift Register, and Transmitter Bit Counter.
Figure 14D:
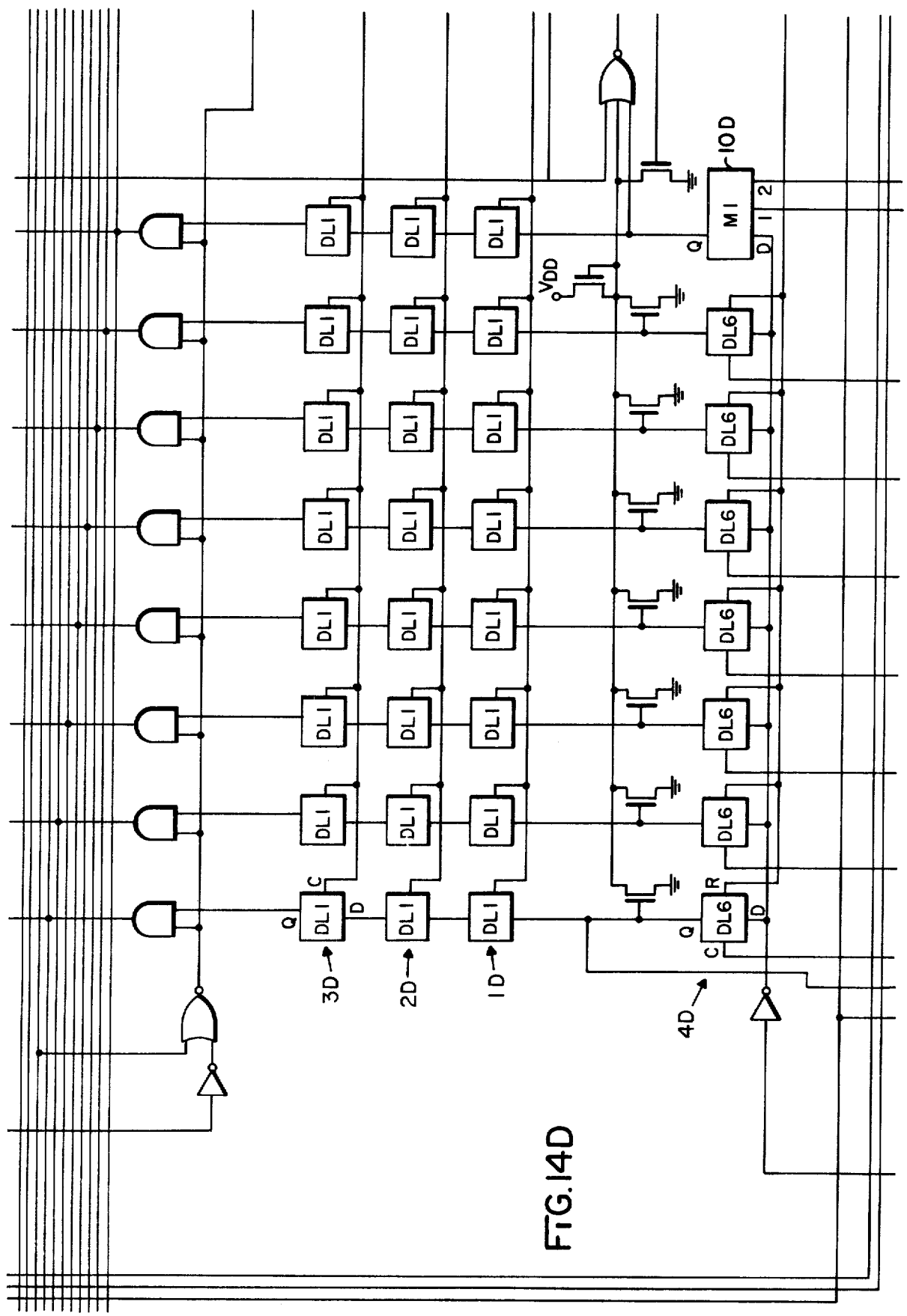
FIG. 14D illustrates the Receiver FIFO Registers and Receiver Multiplex Register.

The first of the three eight-bit registers which comprise the Rx FIFO 17 is identified by the row 1D of latches DL1 of FIG. 14D of the detailed logic diagram of the ADLC. The second and third eight-bit registers comprising the Rx FIFO 17 are shown as rows 2D and 3D, respectively, of latches DL1 in FIG. 14D. Each eight-bit register 1D-3D has an associated pointer bit which points to the frame boundary. When these pointers appear at the last FIFO location, they update the AP, FV, or ERR status bits.

The RDA status bit indicates the state of the Rx FIFO 17. When the RDA status bit is 1, the Rx FIFO 17 is ready to be read. The RDA status bit is controlled by the 2 Byte/1 Byte control bit. When overrun occurs, the data in the first byte of the Rx FIFO 17 is no longer valid.

Both the Rx RS bit of Control Register #1 and the Reset input clear the Rx FIFO 17. Abort ("in-frame") and a high level on the $\overline{DCD}$ input also clear the Rx FIFO 17, but the last bytes of the previous frame, which are separated by the frame boundary pointer, are not disturbed.

An overrun condition will occur in the Rx FIFO 17 if a received character is completed when the first eight-bit register of the Rx FIFO is full. The overrunning character will be transferred to the first eight-bit register of the Rx FIFO, and it will cause the destruction of its original contents. Successive overruns continue to cause the first eight-bit register of the Rx FIFO to lose data. The occurrence of such loss of data is indicated by means of the Receiver Overrun (OVRN) status bit in Status Register #2. The OVRN status bit remains set until cleared by means of the Clear Rx status bit or Rx Reset. Both the RESET input signal and the RxRS control bit clear and inhibit the Rx FIFO. Data can be neither received nor stored in the Rx FIFO until the RxRS control bit in Control Register #1 has been reset.

TRANSMITTER DATA FIFO (Tx FIFO)

The Tx FIFO 18 also comprises three eight-bit registers, which in this case are used for the buffer storage of data to be transmitted. As in the case of Rx FIFO 17, data is always transferred in the Tx FIFO 18 from a full eight-bit register to an empty adjacent eight-bit register, the transfer occurring on each transition of the E clock. Data bytes are transferred from the #3 eight-bit register of the Tx FIFO 18 into a Transmitter Shift Register in the Transmitter 24 on the transmit clock (TxC).

In contrast to the Rx FIFO 17, which has only one addressable location (see Table 1, Register Addressing), the Tx FIFO 18 can be addressed by two different register addresses, the "Frame Continue" address and the "Frame Terminate" address. These are not really two separate storage locations but rather two different paths for entering the Tx FIFO 18.

The first eight-bit register in the Tx FIFO 18 is shown by the row 1C of latches DL1 in FIG. 14C of the detailed logic diagram of the ADLC. The second and third eight-bit registers are indicated by rows 2C and 3C, respectively, in FIG. 14C. Each eight-bit register has pointer bits which point to the frame boundary. When a data byte is written at the "Frame Continue" address, the pointer of the first eight-bit Tx FIFO register is set. When a data byte is written at the "Frame Terminate" address, the pointer of the first eight-bit Tx FIFO register is reset. The Rx RS control bit of Control Register #1 or the ABT control bit of Control Register #4 resets all the pointers. The pointer shifts through the Tx FIFO 18. When a positive transition is detected at the third eight-bit Tx FIFO register, the Transmitter initiates a frame with an opening flag. When a negative transition is detected at the third eight-bit Tx FIFO location, the transmitter closes a frame and appends the FCS and closing flag to the last byte.

The Tx Last Data control bit in Control Register #2 can be used instead of using the "Frame Terminate" address. When the Tx Last Data control bit is written by a 1 just after a data byte is loaded into the Tx FIFO, the ADLC control logic assumes such byte is the last byte and terminates the frame by appending CRCC and a closing flag. This control bit is useful for DMA operation. Thus there are two ways of ending a frame and causing the ADLC to automatically append the FCS character and closing flag. The program can either store the last data byte at the "Frame Terminate" address location or store it at the "Frame Continue" address location and then set bit 4 or CR2. This bit is automatically reset.

The status of the Tx FIFO 18 is indicated by the TDRA status bit of Status Register #1. When TDRA is 1, the Tx FIFO is available for loading data. The TDRA status bit is controlled by the 2 Byte/1 Byte control bit. The Tx FIFO is reset by both the Tx RS control bit and the $\overline{\text{RESET}}$ input. During this reset condition or when the $\overline{\text{CTS}}$ input is high, the TDRA status bit is suppressed and data loading is inhibited.

An underrun condition will occur in Tx FIFO 18 if the last eight-bit register is empty when the transmission of a character is completed. An underrun condition results in the abandonment of frame transmission and is signaled by automatically transmitting an abort character. The underrun event will be stored in bit 5 of Status Register #1 until cleared by means of the Clear Tx status control bit or by Tx Reset.

Detailed Logic Diagram

Figures 12, 13:
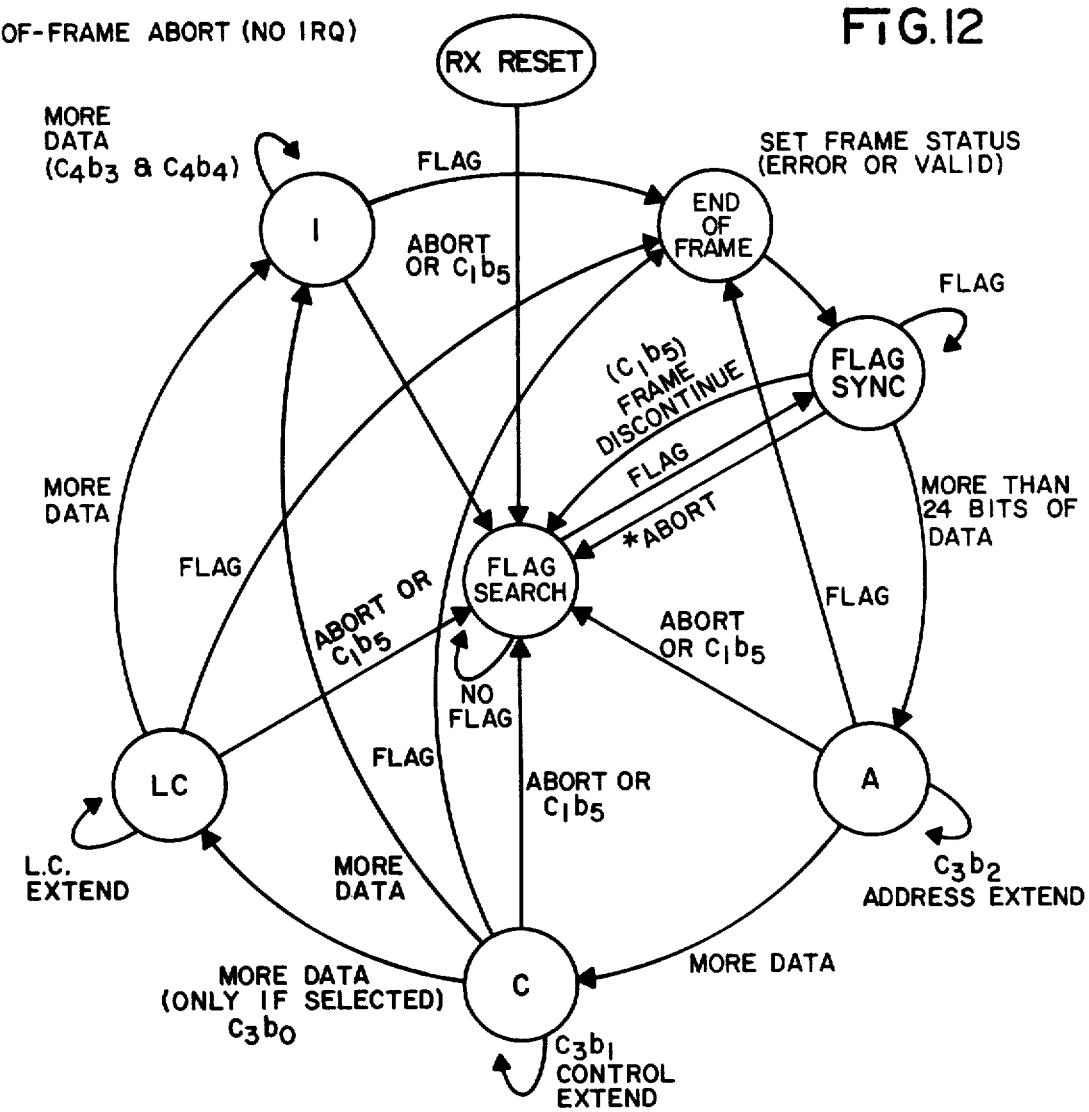
FIG. 12 illustrates a state diagram for the ADLC receiver.
FIG. 13 illustrates the manner in which the individual drawing sheets comprising
Figure 14E:
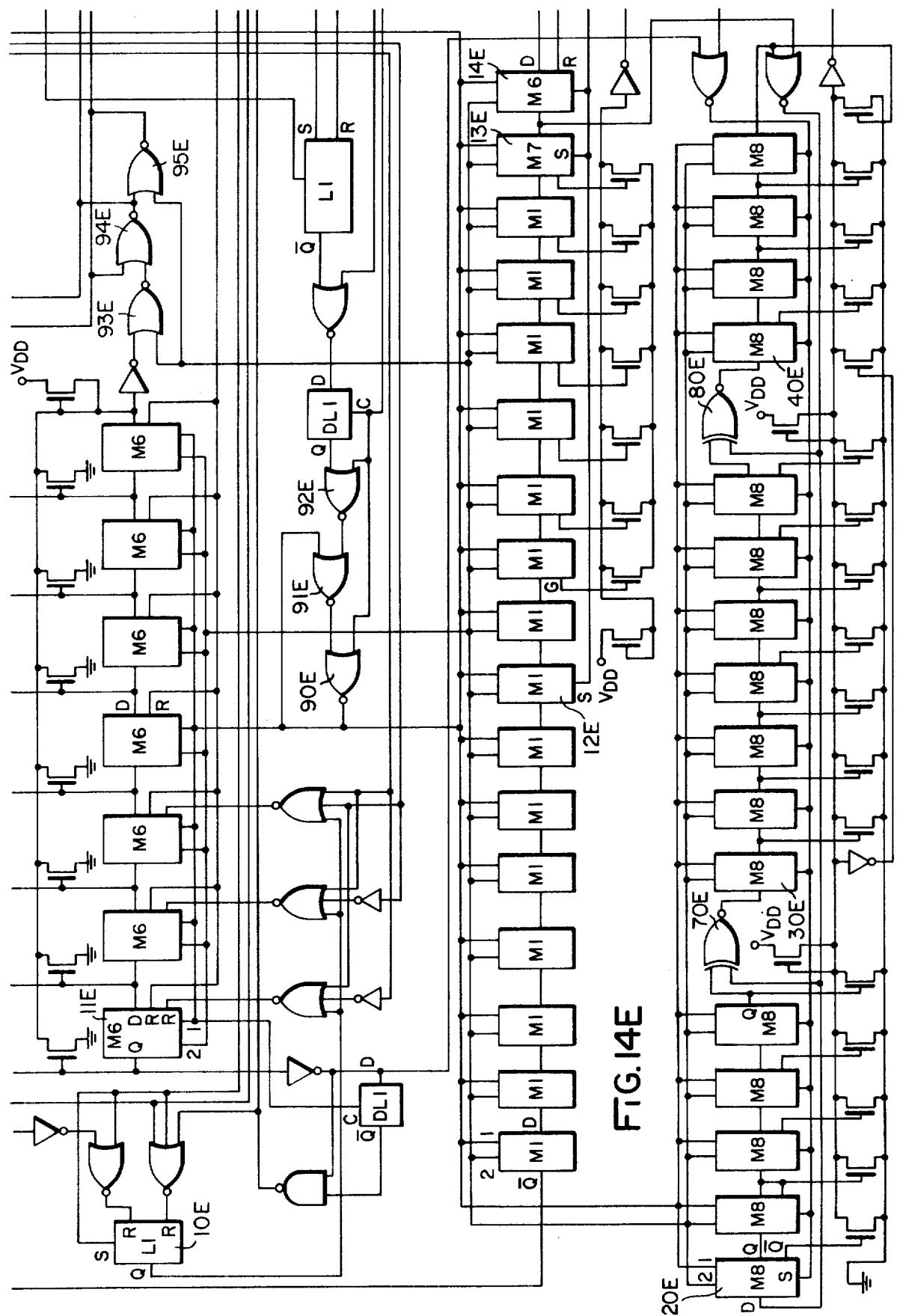
FIG. 14E illustrates the Receiver Bit Counter and Clock Generator, a portion of the Receiver Data Buffer Register, and the Receiver FCS Checker.
Figure 14F:
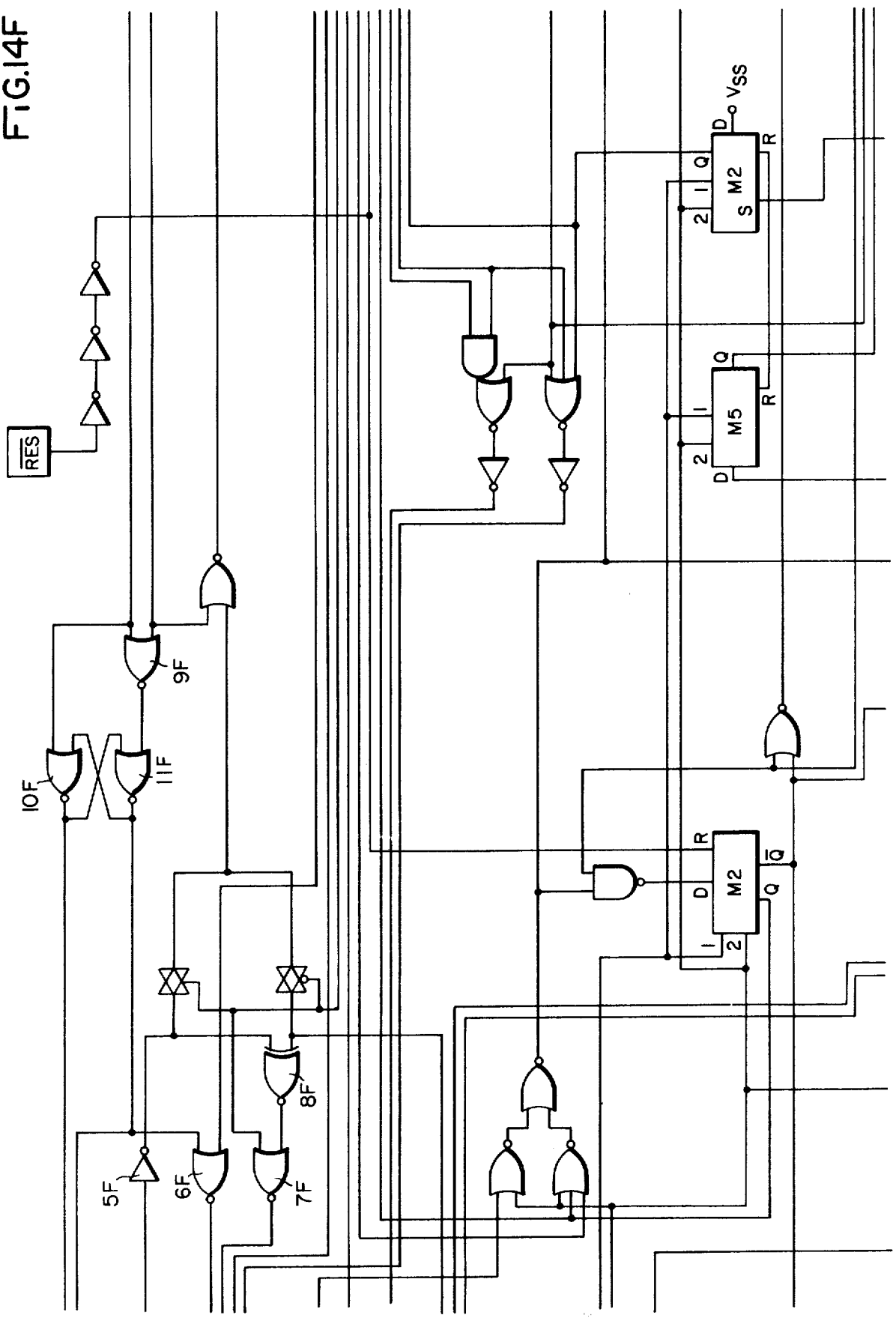
FIG. 14F illustrates the Transmitter Clock and a portion of the Transmitter Control circuitry.
Figure 14H:
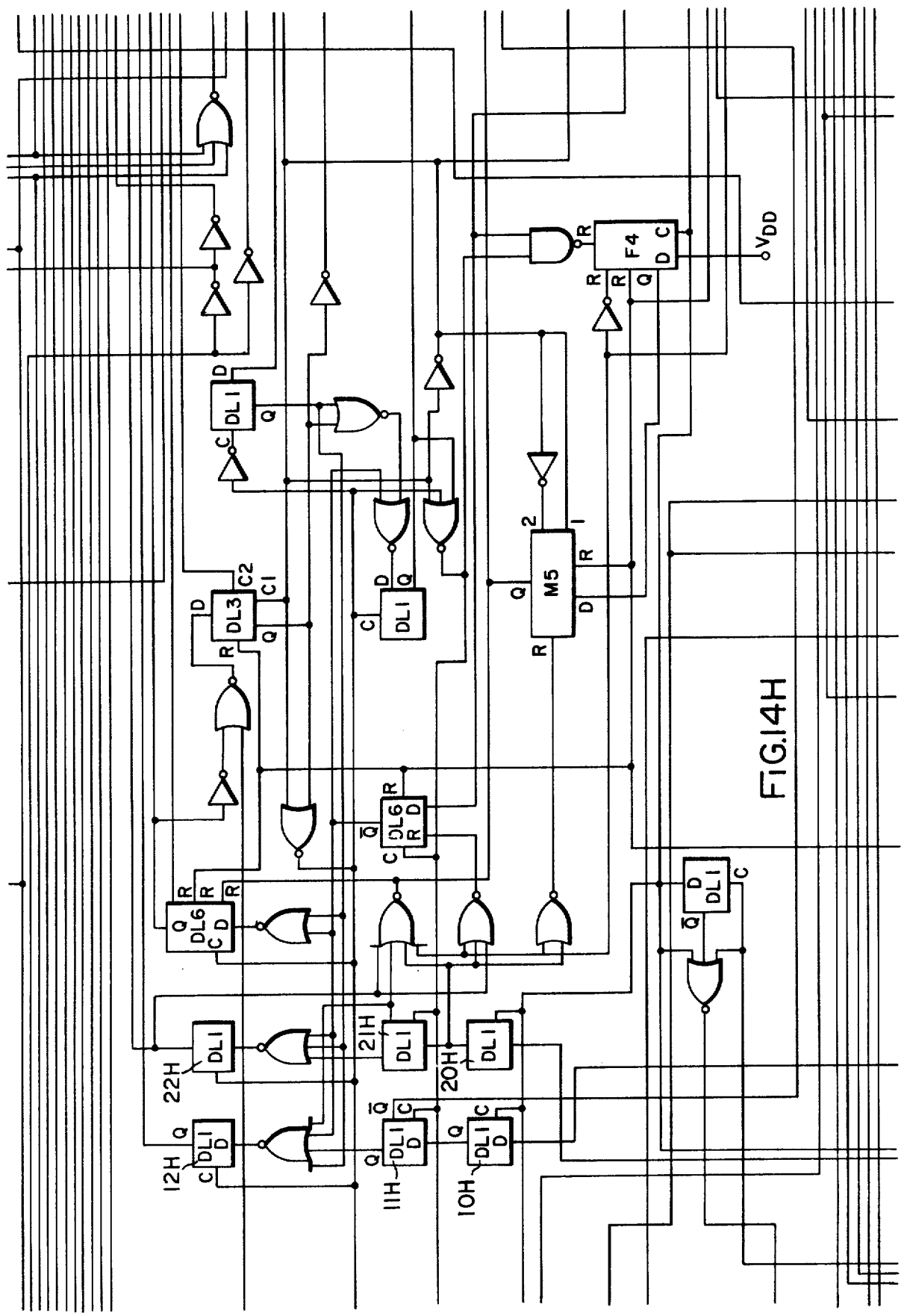
FIG. 14H illustrates the Receiver FIFO Control circuitry.
Figure 14J:
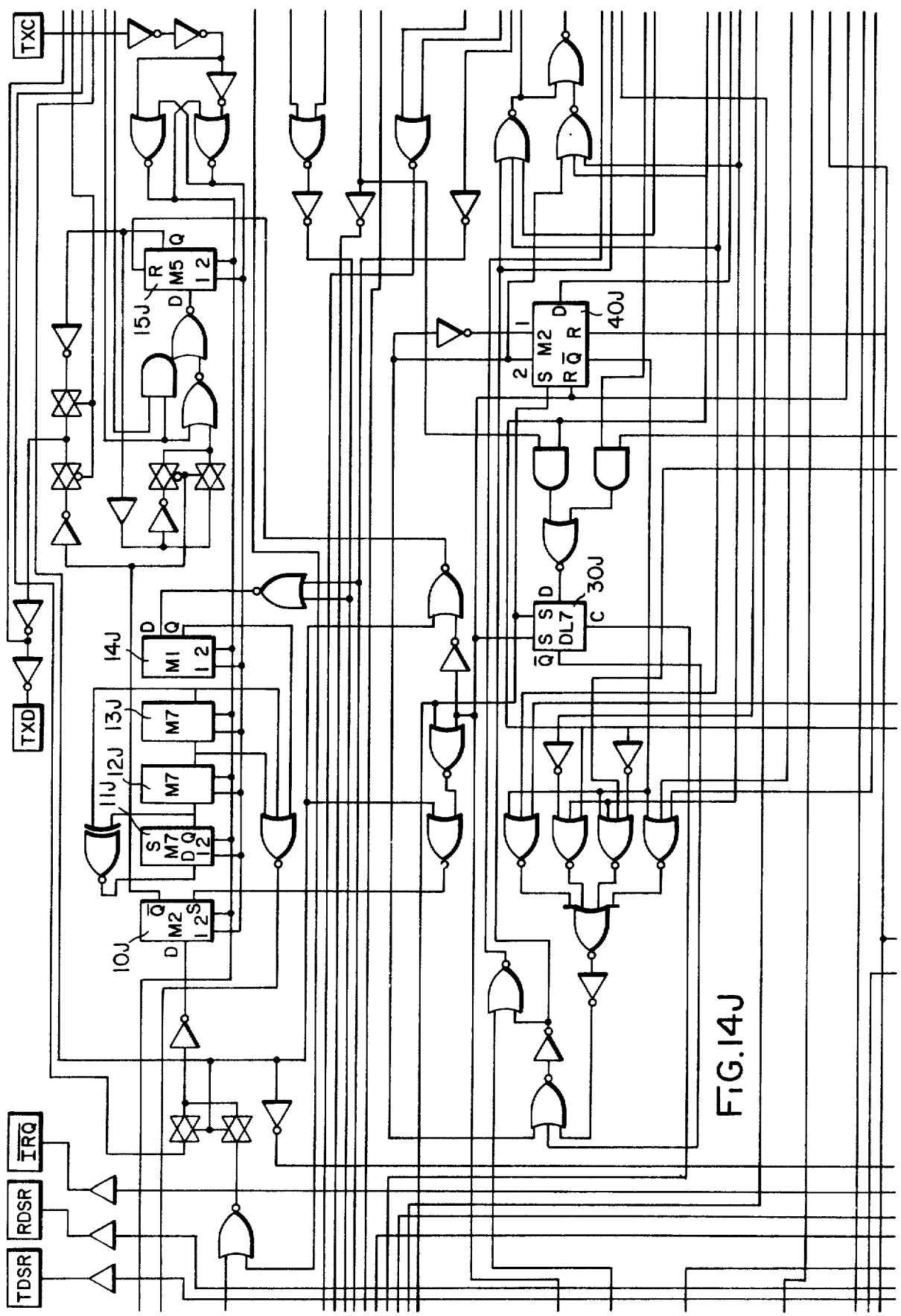
FIG. 14J illustrates the Transmitter Zero Insertion circuitry, NRZI Encoder circuitry, and a portion of the Transmitter Control circuitry.
Figure 14K:
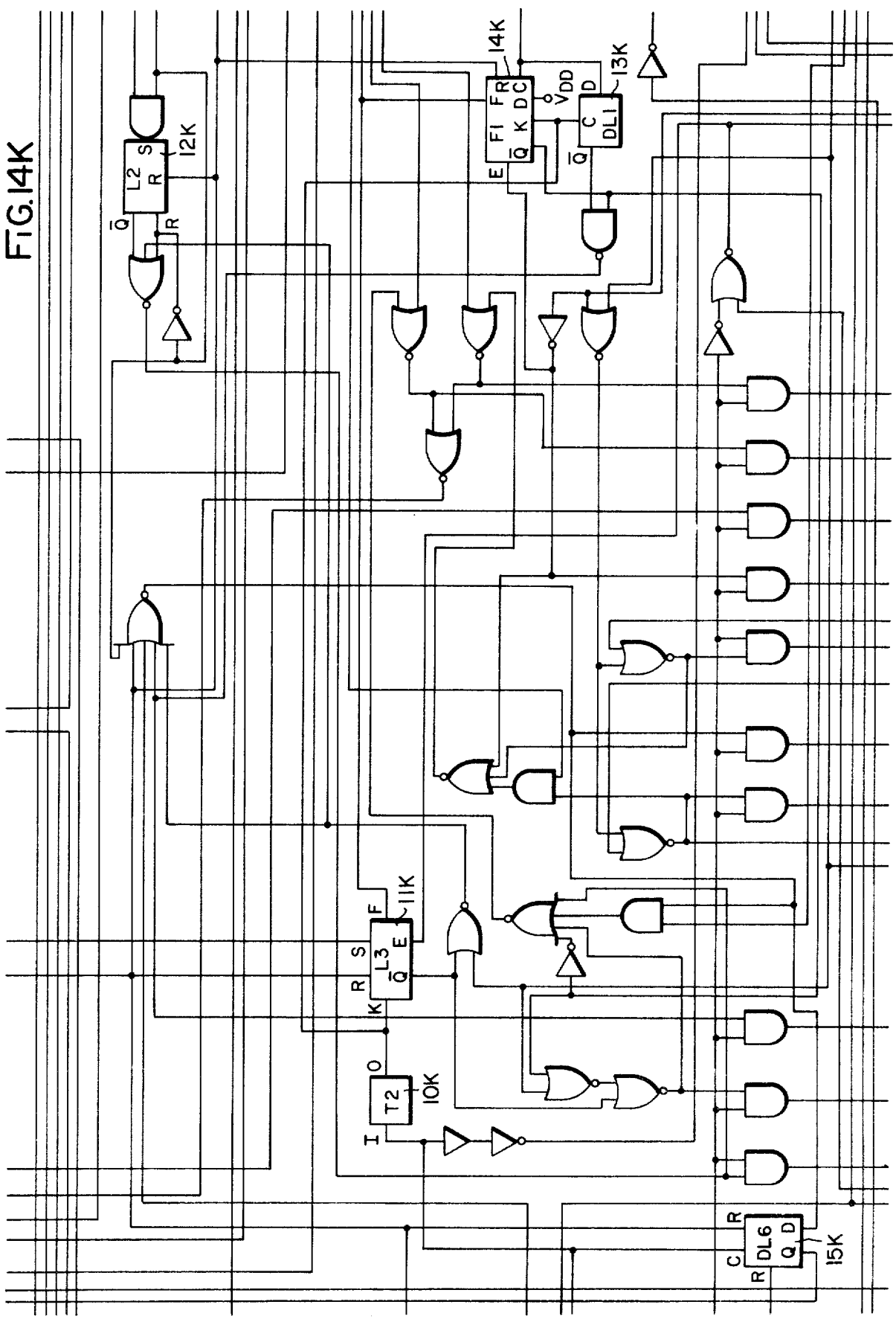
FIG. 14K illustrates the Transmitter Status Register (Status Register #1) and the IRQ circuitry.
Figure 14M:
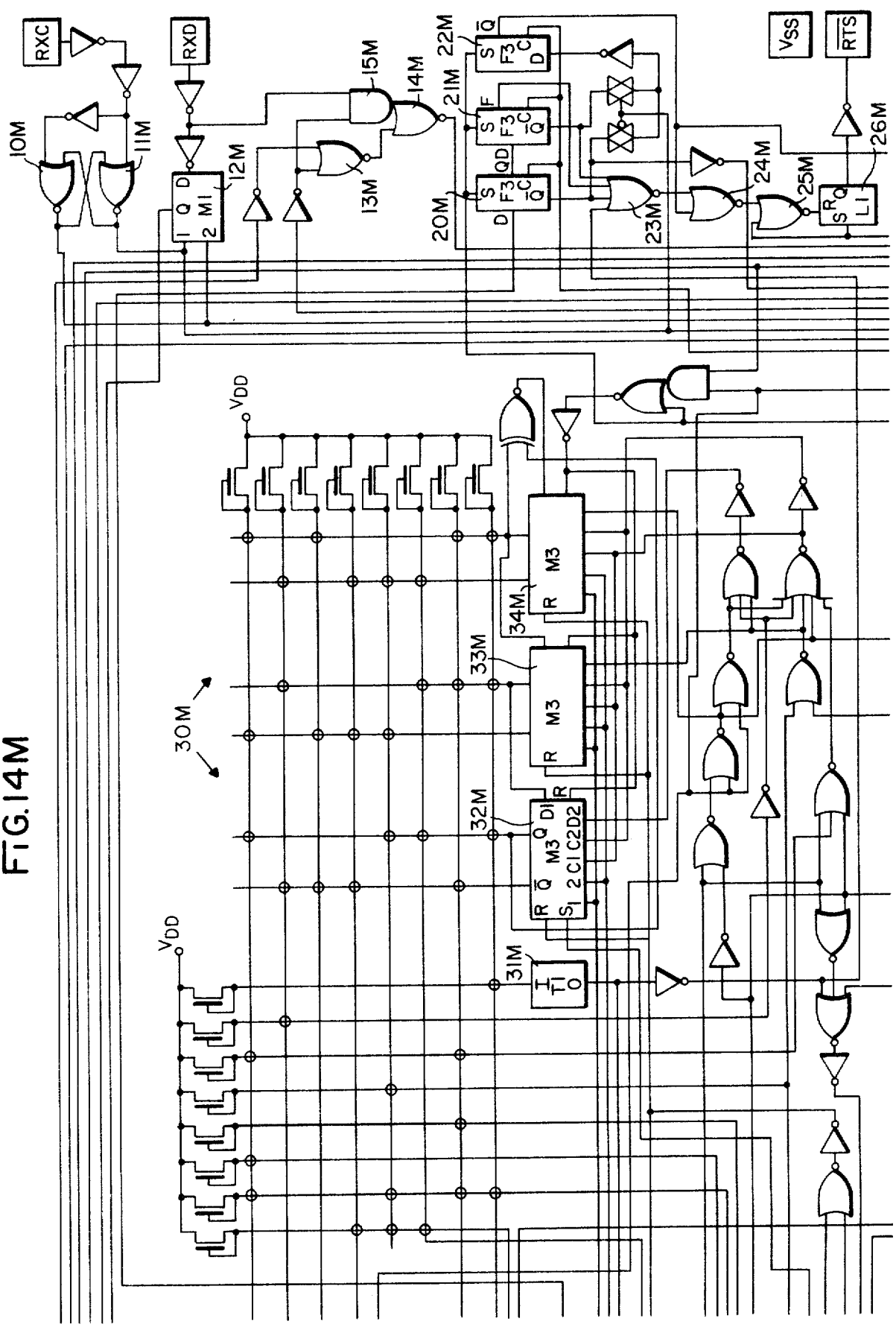
FIG. 14M illustrates a portion of the Transmitter Control circuitry, the RxC and RxD circuitry, and the RTS Control circuitry.
Figure 14O:
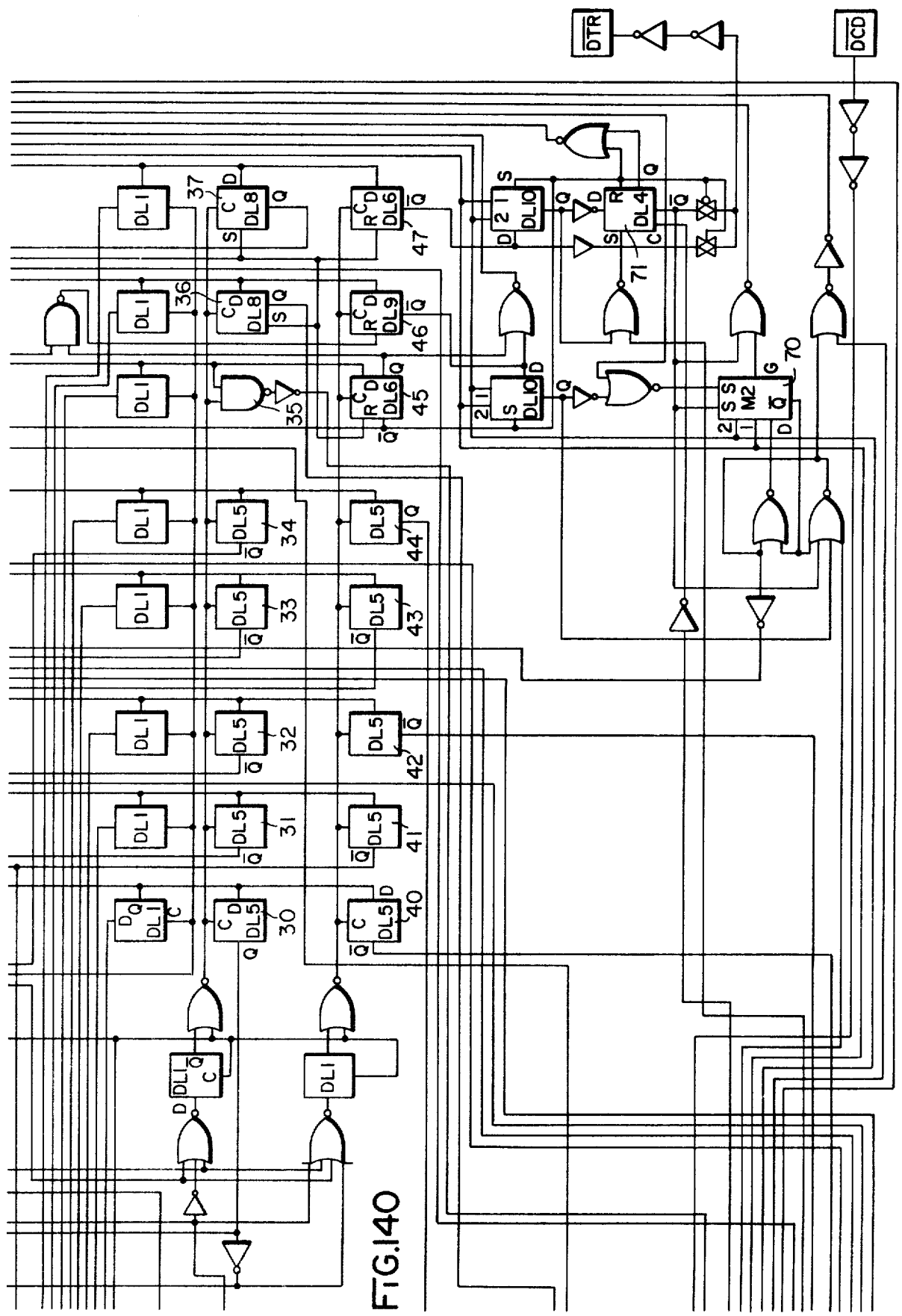
Figure 15A:
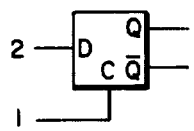
Figure 15B:
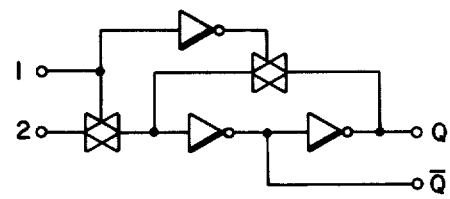
Figure 16A:
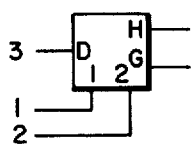
Figure 16B:
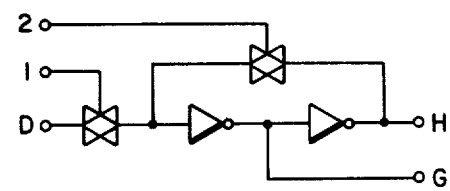
Figure 17A:
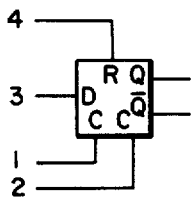
Figure 17B:
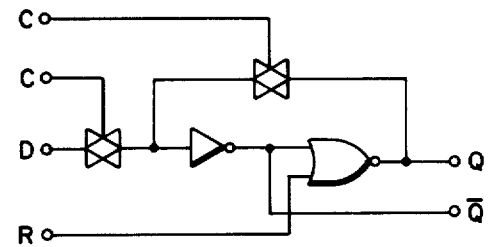
Figure 18A:
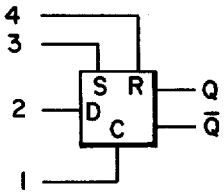
Figure 18B:
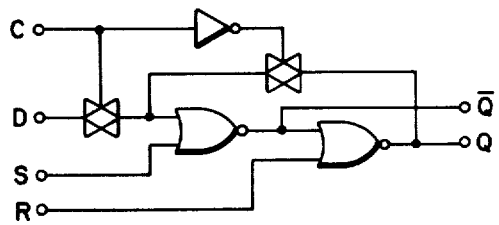
Figure 19A:
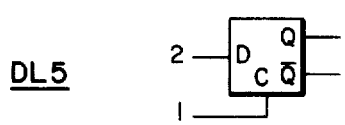
Figure 19B:
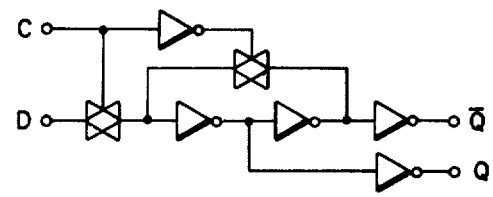
Figure 20A:
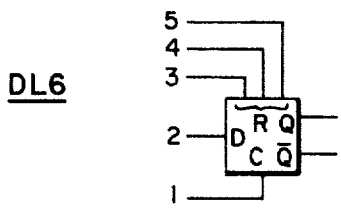
Figure 20B:
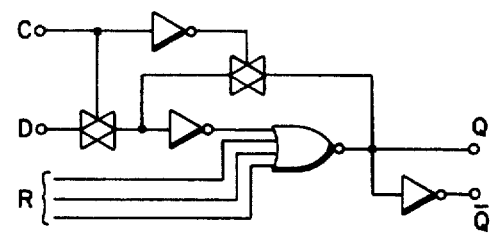
Figure 21A:
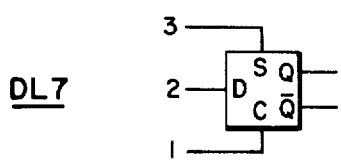
Figure 21B:
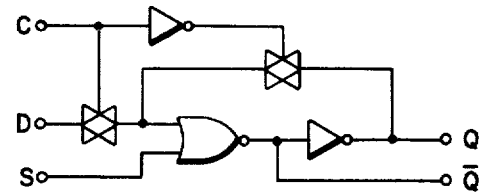
Figure 22A:
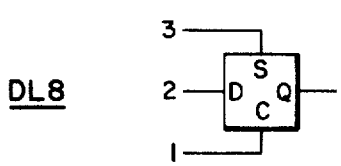
Figure 22B:
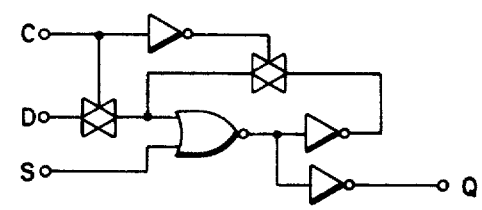
Figure 23A:
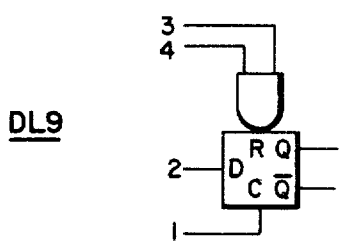
Figure 23B:
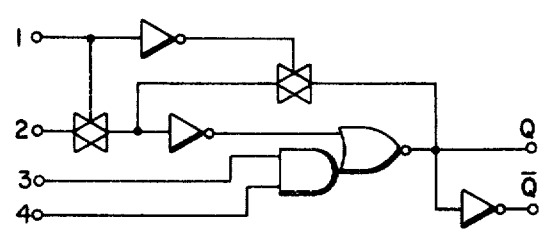
Figure 24A:
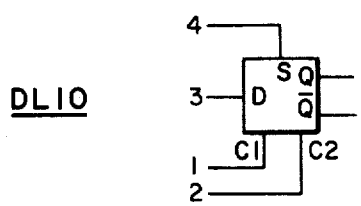
Figure 24B:
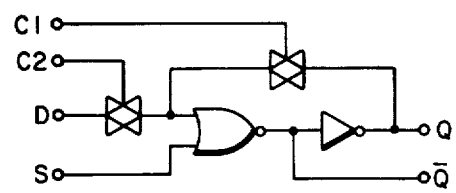
Figure 25A:
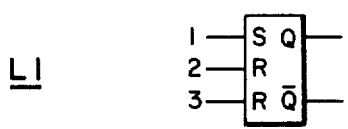
Figure 25B:
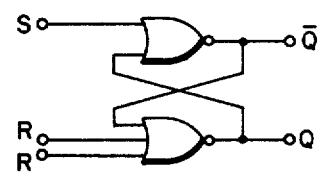
Figure 26A:
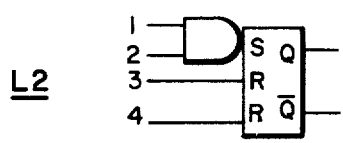
Figure 26B:
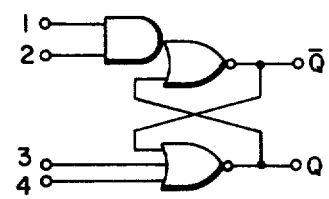
Figure 27A:
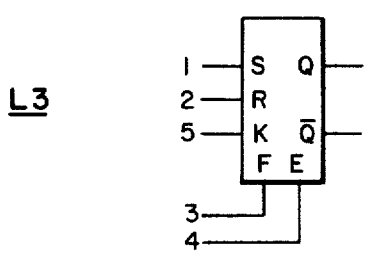
Figure 27B:
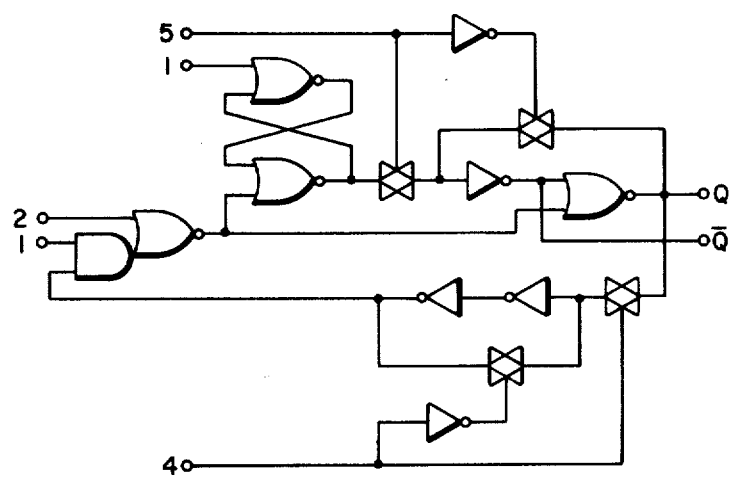
Figure 28A:
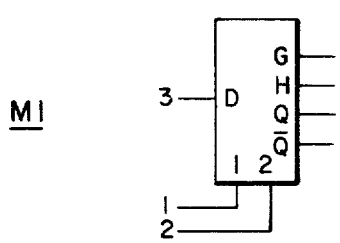
Figure 28B:
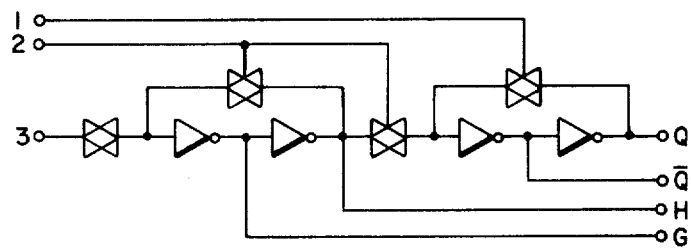
Figure 29A:
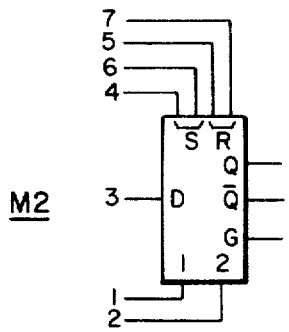
Figure 29B:
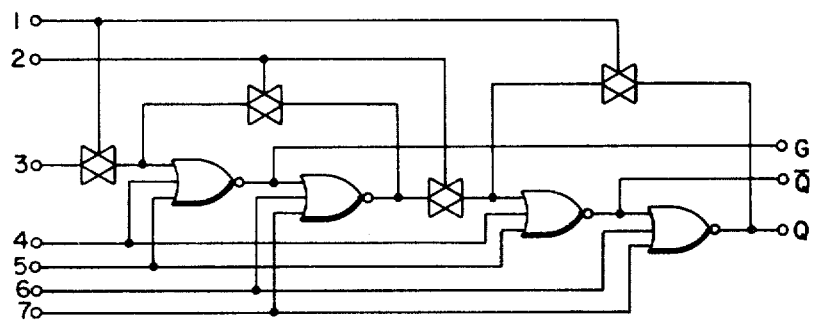
Figure 30A:
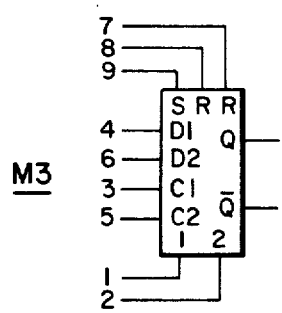
Figure 30B:
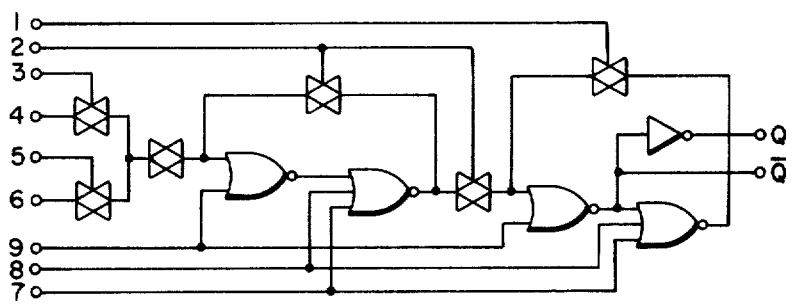
Figure 31A:
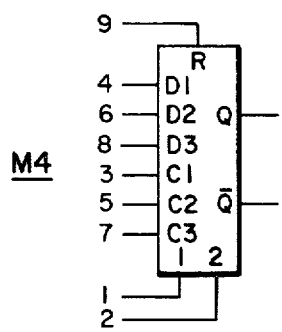
Figure 31B:
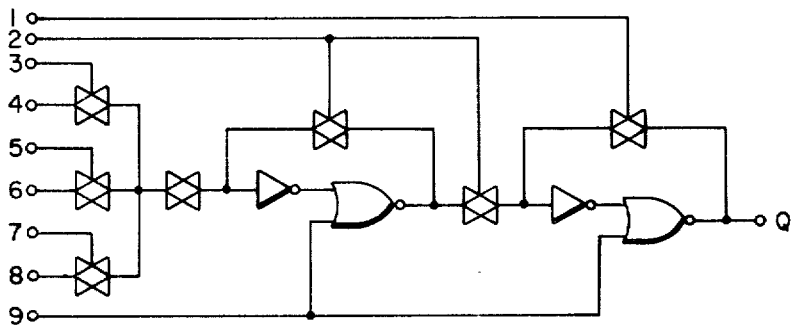

FIGS. 14A–14O constitute a detailed logic diagram of a preferred embodiment of the ADLC. The individual drawing sheets may be pieced together in the manner indicated by FIG. 13 to form a large logic schematic of the ADLC according to a presently preferred embodiment of the invention. One of ordinary skill in the art can manufacture a single-chip, LSI MOS implementation of the ADLC given the detailed logic diagram of FIGS. 14A–14O. In order to avoid encumbering the detailed description of the invention, only the most salient elements of the detailed ADLC logic diagram will be discussed hereinafter. The remaining features shown by the detailed logic schematic are provided to enable one of ordinary skill in the art to practice the invention.

FIG. 14A shows the Data Bus pads D$\phi$-D7 along the left-hand edge of the drawing. Responsive to each Data Bus pad D$\phi$-D7 is a respective Data Bus I/O Buffer circuit 17A-10A, respectively. The circuitry within the dashed outlines identified by reference numerals 12A-17A is identical to that shown in the dashed outline labeled 11A. Also shown in FIG. 14A are the $V_{DD}$ 5 volt DC power supply pad, E clock pad, R/W pad, RS1 pad, RS$\phi$ pad and $\overline{\text{CS}}$ pad.

FIG. 14B shows the Transmitter FCS Generator circuitry in the top portion thereof in the form of a series of M8 flip-flops, one of which is identified by reference number 10B, and by Exclusive OR gates 11B and 12B. Also shown in FIG. 14B is the Transmitter Shift Register comprising an M2 flip-flop 60B and seven M4 flip-flops, one of which is identified by reference numeral 61B. The M2 flip-flop 60B contains the most significant bit of the eight-bit byte, and the right-most M4 flip-flop contains the least significant bit. FIG. 14B also indicates the Transmitter bit-counting circuitry.

FIG. 14C shows the three eight-bit Tx FIFO registers. As explained above, data moves first into the lower-most row of DL1 latches indicated generally by reference numeral 1C. The most significant bit again is contained in the left-most DL1 latch 10C. Data next moves into the middle line of DL1 latches indicated generally by reference numeral 2C. From there data moves upwards into the row of DL1 and DL5 latches indicated generally by reference numeral 3C.

FIG. 14D shows the Receiver Multiplex Register indicated generally by reference numeral 4D. The Receiver Multiplex Register comprises seven DL6 latches and one M1 flip-flop 10D. Also shown in FIG. 14D are the three eight-bit Rx FIFO registers indicated generally by reference numerals 1D-3D. Data moves first into the lower-most eight-bit Rx FIFO register 1D, and successively through the two remaining eight-bit registers 2D and 3D.

FIG. 14E shows the Receiver FCS Checker in its lowermost portion. The Receiver FCS Checker comprises three groups of M8 flip-flops and Exclusive-OR gates 70E and 80E. Above the Receiver FCS Checker in FIG. 14E is shown the Receiver Data Buffer Register comprising fifteen M1 flip-flops, one of which is indicated by reference numeral 12E, one M7 flip-flop 13E, and one M6 flip-flop 14E. Above the Receiver Data Buffer Register in FIG. 14E is shown the Receiver Bit Counter comprising seven M6 flip-flops, one of which is indicated by reference numeral 11E. Also shown in FIG. 14E are Receiver Clock Generator 1 comprising NOR gates 90E-92E and Receiver Clock Generator 2 comprising NOR gates 93E-95E.

FIG. 14F shows the Transmitter Clock Generator comprising NOR gate 9E and cross-coupled NOR gates 10E and 11E. Also shown in 14F is a portion of the Transmitter FCS Generator comprising inverter 5E, NOR gates 6E and 7E, and Exclusive-OR gate 8E. In addition, FIG. 14F shows a portion of the Transmitter Control circuitry.

FIG. 14G shows the Tx FIFO Control circuitry.

FIG. 14H shows the Rx FIFO Control circuitry.

FIG. 14I shows the Receiver Control circuitry, which includes latches 10I, 11I, and 16I and flip-flops 12I-15I and 17I. Also shown in FIG. 14I is the Receiver Data Decoding circuitry and Zero Deletion circuitry comprising the six DL3 latches in the middle of the figure, one of which is identified by reference numeral 30I. FIG. 14I also shows the eight-bit Receiver Data Decoder Register, comprising the DL2 latch 50I, and flip-flops 51I-58I.

FIG. 14J shows the Transmitter Zero Insertion and NRZI Encoder, comprising flip-flops 10J-15J. Also shown in FIG. 14J is a portion of the Transmitter Control circuitry, comprising DL7 latch 30J and M2 flip-flop 40J.

FIG. 14K shows the Transmitter Status Register (Status Register #1) and IRQ circuitry, comprising T2 pass generator 10K, latches 11K-13K, flip-flop 14K and latch 15K.

FIG. 14L shows the Receiver Status Register (Status Register #2), comprising T2 pass generator 29L, latches 30L, 32L, and 34L, and flip-flops 31L, 33L, and 40L-43L.

FIG. 14M shows the RxC input circuitry which is responsive to an input over the RxC pad and comprises cross-coupled NOR gates 10M and 11M. FIG. 14M also shows the RxD circuit responsive to an input over the RxD input pad comprising flip-flop 12M, NOR gates 13M and 14M and AND gate 15M. Also shown in FIG. 14M is the RTS Control circuit which generates an output over the $\overline{\text{RTS}}$ pad and comprises the flip-flops 20M-22M, NOR gates 23M-25M, and latch 26M. FIG. 14M also shows a portion of the Transmitter Control circuitry, comprising a read only memory indicated generally by reference numeral 30M, a T1 pass generator 31M, flip-flops 32M-34M and associated logic gates.

FIG. 14N shows a portion of the Control Register circuitry, including Control Register #4, comprising latches 10N-14N, NAND gate 15N and latches 16N and 17N. Latch 10N stores bit 0 of Control Register #4 and latch 17N stores bit 7. This holds true for the other control registers (i.e., the leftmost latch stores bit 0 and the right-most latch stores bit 7). Control Register #2 comprises latches 20N-23N, NAND gates 24N-26N, and latch 27N.

FIG. 14O shows another portion of the Control Register circuitry, including Control Registers #1 and #3. Control Register #1 comprises latches 30-34, NAND gate 35, and latches 36 and 37. Control Register #3 comprises latches 40-47. Also shown in FIG. 14O is the Loop Control circuitry, comprising latches 70 and 71.

Figure 42A:
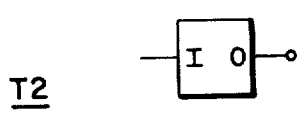
Figure 42B:
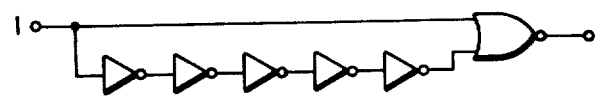

FIGS. 15A-42A show various of the logic symbols appearing in FIGS. 14A-14O. The detailed logic diagrams corresponding to the logic symbols shown in FIGS. 15A-42A are illustrated in the corresponding FIGS. 15B-42B. Each of the logic symbols shown in FIGS. 15A-42A is uniquely identified at the left-hand side, and such identifier is used in the detailed logic diagram of FIGS. 14A-14O whenever such logic symbol appears. FIGS. 15A-24A illustrate various delay latches DL1-DL10. FIGS. 25A-27A illustrate various R/S latches L1-L3. FIGS. 28A-35A illustrate various delay flip-flops M1-M8. FIGS. 36A-39A illustrate various flip-flops F1-F4. FIG. 40A illustrates a functional gate 20A employed in the Data Bus I/O Buffer circuits 10A-17A of FIG. 14A. FIGS. 41A and 42A illustrate two pass generators T1 and T2. A detailed MOS circuit schematic for pass generator T1 is given in FIG. 41B, and a detailed logic representation of pass generator T2 is given in FIG. 42B.

Operation of Preferred Embodiment

INITIALIZATION—During a power-on sequence, the ADLC is reset via the $\overline{\text{RESET}}$ input and internally latched in a reset condition to prevent erroneous output transitions. The four control registers must be program-loaded prior to the release of the reset condition. The release of the reset condition is performed via software by writing a 0 into the Rx RS control bit (Receiver) and/or Tx RS control bit (transmitter). The release of the rest condition must be done after the $\overline{\text{RESET}}$ input has gone high.

At any time during operation, writing a 1 into the Rx Rs control bit or Tx RS control bit causes the reset condition of the Receiver or the Transmitter.

TRANSMITTER OPERATION—The Tx FIFO register cannot be pre-loaded when the Transmitter is in a reset state. After the reset release, the Flag/Mark Idle control bit selects either the mark idle state (inactive idle) or the flag "time fill" (active idle) state. This active or inactive mark idle state will continue until data is loaded into the Tx FIFO.

The availability of the Tx FIFO is indicated by the TDRA status bit under the control of the 2 Byte/1 Byte control bit. TDRA status is inhibited by the Tx RS bit or $\overline{\text{CTS}}$ input being high. When the 1 Byte mode is selected, one byte of the FIFO is available for data transfer when TDRA goes high. When the 2 Byte mode is selected, two successive bytes can be transferred when TDRA goes high.

The first byte (address field) should be written into the Tx FIFO at the "Frame Continue" address. Then the transmission of a frame automatically starts. If the Transmitter is in a mark idle state, the transfer of an address causes an opening flag within two or three TxC clock cycles. If the Transmitter has been in a time fill state, the current time fill flag being transmitted is assumed as an opening flag and the address field will follow it.

A frame continues as long as data is written into the Tx FIFO at the "Frame Continue" address. The ADLC internally keeps track of the field sequence in the frame.

The frame is terminated by one of two methods. The most efficient way to terminate the frame from a software standpoint is to write the last data character into the Tx FIFO "Frame Terminate" address (RS1, RS0=11) rather than the Tx FIFO "Frame Continue" address (RS1, RS0=10). An alternate method is to follow the last data written into the Tx FIFO "Frame Continue" address with the setting of the Transmit Last Data control bit. Either method causes the last character to be transmitted and the FCS field to be appended automatically along with a closing flag. Data for a new frame can be loaded into the Tx FIFO immediately after the old frame data, if TDRA is high. The closing flag can serve as the opening flag of the next frame, or separate opening and closing flags may be transmitted. If a new frame is not ready to be transmitted, the ADLC will automatically transmit the Active (flag) or Inactive (mark) idle condition.

If the Tx FIFO becomes empty at any time during frame transmission (the FIFO has no data to transfer into the Transmitter Shift Register) and the Transmitter Shift Register requires data, an underrun will occur and the Transmitter automatically terminates the frame by transmitting an abort. The underrun state is indicated by the Tx Underrun status bit.

Any time the Tx ABORT conrol bit is set, the Transmitter immediately aborts the frame (transmits at least eight consecutive 1's) and clears the Tx FIFO. If the Abort Extend control bit is set at the time, an Idle (at least sixteen consecutive 1's) is transmitted. An abort or idle in an "out of frame" condition can be useful to gain eight or sixteen bits of delay, as described below under the section entitled Programming Considerations.

The $\overline{\text{CTS}}$ (Clear-To-Send) input and $\overline{\text{RTS}}$ (Request-to-Send) output are provided for a modem or other hardware interface.

The TDRA/FC status bit (when selected to be Frame Complete Status) can cause an interrupt upon frame completion (i.e., a flag or abort completion).

Figure 11:
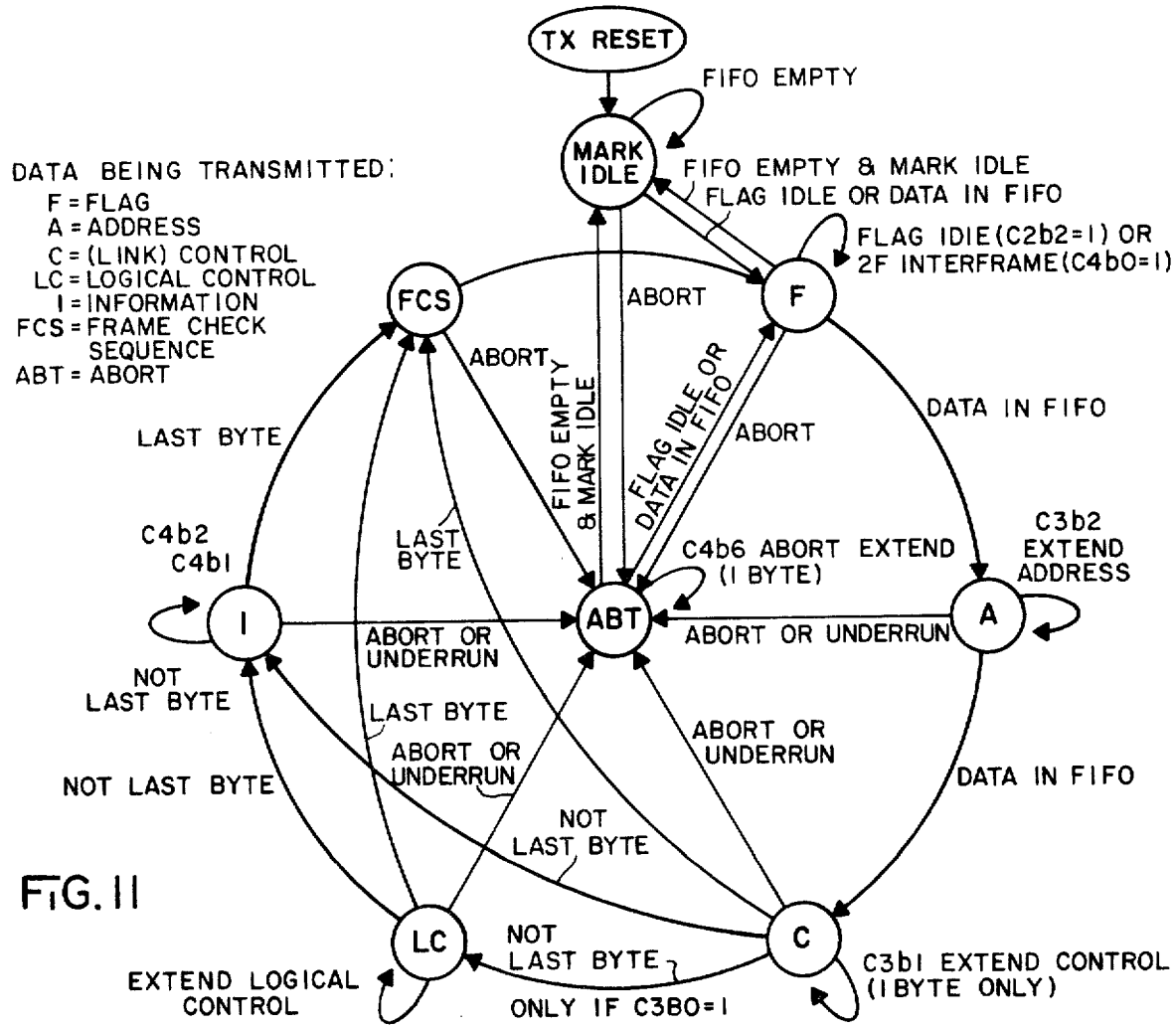
FIG. 11 illustrates a state diagram for the ADLC transmitter.

Reference may be had to FIG. 11 for a summary of the ADLC Transmitter operation in the form of a state diagram. In the diagram the symbol Cibi refers to the particular control register bit in question.

RECEIVER OPERATION—Data and a pre-synchronized clock are provided to the ADLC Receiver section by means of the Receive Data (RxD) and Receive Clock (RxC) inputs. The data is a continuous stream of binary bits with the characteristic that a maximum of five 1's can occur in succession unless an abort, flag, or idling condition occurs. The receiver continuously (on a bit-by-bit basis) searches for flags and aborts.

The Receiver Data input RxD is applied to the Receiver Data Decoder Register shown in the lower portion of FIG. 14I. The Receiver Data Decoder Register is clocked by the Receive Clock RxC. The contents of the Receiver Data Decoder Register are compared with the flag pattern, abort pattern, and "Go Ahead" pattern by the Receiver Data Decoder and Zero Deletion circuitry, comprising the row of DL3 delay latches in the center portion of FIG. 14I.

The Receiver Data Buffer Register, which is a sixteen-bit shift register, receives the output of the Receiver Data Decoder Register. The Receiver Data Buffer Register comprises a row of M1, M6, and M4 flip-flops in the middle of FIG. 14E. The output of the Receiver Data Buffer Register is multiplexed by the Receiver Bit Counter circuitry, which comprises the circuitry shown in FIG. 14E above the Receiver Data Buffer Register, and the output of the Receiver Data Buffer Register is stored right-justified in the Receiver Multiplex Register, which is shown as the row 4D of DL6 delay latches in FIG. 14D. As the Receiver Bit Counter generates a transfer pulse, the contents of the Receiver Multiplex Register are transferred into the Rx FIFO Register. The data goes through the Rx FIFO under the control of the Receiver FIFO Control circuit and is stored in the last empty byte location of the Rx FIFO. The Receiver Control and Sequence Control circuit monitors the progress of each field of the incoming frame to give the proper control.

When a flag is detected at the Receiver Data Decoder Register, the Receiver Sequence Control circuit and Receiver Bit Counter are initialized, and flip-flops 12E and 13E of the Receiver Data Buffer Register are initialized. If a series of flags is received, the Receiver resynchronizes to each flag. The Receiver waits until the flag pattern appears at the Receiver Multiplex Register and then starts the Receiver sequence control operation to enable data transfer from the Receiver Multiplex Register to the Rx FIFO. If a frame is too short or is incomplete (i.e., less than 25 bits of non-flag data) the closing flag re-initializes the receiver operation before the opening flag arrives at the Receiver Multiplex Register, and such frame is simply ignored. Noise on the Receiver Data input RxD during time fill can cause this kind of invalid frame. If the frame contains 25 or more bits of non-flag data but less than 32 bits, the ERR status bit in Status Register #2 is set indicating an error condition, and the Rx FIFO is cleared of the faulty frame.

The flag pattern is detected at the Receiver Multiplex Register by checking the eighth bit of such register (i.e., the contents of flip-flop 11E). The contents of flip-flops 12E and 13E of the Receiver Data Buffer Register are transferred to flip-flop 11E of the Receiver Multiplex Register at the conclusion of each eight-bit cycle. Since flip-flops 12E and 13E are set when a flag is received at the Receiver Data Decode Register, flip-flop 11E goes low only when a flag pattern arrives at the Receiver Multiplex Register.

When the Receiver Sequence Control circuitry is enabled, it monitors the sequence or progress of the field (i.e., the address, control, logical control, information, or FCS field) and it checks the word length of the field, as well as whether any field extension is present, and set the proper bit in Status Register #2 accordingly. Thus, for example, if a frame is terminated by a closing flag before a complete control field is received, the Register Sequence Control circuitry sets the ERR status bit in Status Register #2 (since the SDLC protocol requires that a frame contain an address byte, control byte, and FCS character as a minumum).

After the Receiver Sequence Control circuitry has checked the control field, a check is made of the LCF bit of Control Register #3 to determine whether the Logical Control Field has been selected. If it has been selected, the Receiver Sequence Control circuitry goes into a Logical Control Sequence as described above, and when the Logical Control Field has passed, the Receiver Control and Sequence Control circuitry is set up for any change in word length which may be called for by Control Register #4. If the LCF option has not been selected, any word length change occurs at the conclusion of the control field.

After a flag pattern (a flag is regarded as a closing flag after the Receiver Sequence Control circuitry is activated) is detected at the Receiver Data Decoder Register, the right-justified contents of the Receiver Multiplex Register are transferred into the Rx FIFO even if it is a partial word.

The Rx FIFO is clocked by the E clock to cause received data to move through the Rx FIFO to the last empty register location. The Receiver Data Available status bit (RDA) indicates when data is present in the last register (Register #3) for the 1 Byte Transfer Mode. The 2 Byte Transfer Mode causes the RDA status bit to indicate data is available when the last two FIFO register locations (Registers #2 and #3) are full. If the data character present in the Rx FIFO is an address octet Status Register #2 will exhibit an Address Present status condition. Data being available in the Rx FIFO causes an interrupt to be initiated (assuming the receiver interrupt is enabled, RIE=1). The MPU will read Status Register #2 as a result of the interrupt or in its turn in a polling sequence. RDA or Address Present will indicate that receiver data is available, and the MPU will subsequently read the Rx FIFO register. The interrupt and status bit will then be reset automatically. If more than one character has been received and was resident in the Rx FIFO, subsequent E clocks will cause the Rx FIFO to update and the RDA status bit and interrupt will again be set. In the 2 Byte Transfer Mode two data bytes may be read by the MPU on consecutive E cycles. Address Present provides for one-byte transfers only.

When a closing flag is received, the frame is terminated. The sixteen bits preceding the closing flag are regarded as the FCS and are not transferred to the MPU. Whatever data is present in the most significant byte portion of the Receiver Data Buffer Register is right-justified and transferred to the Rx FIFO. The frame boundary pointer, which is explained in the "Rx FIFO REGISTER" section, is set simultaneously in the Rx FIFO. The frame boundary pointer sets the Frame Valid status bit (when the frame was completed with no error) or the FCS/IF Error status bit (when the frame was completed with error) when the last byte of the frame appears at the last register location of the Rx FIFO. As long as the Frame Valid or FCS/IF error status bit is set, the data transfer from the second register location of the Rx FIFO to the last register location of the Rx FIFO is inhibited.

Any time the Frame Discontinue control bit is set in Control Register #1, the ADLC discards the current frame data in the ADLC without dropping flag synchronization. This feature can be used to ignore a frame which is addressed to another station.

Figure 44:
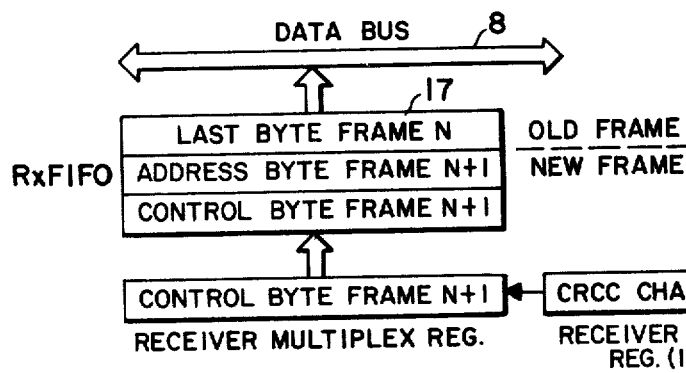
FIG. 44 illustrates one example in which the ADLC Receiver section identifies the boundary between portions of two different frames in the Receiver FIFO circuitry.

The first byte pointer and last byte pointer associated with the Rx FIFO will now be described. As mentioned above, the Rx FIFO comprises three eight-bit registers, shown as rows 1D-3D in the middle of FIG. 14D. In addition to the three bytes of storage in the Rx FIFO, the Receiver can store 32 bits in the Receiver Data Buffer Register. This means that two frames, or portions thereof, can be contained in the Receiver simultaneously. With reference to FIG. 44 a situation is depicted in which the last byte of a frame N is contained in the third register location of the Rx FIFO, and the Address field of a succeeding frame N+1 is contained in the second register location of the Rx FIFO. In the example shown in FIG. 44 the new frame N+1 has been completely transferred into the Receiver registers, since its closing flag is contained within the Receiver Data Decoder Register. In order to differentiate between the status of frame N and frame N+1 in the Receiver, it is necessary to identify the frame boundary between frame N and frame N+1.

Figure 46:
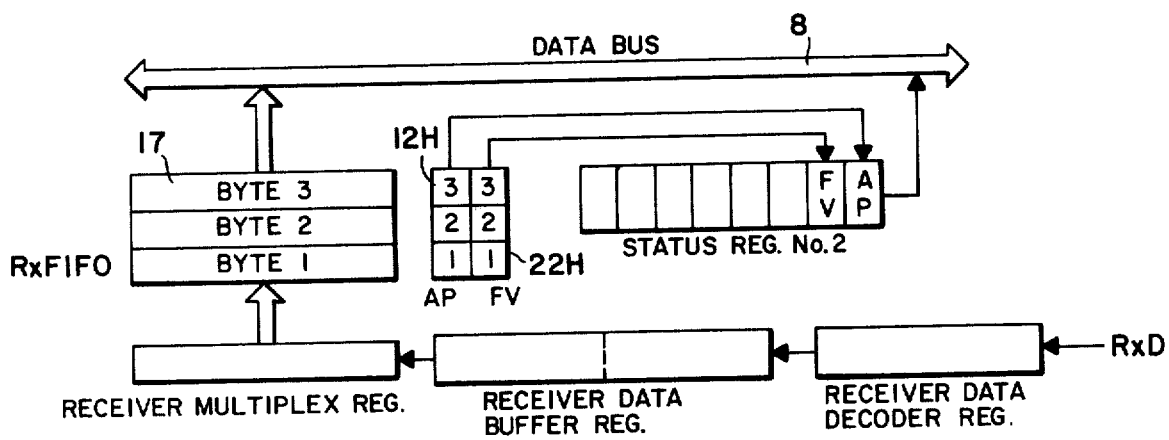
FIG. 46 shows a schematic diagram illustrating the operation of the Receiver frame boundary pointer.

This is done in the ADLC by providing a pair of frame boundary pointers. One frame boundary pointer points to the first byte of the frame, and the other frame boundary pointer points to the last byte of the frame. The frame boundary pointer identifying the first byte of the frame moves through delay latches H10–H12 in FIG. 14H as its associated first byte moves through the corresponding eight-bit registers 1D–3D (FIG. 14D) of the Rx FIFO. The last byte boundary pointer moves successively through delay latches H20–H22 as its associated last byte moves through the corresponding eight-bit registers 1D–3D of the Rx FIFO. As shown schematically in FIG. 46, the AP (Address Present) status bit of Status Register #2 is set in response to the information stored in latches H10–H12. The FV (Frame Value) status bit of Status Register #2 is set in accordance with the information contained in delay latches H20–H22. Thus it is possible to separately identify the status of the old frame N as having been completely received and the status of the address field of the new frame N+1 as having been received.

Figure 45:
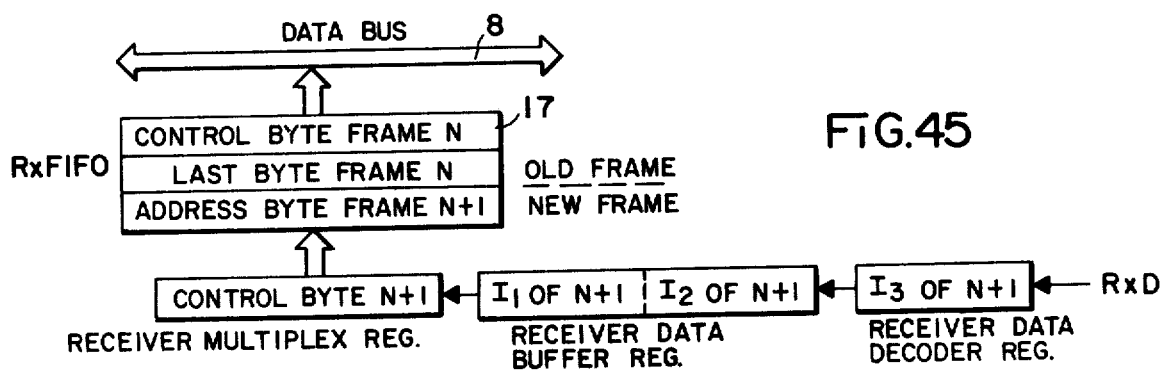
FIG. 45 illustrates another example in which the ADLC Receiver section identifies the boundary between portions of two different frames in the Receiver FIFO circuitry.

With reference to FIG. 45, an example is shown in which the last byte of old frame N is contained in the second eight-bit register location of the Rx FIFO and the first byte of new frame N+1 is contained in the first eight-bit register location. If the MPU reads the address field of old frame N and transmits a DISCONTINUE command to the ADLC (e.g., if the Address identifies the ADLC as being the wrong ADLC responding to the MPU), such command could destroy both old frame N and new frame N+1 were it not for the frame boundary pointer. The frame boundary pointer circuitry described above with reference to FIG. 44 solves the problem presented by the example shown in FIG. 45, since it enables the boundary between the old frame N and the new frame N+1 to be identified, and the new frame N+1 can accordingly be protected. The boundary pointer circuitry also resolves the problem where, for example, information field $I_3$ of FIG. 45 does not contain information but rather an abort pattern, since the frame boundary circuitry permits the old frame N to be saved, while aborting the new frame N+1.

Loop Mode Operation

SDLC specifies a loop data link configuration. In this type of configuration the primary station and all secondary stations are connected in a one-way half-duplex arrangement. The ADLC can be programmed to operate in this mode and to meet all of the SDLC protocol requirements.

Figure 6:
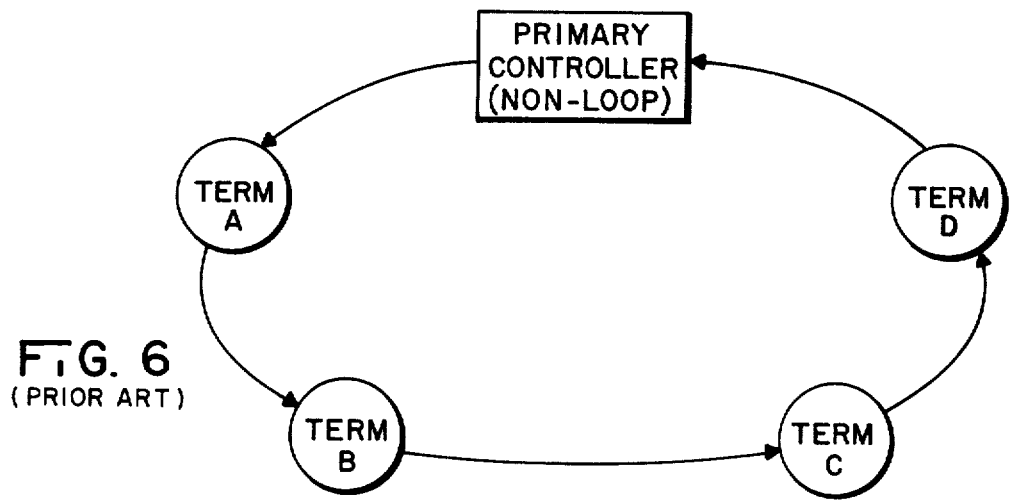

In the Loop Mode the ADLC not only performs the transmission and receiving of data frames but also has additional features for gaining and relinquishing loop control. In FIG. 6 a configuration is shown which depicts Loop Mode operation. The system configuration shows a primary station and several secondary stations. The loop is always under control of the primary station. When the primary wants to receive data, it transmits a poll sequence and allows frame transmission to secondary stations on the loop. Each secondary is in series and adds one bit of delay to the loop. Secondary A in FIG. 6 receives data from the primary via its RxD input, delays the data one bit, and transmits it to secondary B via its TxD output. Secondaries B, C, and D operate in a similar manner. Therefore, data passes through each secondary and is received back by the primary controller.

Certain protocol rules must be followed in the manner by which the secondary station places itself on-loop (connects its transmitter output to the loop), goes active on the loop (starts transmitting its own data on the loop), and goes off the loop (disconnects its transmitter output). Otherwise loop data being transmitter to other stations down-loop would be affected. The data stream always flows the same way, and the order in which secondary terminals are serviced is determined by the hardware configuration. The primary controller times the delay through the loop. Should it exceed n+1 bit times, where n is the number of secondary terminals on the loop, it will indicate a loop failure. Control is transferred to a secondary by transmitting a "Go Ahead" signal following the closing flag of a polling frame (request for a response from the secondary) from the primary station. The "Go Ahead" from the primary is a 0 and seven 1's followed by mark idling. The primary can abort its response request by interrupting its idle with flags. The secondary should then immediately stop transmission and return control back to the primary. When the secondary completes its frame, a closing flag is transmitted, followed by all 1's. The primary detects the final 01111111 ... ("Go Ahead" to the primary) and control is given back to the primary. Note that if a down-loop secondary (e.g., station D) needs to insert information following an up-loop station (e.g., station A), the "Go Ahead" to station D is the last 0 of the closing flag from station A followed by 1's.

The ADLC in the primary station operates in Non-Loop, full duplex mode. The ADLC in each secondary operates in Loop Mode, monitoring up-loop data on its RxD input. The ADLC recognizes the necessary sequences in the data stream to automatically go on/off the loop and to insert its own station data. The procedure is the following and is summarized in Table 3 below.

TABLE 3

SUMMARY OF LOOP MODE OPERATION

| STATE | RX SECTION | TX SECTION | | LOOP STATUS BIT |
|---|---|---|---|---|
| OFF LOOP | Rx section receives data from loop and searches for 7 "1's" (when On-Loop Control bit set) to go ON-LOOP. | Inactive | | "0" |
| | | (1) NRZ MODE. | Tx data output is maintained "high" (mark). | |
| | | (2) NRZI MODE. | Tx data output reflects the Rx data input state delayed by one bit time. (Not normally connected to loop.) The NRZI data is internally decoded to provide error-free transitions to On-Loop mode. | |
| ON | (1) When Go-Active on poll bit is set, Rx section | Inactive | | "1" |

TABLE 3-continued
SUMMARY OF LOOP MODE OPERATION

| STATE | RX SECTION | TX SECTION | LOOP STATUS BIT |
|---|---|---|---|
| LOOP | searches for 01111111 pattern (the EOP or Go Ahead) to become the active terminal on the loop. (2) When On-Loop control bit is reset, Rx section searches of 8 "1's" to go OFF-Loop. | (1) NRZ MODE. Tx data output reflects Rx data input state delayed one bit time. (2) NRZI MODE. Tx data output reflects Rx data input state delayed 2 bit times. | |
| ACTIVE | Rx section searches for flag (an interrupt from the loop controller) at Rx data input. Received flag causes FD output to go low. IRQ is generated if RIE and FDSE control bits are set. | Tx data originates within ADLC until Go Active on Poll bit is reset and a flag or Abort is completed. Then returns to ON-Loop state. | "0" |

Go On-loop—When the ADLC powers up, the terminal station will be off-line. The first task is to become an active terminal on the loop. The ADLC must be connected to a loop link via an external switch such as that shown in FIG. 43. After a hardware reset, the ADLC $\overline{LOC/DTR}$ output will be in the high state and the up-loop receive data RxD is repeated through gate 300 to the down-loop stations. Any up-loop transmission will be received by the ADLC. The Loop Mode/Non-Loop Mode control bit (bit 5 in Control Register #3) must be set to place the ADLC in the Loop Mode. The ADLC now monitors its RxD input for a string of seven consecutive 1's which will allow a station to go on-line. The loop operation may be monitored by use of the Loop status bit in Status Register #1. After power-up and reset, this bit is a 0. When seven consecutive 1's are received by the ADLC, the $\overline{LOC/DTR}$ output will go to a low level, disabling gate 300, enabling gate 301 and connecting the ADLC TxD output to the down-loop stations. The up-loop data is now repeated to the down-loop stations via the ADLC. A one-bit delay is inserted in the data (in NRZI mode there will be a two-bit delay) as it circulates through the ADLC. The ADLC is now on-line and the Loop status bit in Status Register #1 will be a 1.

Figure 43:
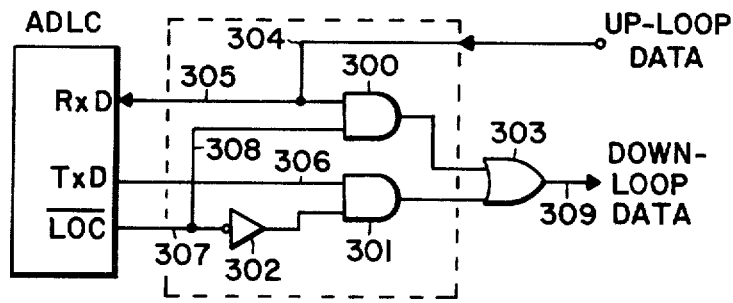
FIG. 43 illustrates one embodiment of external loop logic circuitry by which the ADLC may be operatively connected to a loop configuration.

Go Active after Poll—The Receiver section will monitor the up-link data for a general or station-addressed poll command and the Tx FIFO should be loaded with data so that when the "Go Ahead" sequence of a 0 followed by seven 1's (01111111 ...) is detected, transmission can be initiated immediately. When the polling frame is detected, the Go-Active-On-Poll control bit must be set (bit 6 in Control Register #3). A minimum of seven bit times are available to set this control bit after the closing flag of the poll. When the "Go-Ahead" is detected by the Receiver, the ADLC will automatically change the seventh 1 to a 0 so that the repeated sequence out gate 301 in FIG. 43 is now an opening flage sequence (01111110). Transmission now continues from the Tx FIFO with data (address, control, etc.) as previously described. When the ADLC has gone-active-on-poll, the Loop status bit in Status Register #1 will go to a 0. The Receiver searches for a flag, which indicates that the primary station is interrupting the current operation.

Go Inactive when On-Loop—The Go-Active-On-Poll control bit may be reset at any time during transmission. When the frame is complete (the closing flag or abort is transmitted), the loop is automatically released and the station reverts back to being just a one-bit delay in the loop, repeating up-link data. If the Go-Active-On-Poll control bit is not reset by software and the final frame is transmitted (Flag/Mark Idle bit=0), then the transmitter will mark idle and will not release the loop to up-loop data. A Tx Abort command is used in this case in order to go inactive when on the loop. Also, if the Tx FIFO was not preloaded with data (address, control, etc.) prior to changing the "Go Ahead" character to a flag, the ADLC will either transmit flags (active idle character) until data is loaded (when the Flag/Mark Idle control bit is high) or will go into an underrun condition and transmit an abort (when the Flag/Mark Idle control bit is low). When an abort is transmitted, the Go-Active-on-Poll control bit is reset automatically, and the ADLC reverts to its repeating mode (TxD=delayed RxD). When the ADLC Transmitter goes inactive, the Loop status bit will return to a 1, indicating normal on-loop retransmission of up-loop data.

Go Off-Loop—The ADLC can drop off the loop (go off-line) similar to the way it went on-line. When the Loop On-Line control bit is reset, the ADLC Receiver section looks for eight successive 1's before allowing the $\overline{LOC/DTR}$ output to return high (the inactive state). Gate 300 in FIG. 43 will be enabled and gate 301 disabled, allowing the loop to maintain continuity without disturbance. The Loop status bit will show an off-line condition (logical 0).

In a loop with many stations a "global address" (normally all 1's) can be used to send a polling command to all secondary stations simultaneously by the controller. In this way only one polling command need be sent, and each station will in turn put its data on the loop when it receives the "Go Ahead" sequence. The second station in the loop will receive the "Go Ahead" when the first station finishes its frame with a flag and begins repeating the up-loop mark idle from the controller.

Loop-Back Self-Test Mode

One method of testing the ADLC is to set it up to transmit data from its Transmitter directly to its own Receiver. The loop-back test mode provides an easy method of testing both the Receiver and Transmitter sections of the ADLC using the same MPU. This mode can be set up externally by connecting the RxD input to the TxD output. This condition can also be accomplished by proper programming of the ADLC. If bit 6 of CR3 is set and bit 5 of CR3 is low, the TxD output is internally connected to the RxD input.

Modem Control

Figure 1:
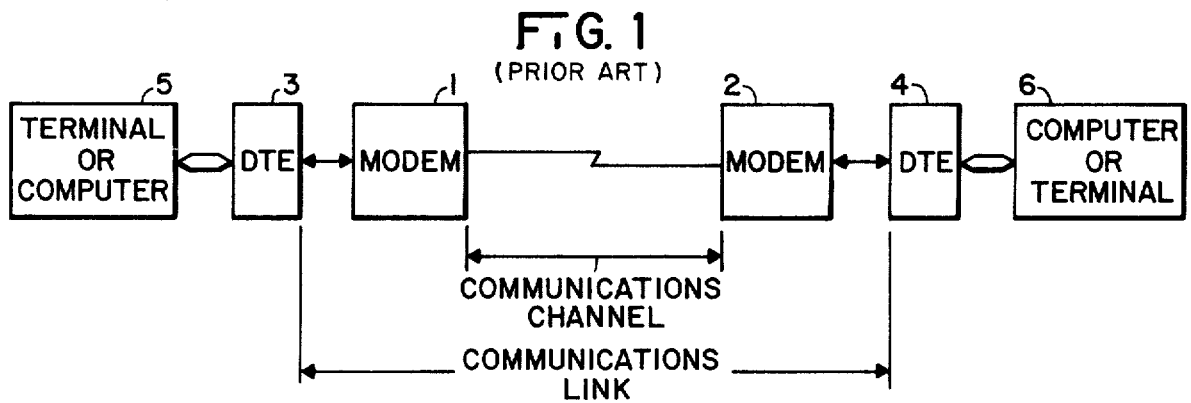
Figure 2A:
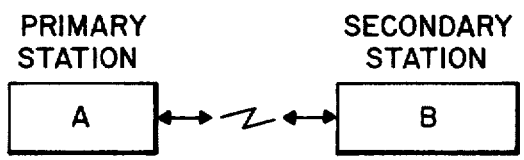
FIG. 2A illustrates half-duplex operation in a point-to-point configuration.
Figure 2B:
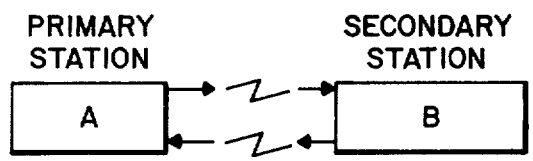
FIG. 2B illustrates full-duplex operation in a point-to-point configuration.
Figure 3:
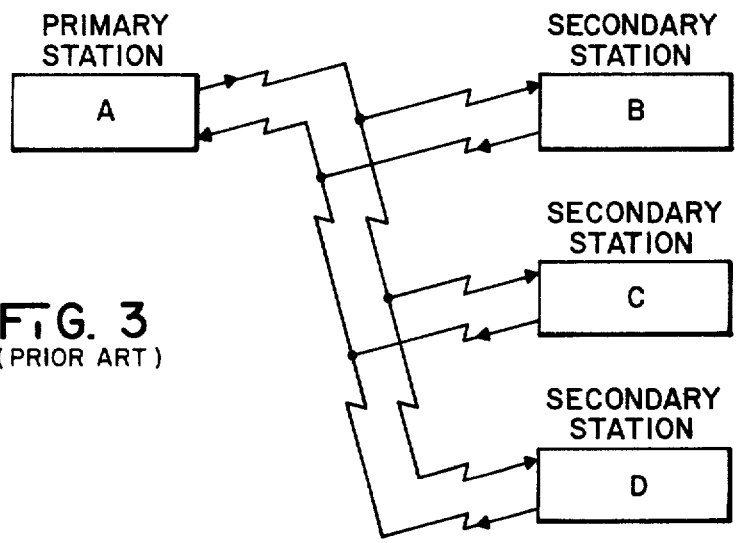
Figure 4:
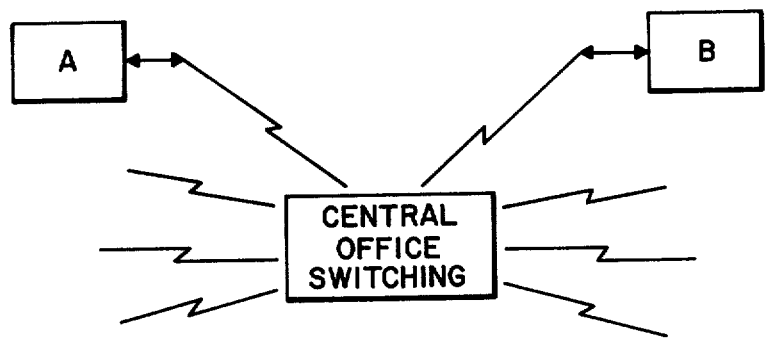
Figure 5:
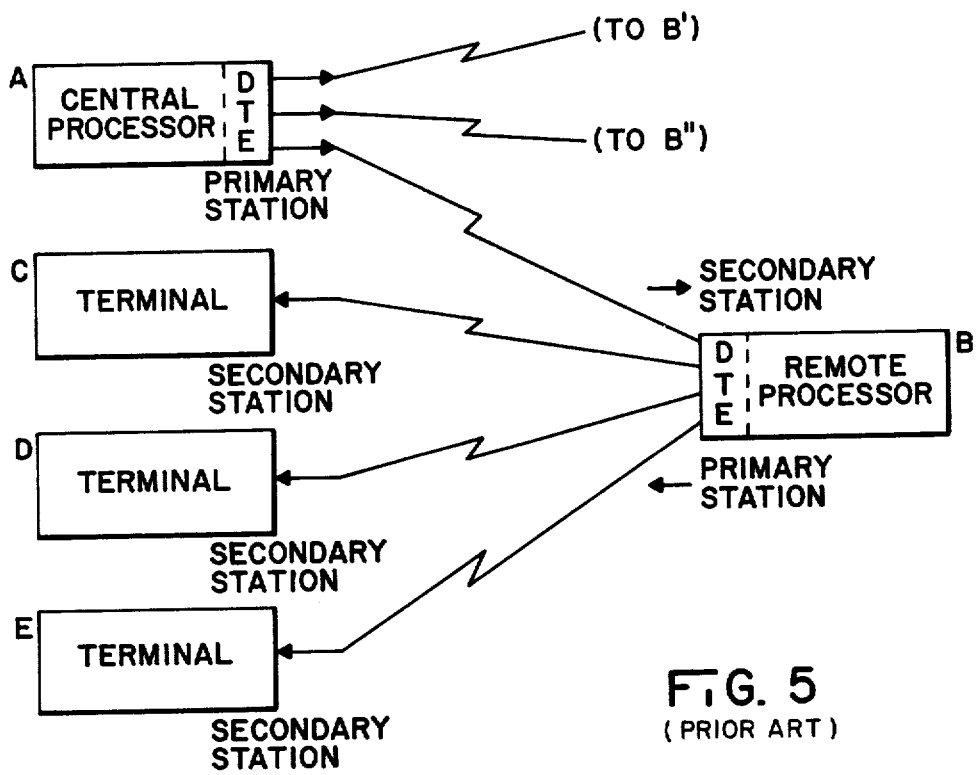

A modem may be employed to convert the digital data stream of the ADLC to the modulated carrier waveform required by certain communications channels (e.g., switched telephone lines). Telephone lines have a nominal frequency bandpass of 300 Hz. to 3000 Hz. (approximate frequency spectrum of the human voice). Due to this bandpass condition the serial data output of an ADLC cannot be transmitted directly over this medium, and a modem is used at each end of the telephone line. The transmitting side of one modem converts the serial data stream of the ADLC into an analog form that lies within the bandpass of the telephone line. At the other end of the data link the receiver section of the other modem converts the modulated analog signal to its original serial data form. When a modem is used with the ADLC, it must be of the synchronous type (i.e., the receive clock RxC must be supplied by the modem). A typical data link using modems is indicated in FIG. 1.

The ADLC provides all the handshake and data lines necessary for the interface to any standard synchronous modem. The handshake lines are:

Transmitter section:
RTS (Request to Send)—Request from ADLC informing the modem that ADLC has data to transmit.
CTS (Clear to Send)—Reply from modem informing ADLC that the modem is ready to transmit data.

Receiver section:
DCD (Data Carrier Detect)—Request from modem informing the ADLC that there is data to be received.
DTR (Data Terminal Ready)—Reply from ADLC informing modem that ADLC is ready to receive the data.

Including the data lines there are eight lines that interface the ADLC to a modem, namely RTS, CTS, TxC, TxD, DCD, DTR, RxC, and RxD.

Direct Memory Access (DMA) Control

The ADLC contains two pins to interface the ADLC to a direct-memory-access-controller (DMAC):

RDSR Output (pin 23)—Request for a DMA transfer from memory to the ADLC Tx FIFO.
TDSR Output (Pin 24)—Request for a DMA transfer from the ADLC Rx FIFO to memory.

These lines reflect the status of the TDRA and RDA status bits, respectively. These lines can be connected to the transfer request lines of a DMAC, such as the Motorola MC6844. Through a switching arrangement the ADLC's Transmitter and Receiver sections can be connected to the same DMAC channel permitting the ADLC to operate DMA in a half-duplex fashion. For full-duplex each of the ADLC sections can be connected to separate DMAC channels. In full-duplex operation one DMA channel is used to transfer data from memory to the ADLC Tx FIFO, and the other channel is used to transmit data from the ADLC Rx FIFO to memory in halt-burst, halt-steal, or tri-state cycle-steal modes.

Programming the ADLC

The ADLC is fully compatible with Motorola's MC6800 family of microcomputer devices and needs no special interface circuitry when operated with such devices. It can also be used with any other MPU-based system so long as its bus characteristics are met.

The serial data side of the ADLC has all of the necessary control and data lines for transmitting and receiving synchronous data via a modem, direct connection, or loop configuration. In addition a Flag Detect output (pin 25) is supplied that provides a one-bit wide pulse every time a flag occurs at the receive data RxD input. Output pin 26 serves two functions and is programmed by Control Register #3 to perform either the $\overline{\text{Loop on-line Control}}$ ($\overline{\text{LOC}}$) function or $\overline{\text{Data Terminal Ready}}$ ($\overline{\text{DTR}}$) function. All of the outputs are TTL-compatible and are capable of driving one standard TTL load.

If a modem is used with the ADLC, the four handshake lines ($\overline{\text{RTS}}$, $\overline{\text{CTS}}$, $\overline{\text{DCD}}$, and $\overline{\text{DTR}}$) should be connected as described above. If a modem is not used and these lines are not needed, both $\overline{\text{CTS}}$ (pin 28) and $\overline{\text{DCD}}$ (pin 29) must be grounded. If $\overline{\text{CTS}}$ and $\overline{\text{DCD}}$ are left unconnected they will assume the logical 1 state and inhibit the Transmitter and Receiver sections, respectively. $\overline{\text{DTR}}$ and $\overline{\text{RTS}}$ are outputs, and leaving them unconnected will not affect the operation of the ADLC.

A hardware $\overline{\text{RESET}}$ (applied to pin 8) internally latches a reset condition in the ADLC to prevent erroneous output transitions. During this reset condition the four control registers should be program-loaded for the desired ADLC operation. The release of the reset condition is performed via software for the Receiver and Transmitter by writing RxRS (bit 6 of CR1) and/or TxRS (bit 7 of CR1) low. The control registers are accessed by the two least significant address bits (A$\phi$ and A1 connected to RS$\phi$ and RS1) in conjunction with bit 0 (Address Control) of Control Register #1.

Since part of the control register select is contained in CR1, this register should be the first register accessed when initializing the ADLC. By programming bit 0 of CR1 low, CR2 can be selected. If bit 0 of CR1 is a 1, CR3 and CR4 can be selected. The order of programming these registers is not restricted so long as the pointer (bit 0 of CR1) is set up properly. In many applications CR3 and CR4 are set up once during initialization and not changed again. CR1 and CR2 are, however, often modified during data communications operations. Thus it is often convenient to set up CR3 and CR4 first and then load CR1 and CR2, leaving the address control pointer set to a binary 0 to permit easy access to the CR1, CR2, and Tx FIFO registers. An example of this type of programming sequence is shown in Table 4 below.

TABLE 4

| Bit | 7 | 6 | 5 | 4 | 3 | 2 | 1 | 0 | |
|---|---|---|---|---|---|---|---|---|---|
| CR1 | 1 | 1 | X | X | X | X | X | 1 | Reset Tx FIFO and Rx FIFO and select CR3 and CR4 |
| CR3 | X | X | X | X | X | X | X | X | Select options desired for CR3 when RS$\phi$ = 1 & RS1 = 0 |
| CR4 | X | X | X | X | X | X | X | X | Select options desired for CR4 when RS$\phi$ = 1 & RS1 = 1 |
| CR1 | 1 | 1 | X | X | X | X | X | 0 | Keep Rx FIFO and Tx FIFO reset and select CR2 |
| CR2 | X | X | X | X | X | X | X | X | Select options desired for CR2 when RS$\phi$ = 1 & RS1 = 0 |
| CR1 | 0 | 0 | X | X | X | X | X | X | Turn on Rx FIFO and Tx FIFO and select options desired |

TABLE 4-continued

| Bit | 7 | 6 | 5 | 4 | 3 | 2 | 1 | 0 |
|---|---|---|---|---|---|---|---|---|
| | | | | | for CR1 | | | |

The control registers cannot be read to verify their contents as they are write-only. One method for keeping track of their contents is to store an image in RAM when each is being loaded.

The two eight-bit status registers contain the required status information for the ADLC. The MPU, by reading these registers, determines the state of the ADLC and data link. The main status register is SR1. It not only contains the most often occurring status conditions (e.g. RDA and TDRA) but it also contains a bit (bit 1) that indicates the presence of a status condition in SR2, as described above.

The status registers can be monitored by the MPU by polling the registers or by using the interrupt. In a polling sequence the MPU must check these registers often enough to insure that a status service request is not missed. For a moderate to high-speed serial data rate this may require full-time monitoring by the MPU. If a polling operation is desired, the ADLC's interrupt request feature should be inhibited by writing bits 1 and 2 of CR1 low during the initialization sequence. To free the MPU for other activities the ADLC status conditions can be monitored in an interrupt mode by setting bits 1 and 2 of CR2. In this mode the ADLC signals the MPU when a status condition requiring service occurs. After an IRQ the MPU interrupt handler can check bit 7 of SR1 to be sure that the interrupt was a result of the ADLC and not some other device in the system. If this bit is set, the handler routine will then check the other status bits in the order set up by the programmer.

After a status indication has been detected it must be reset, signifying to the ADLC that the state has been recognized. Since certain status bits are handled in a different manner than others, a way of resetting each has been established to provide the most efficient means of dealing with the status registers. Some of these bits are reset automatically when the condition causing the flag is alleviated. Two control register bits (bits 5 and 6 of CR2) provide a software means of resetting the Receiver and Transmitter status bits, respectively. These control bits are reset automatically. Two other control bits (bits 6 and 7 of CR1), when programmed high, reset the entire Receiver and Transmitter sections, respectively, and keep these sections inhibited until their associated control bit is written low.

Other miscellaneous programming considerations are as follows:

1. Status Priority—When the prioritized status mode is used, it is best to test for the lowest priority conditions first. The lowest priority conditions typically occur more frequently and are the most likely conditions to exist when the ADLC is interrupted.

2. Stored vs Present Status—Certain status bits (DCD, CTS, Rx Abort, and Rx Idle) indicate a status which is the logical OR of a stored and a present condition. It is the stored status that causes an interrupt and which is cleared by a Status Clear control bit. After being cleared, the status register will reflect the present condition of an input or a Receiver input sequence.

3. Clearing Status Registers—In order to clear an interrupt with the two Status Clear control bits, a particular status condition must be read before it can be cleared. In the prioritized mode, clearing a higher priority condition might result in another $\overline{IRQ}$ caused by a lower priority condition whose status was suppressed when a status register was first read. This guarantees that a status condition is never inadvertently cleared.

4. Clearing the Rx FIFO—An Rx Reset will effectively clear the contents of all three Rx FIFO bytes. However, the Rx FIFO may contain data from two different frames when an overrun, abort, or DCD failure occurs. When any of these three events occur, the data from a previously closed frame (a frame whose closing flag has been received) will not be destroyed.

5. Servicing the Rx FIFO in a 2 Byte Mode—The procedure for reading the last bytes of data is the same, regardless of whether the frame contains an even or an odd number of bytes. Two bytes are read at a time until an interrupt occurs that is caused by an end of frame status (FV or ERR). When this occurs, indicating that the last byte has either been read or is ready to be read, one should switch temporarily to the one-byte mode with no prioritized status (Control Register #2). RDA is then tested to indicate whether a one-byte read should be performed. Then the frame and status are cleared.

6. Frame Complete Status and $\overline{RTS}$ Release—In many cases, a modem will require a delay for releasing $\overline{RTS}$. An eight-bit or sixteen-bit delay can be added to the ADLC $\overline{RTS}$ output by using an abort. At the end of a transmission, Frame Valid status will indicate the frame completion. After Frame Valid status goes high, a 1 is written into the ABT control bit (and ABT$_{EX}$ bit if a sixteen-bit delay is required). After the ABT control bit is set, a 0 is written into the RTS control bit. The transmitter will transmit eight or sixteen 1's and the $\overline{RTS}$ output will then go high (inactive).

7. Non-MC6800 Systems—(a) Care should be taken when performing a write followed by a read on successive E pulses at a high frequency rate. Time must be allowed for status changes to occur. If this is done, the time that E is low between successive write/read E pulses should be at least 500 ns. (b) The ADLC is a completely static part. However, the E frequency should be high enough to move data through the FIFO's and to service the peripheral requirements. Also, the period between successive E pulses should be less than the period of RxC or TxC in order to maintain synchronization between the Data Bus and the peripherals.

NRZ/NRZI CODES

NRZI (Non-Return-to-Zero-Inverted) is a coding scheme designed to maintain data terminal equipment synchronization. In the NRZI code the signal remains in the same state to send a binary 1 and switches to the opposite state to send a binary 0. This insures that during the transmission of a long stream of 0's within a frame enough transitions occur for the receiving station to maintain synchronization. The zero insertion technique prevents more than five consecutive 1's within a frame, thus limiting the period of non-transition when a long string of 1's is encountered in the original data.

The ADLC provides a means of selecting either the standard NRZ code (high level=1 and low level=0) or NRZI code. Bit 7 of CR4 selects the transmit/receive data format to be either NRZI or NRZ (1 for NRZI; 0 for NRZ) in both the loop or non-loop mode of operation.

When the NRZI code is selected, a one-bit delay is added to the transmitted data (TxD) to allow for NRZI encoding. Using NRZI in the loop mode adds a two-bit delay in repeating up-loop data to down-loop stations.

It will be apparent to those skilled in the art that the disclosed Advanced Data Link Controller may be modified in numerous ways and may assume many embodiments other than that specifically set out and described herein. Accordingly, it is intended by the appended claims to cover all modifications of the invention which fall within the true spirit and scope of the invention.

GLOSSARY

Abort: A function initiated by the sending station instructing the receiving station to discard the frame. It consists of the transmission of eight consecutive 1's.

Abort Extend: A feature extending the abort pattern an additional eight consecutive 1's to a total of sixteen consecutive 1's.

Active Idle: The transmission of contiguous flag patterns maintaining the data link in the active state.

ADCCP: Advanced Data Communications Control Procedure, a full-duplex Bit-Oriented Protocol.

Address Field: A sequence of eight bits (or "n" octets) immediately following the opening flag of a frame. This bit pattern identifies the secondary station sending or receiving the frame.

Address Field Extend: An enlargement of the address field in octets to include additional address information.

Asynchronous: The data stream is not synchronized with a clock.

Bisync: Binary Synchronous Communications, a byte-oriented protocol introduced by IBM for medium-to-high speed data transmission.

BOP: Bit Oriented Protocol, a class of protocols introduced subsequently to Bisync, used for medium-to-high speed data transmission.

Buffer: A temporary storage area used in performing input or output operations.

Command: A control signal sent by a primary station.

Communications Channel: The interface used for transmitting information between two or more modems.

Communications Link: The interface used for transmitting information between two or more stations.

Control Field: The eight-bit or sixteen-bit field immediately following the address field of a frame. It is used to convey control information. The field is interpreted as a command when received by a secondary station and as a response when received by a primary station.

Control Field Extension: A feature extending the control field from eight to sixteen bits.

Control Register: An eight-bit register used to control the operation of the ADLC. The ADLC has four control registers.

FCS: Frame Check Sequence, the sixteen-bit field immediately preceeding the closing flag and containing the frame information for error detection.

Flag: A unique bit sequence (01111110) indicating the beginning and ending of a frame.

Frame: A sequence of bits enclosed by flag characters. Information is transmitted on the data link in blocks called frames. A frame contains a minimum of 32 bits and must have an address field, control field, and FCS field.

Full-Duplex: Simultaneous two-way data transmission on a communications link.

Go-Active-On-Poll: A condition of a secondary station allowing it to go-active on-loop after it receives a Go-Ahead command from a primary station. This condition results from setting a GAP bit (bit 6 of Control Register #3) of the ADLC.

Go-Ahead: A signal transferring control from a primary station to a secondary station following a polling command in the loop configuration. The Go-Ahead command is 01111111.

Half Duplex: Two-way alternate data transmission on a communications link.

HDLC: High Level Data Link Control, the European standard for bit-oriented protocols.

Idle: A state that results when a station receives a succession of fifteen or more consecutive 1's.

Information Field: The sequence of bits between the control field and the FCS field.

Logical Control Field: The first eight-bit character in the information field when the logical control field option of the ADLC is selected.

Loop: A hardware configuration in which primary and secondary stations are connected to the data link in a serial fashion.

Loop-Back-Test: A mode where the Transmitter output of the ADLC is connected to the Receiver input of the same ADLC. This can be accomplished by an external hardware connection or setting bit 6 of CR3 which performs this connection internally.

Mark Idling: A succession of contiguous 1's.

Modem: A device that converts digital serial data to a modulated carrier waveform required by many communications channels.

Non-sequenced Frames: Frames that do not contain sequence numbers in the control field.

NRZ: Non-Return-to-Zero, a representation of data in which a low level represents a binary 0 and a high level represents a binary 1.

NRZI: Non-Return-to-Zero Inverted, a representation of data in which the data line remains in the same state to send a binary 1 and changes state to send a binary 0.

Octet: A sequence of eight binary bits.

Poll: An interrogation to determine if a secondary station requires service.

Poll/Final Bit: The fourth bit of the Control Field. A primary station may solicit a response frame from a secondary station by setting this bit high. A secondary station may indicate to a primary station that the current frame is the final frame of the sequence by setting this bit high.

Primary Station: The station responsible for the control of the data link. It generates commands and interprets responses.

Prioritized Control: A selectable mode in the ADLC causing many of the bits in Status Registers #1 and #2 to occur in a prioritized state.

Protocol: A set of rules used to manage a data communications link. It establishes and terminates connections, identifies sending and receiving stations, and distinguishes between address, control, and information bits.

Reply: A response by one station to another station's transmission.

Response Frames: Frames that are transmitted as a result of a poll.

Retransmission: The repeated transmission of a frame.

RxFIFO: A three-byte buffer storage area in the Receiver section of the ADLC.

SDLC: Synchronous Data Link Control, a bitoriented protocol introduced by IBM.

Secondary Station: A station receiving commands from the primary station, performing operations, and generating responses.

Sequence Frame: A frame containing sequence numbers in its control field.

Simplex: Data transmission in only one direction.

Time Fill: The bit pattern transmitted between frames. This may be continuous flag patterns or a continuous sequence of 1's.

Transparency: The transmission of data that has no possibility of interference with data link control, regardless of the data format or content.

TxFIFO: A three-byte buffer storage area in the Transmitter section of the ADLC.

What is claimed is:

1. In a data link controller for controlling data communications between a bidirectional data bus and a communications link transmitting and receiving data in serial form, said data link controller comprising a transmitter, a receiver, and a status register, the improvement wherein said status register comprises a plurality of individual bit locations each of which may be concurrently set to a predetermined logic state by control logic in response to one of a first set of operating conditions within said data link controller and which locations may be subsequently read by a data processing system located externally to said data link controller and coupled to said bidirectional data bus, said individual bit locations being arranged in a first prioritized pattern, said data processing system controlling the operation of said data link controller in response to the contents of said status register bit locations in accordance with said first prioritized pattern.

2. The data link controller recited in claim 1 further comprising an additional status register, said additional status register comprising a plurality of individual bit locations each of which may be concurrently set to said predetermined logic state by said control logic in response to one of a second set of operating conditions within said data link controller and which locations may be subsequently read by said data processing system, said individual bit locations of said additional status register also being arranged in a second prioritized pattern, said data processing system controlling the operation of said data link controller in response to the contents of the status register bit locations of both of said status registers in accordance with a prioritization arrangement which represents a combination of said first and second prioritized patterns.

3. The data link controller recited in claim 2 wherein one of said individual bit locations of said status register may be set in response to one of said first set of operating conditions to indicate that said additional status register should be read by said data processing system, and said one bit location may be cleared in response to another of said first set of operating conditions to indicate that said additional status register need not be read by said data processing system.

4. The data link controller recited in claim 2 and further comprising:

a control register coupled to said bidirectional data bus and loadable with a plurality of control bits by said data processing system, one of said control bits having first and second logic states, said control logic being responsive to the contents of said control register, wherein said control logic inhibits the setting of all status register bit locations of said status register and of said additional status register having a priority less than that of any particular bit location which has been set in said status register or in said additional status register, respectively, in response to said first logic state of said one control bit, and wherein said control logic does not inhibit the setting of any status register bit locations of said status register or of said additional status register, in response to said second logic state of said one control bit.

5. The data link controller recited in claim 1 wherein said transmitter comprises a plurality of registers each having N stages for storing information, each stage storing a single bit, N being a positive integer, wherein said data communications occur in serial form as a succession of N-bit frames, and wherein different ones of said status register bit locations may be loaded with ones of said first set of operating conditions providing status information regarding two different frames, portions of which are residing simultaneously within said plurality of N-stage registers.

6. The data link controller recited in claim 1 wherein said receiver comprises a plurality of registers each having N stages for storing information, each stage storing a single bit, N being a positive integer, wherein said data communications occur in serial form as a succession of N-bit frames, and wherein different ones of said status register bit locations may be loaded with ones of said first set of operating conditions providing status information regarding two different frames, portions of which are residing simultaneously within said plurality of N-stage registers.

7. The data link controller recited in claim 1 and further comprising:

a control register coupled to said bidirectional data bus and loadable with a plurality of control bits by said data processing system, one of said control bits having first and second logic states, said control logic being responsive to the contents of said control register, and wherein said control logic inhibits the setting of all status register bit locations of said status register having a priority less than that of any particular bit location which has been set, in response to said first logic state of said one control bit, and wherein said control logic does not inhibit the setting of any status register bit locations of said status register, in response to said second logic state of said one control bit.

* * * * *